US012600221B2

(12) United States Patent
Somoza et al.

(10) Patent No.: US 12,600,221 B2
(45) Date of Patent: Apr. 14, 2026

(54) REAL ESTATE NAVIGATION SYSTEM FOR REAL ESTATE TRANSACTIONS

(71) Applicants: Curtis Somoza, Los Angeles, CA (US); Karin M Somoza, Lake Forrest, CA (US); Eleanor Somoza, Los Angeles, CA (US)

(72) Inventors: Curtis Somoza, Los Angeles, CA (US); Karin M Somoza, Lake Forrest, CA (US); Eleanor Somoza, Los Angeles, CA (US)

( * ) Notice: Subject to any disclaimer, the term of this patent is extended or adjusted under 35 U.S.C. 154(b) by 0 days.

(21) Appl. No.: 18/401,492

(22) Filed: Dec. 31, 2023

(65) Prior Publication Data

US 2024/0131914 A1 Apr. 25, 2024

Related U.S. Application Data

(63) Continuation-in-part of application No. 17/968,045, filed on Oct. 18, 2022, now Pat. No. 11,858,353, (Continued)

(51) Int. Cl.
| | |
|---|---|
| *G06Q 50/16* | (2024.01) |
| *B60K 6/10* | (2006.01) |
| *B60K 6/30* | (2007.10) |
| *B60K 6/365* | (2007.10) |
| *B60K 6/543* | (2007.10) |
| *B60K 25/02* | (2006.01) |
| *G06Q 50/163* | (2024.01) |

(52) U.S. Cl.
CPC ............... *B60K 6/105* (2013.01); *B60K 6/30* (2013.01); *B60K 6/365* (2013.01); *B60K 6/543*

(2013.01); *B60K 25/02* (2013.01); *G06Q 50/16* (2013.01); *G06Q 50/163* (2013.01)

(58) Field of Classification Search
None
See application file for complete search history.

(56) References Cited

U.S. PATENT DOCUMENTS

| 11,182,865 B1 * | 11/2021 | Catalano | ............ G06Q 30/0643 |
| 11,393,056 B1 * | 7/2022 | Spickes | ................ G06F 16/909 |

(Continued)

OTHER PUBLICATIONS

Burris, Mark, Mahim Khan, and Jeremy Johnson. "Is That Route Really the Most Fuel-Efficient?." (2023). (Year: 2023).*

*Primary Examiner* — Andrew B Whitaker

(57) ABSTRACT

The embodiments disclose a database and file management system for real estate transactions including a real estate database comprising real estate information stored within files therein relating to a plurality real estate parcels, a server coupled to the plurality of real estate databases configured to receive the real estate information, a mobile automobile having an integrated navigation system coupled to the server, a graphical user interface having geographical mapping data displayed on the graphical user interface, wherein the graphical user interface is configured to allow a user to search and collect the real estate database with voice commands for real estate parcels of interest to the user that are in close proximity to a real-time location of the mobile automobile, and wherein the navigation system is further configured to compare and analyze the collected real estate parcels and display recommended real estate parcels for the user to select.

20 Claims, 39 Drawing Sheets

Related U.S. Application Data which is a continuation-in-part of application No. 17/829,210, filed on May 31, 2022, now Pat. No. 11,623,507, which is a continuation of application No. 17/488,020, filed on Sep. 28, 2021, now Pat. No. 11,345,226.

(56)  References Cited

U.S. PATENT DOCUMENTS

| | | | |
|---|---|---|---|
| 2010/0063829 A1* | 3/2010 | Dupray | G06Q 30/0603 705/313 |
| 2012/0290203 A1* | 11/2012 | King | G01C 21/343 701/430 |
| 2015/0066787 A1* | 3/2015 | Jedrzejczyk | G06Q 10/10 705/314 |
| 2018/0060980 A1* | 3/2018 | Stachowski | G06Q 10/0631 |
| 2022/0164739 A1* | 5/2022 | Morgan | G06Q 50/01 |
| 2022/0307844 A1* | 9/2022 | Moore | G01C 21/3453 |

* cited by examiner

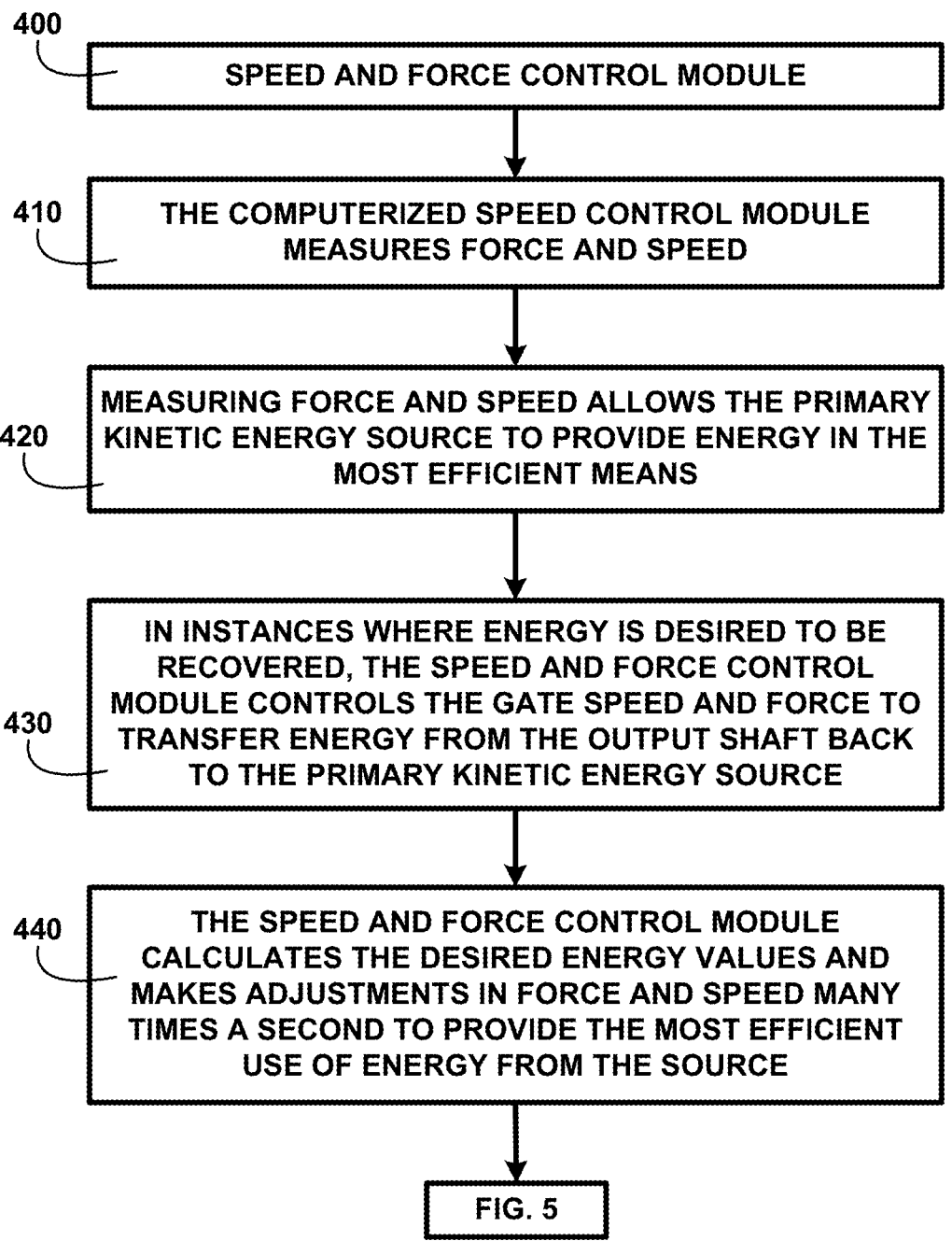

400

SPEED AND FORCE CONTROL MODULE

410

THE COMPUTERIZED SPEED CONTROL MODULE MEASURES FORCE AND SPEED

420

MEASURING FORCE AND SPEED ALLOWS THE PRIMARY KINETIC ENERGY SOURCE TO PROVIDE ENERGY IN THE MOST EFFICIENT MEANS

430

IN INSTANCES WHERE ENERGY IS DESIRED TO BE RECOVERED, THE SPEED AND FORCE CONTROL MODULE CONTROLS THE GATE SPEED AND FORCE TO TRANSFER ENERGY FROM THE OUTPUT SHAFT BACK TO THE PRIMARY KINETIC ENERGY SOURCE

440

THE SPEED AND FORCE CONTROL MODULE CALCULATES THE DESIRED ENERGY VALUES AND MAKES ADJUSTMENTS IN FORCE AND SPEED MANY TIMES A SECOND TO PROVIDE THE MOST EFFICIENT USE OF ENERGY FROM THE SOURCE

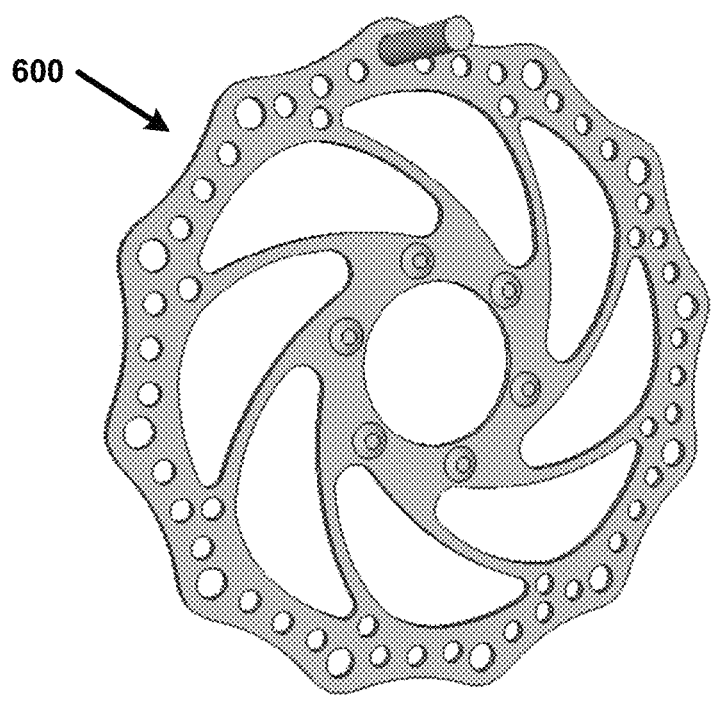
FIG. 6A
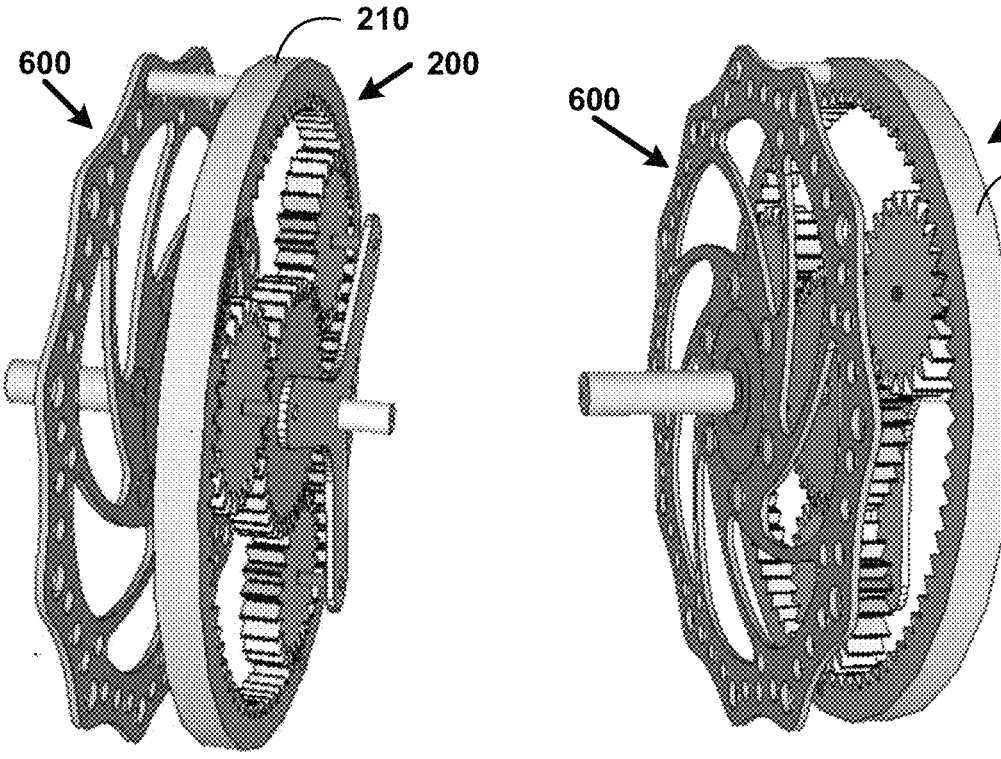
FIG. 6B          FIG. 6C

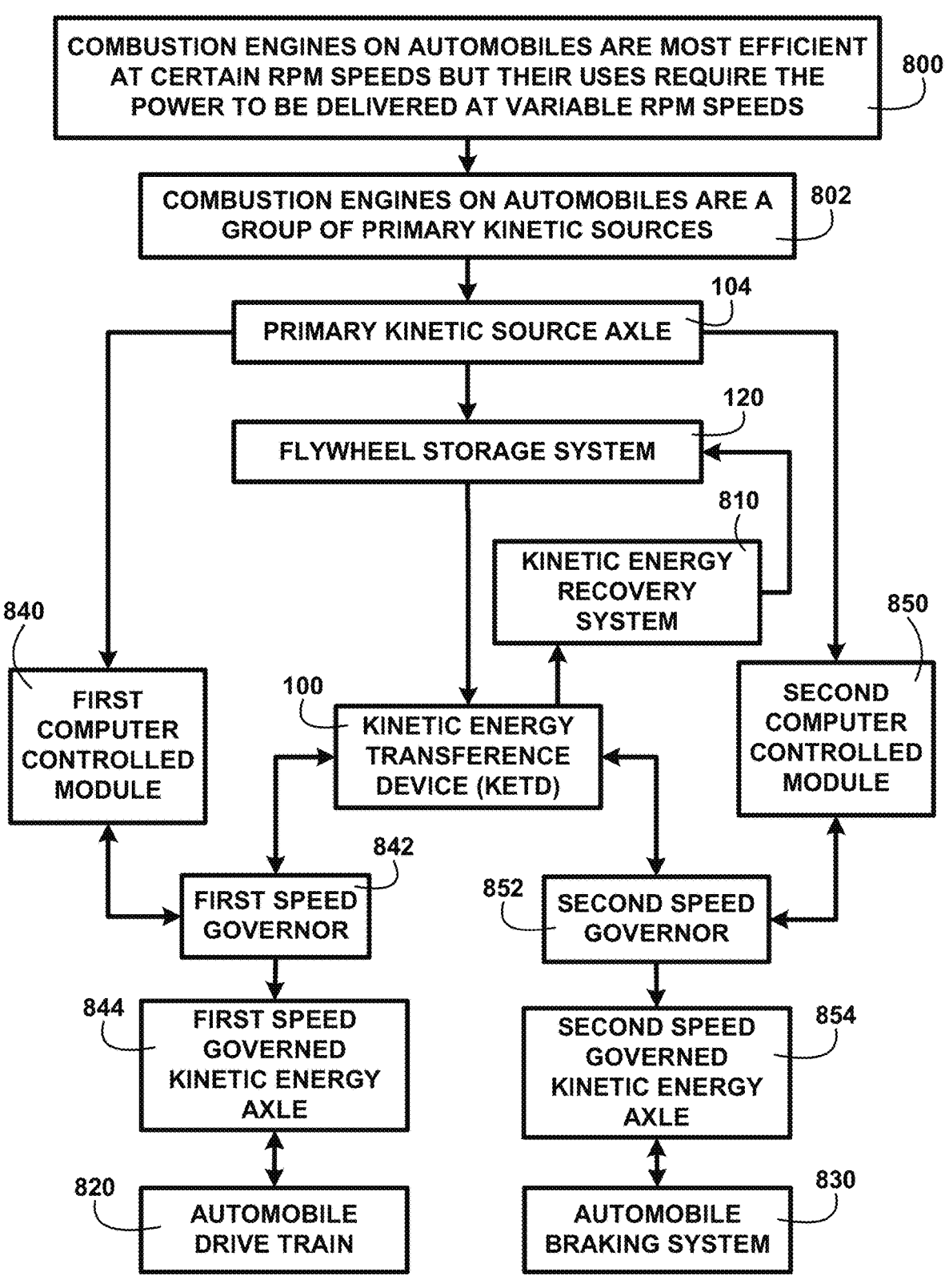

COMBUSTION ENGINES ON AUTOMOBILES ARE MOST EFFICIENT AT CERTAIN RPM SPEEDS BUT THEIR USES REQUIRE THE POWER TO BE DELIVERED AT VARIABLE RPM SPEEDS — 800

COMBUSTION ENGINES ON AUTOMOBILES ARE A GROUP OF PRIMARY KINETIC SOURCES — 802

PRIMARY KINETIC SOURCE AXLE — 104

FLYWHEEL STORAGE SYSTEM — 120

KINETIC ENERGY RECOVERY SYSTEM — 810

FIRST COMPUTER CONTROLLED MODULE — 840

KINETIC ENERGY TRANSFERENCE DEVICE (KETD) — 100

SECOND COMPUTER CONTROLLED MODULE — 850

FIRST SPEED GOVERNOR — 842

SECOND SPEED GOVERNOR — 852

FIRST SPEED GOVERNED KINETIC ENERGY AXLE — 844

SECOND SPEED GOVERNED KINETIC ENERGY AXLE — 854

AUTOMOBILE DRIVE TRAIN — 820

AUTOMOBILE BRAKING SYSTEM — 830

FIG. 8

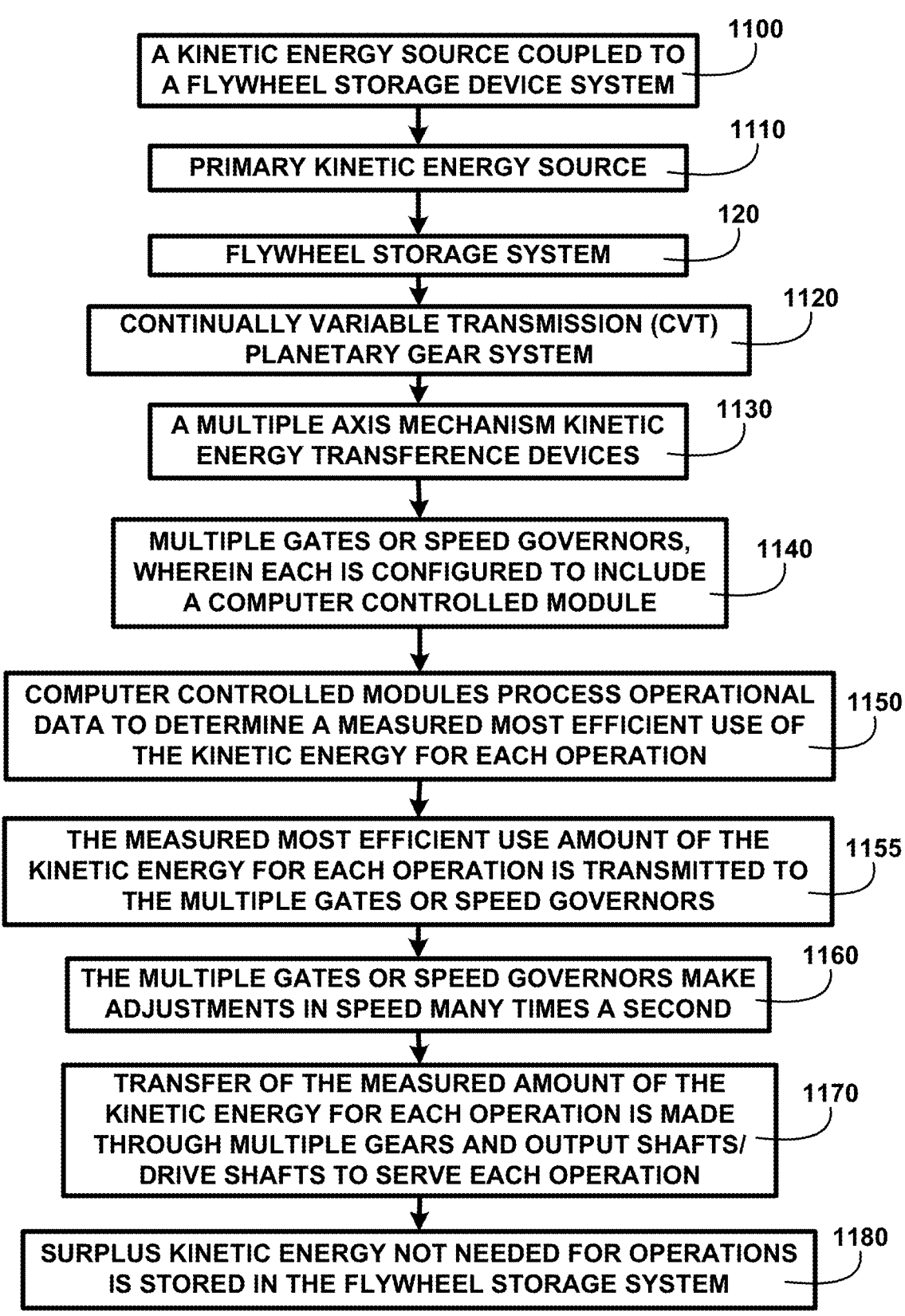

A KINETIC ENERGY SOURCE COUPLED TO A FLYWHEEL STORAGE DEVICE SYSTEM — 1100

PRIMARY KINETIC ENERGY SOURCE — 1110

FLYWHEEL STORAGE SYSTEM — 120

CONTINUALLY VARIABLE TRANSMISSION (CVT) PLANETARY GEAR SYSTEM — 1120

A MULTIPLE AXIS MECHANISM KINETIC ENERGY TRANSFERENCE DEVICES — 1130

MULTIPLE GATES OR SPEED GOVERNORS, WHEREIN EACH IS CONFIGURED TO INCLUDE A COMPUTER CONTROLLED MODULE — 1140

COMPUTER CONTROLLED MODULES PROCESS OPERATIONAL DATA TO DETERMINE A MEASURED MOST EFFICIENT USE OF THE KINETIC ENERGY FOR EACH OPERATION — 1150

THE MEASURED MOST EFFICIENT USE AMOUNT OF THE KINETIC ENERGY FOR EACH OPERATION IS TRANSMITTED TO THE MULTIPLE GATES OR SPEED GOVERNORS — 1155

THE MULTIPLE GATES OR SPEED GOVERNORS MAKE ADJUSTMENTS IN SPEED MANY TIMES A SECOND — 1160

TRANSFER OF THE MEASURED AMOUNT OF THE KINETIC ENERGY FOR EACH OPERATION IS MADE THROUGH MULTIPLE GEARS AND OUTPUT SHAFTS/ DRIVE SHAFTS TO SERVE EACH OPERATION — 1170

SURPLUS KINETIC ENERGY NOT NEEDED FOR OPERATIONS IS STORED IN THE FLYWHEEL STORAGE SYSTEM — 1180

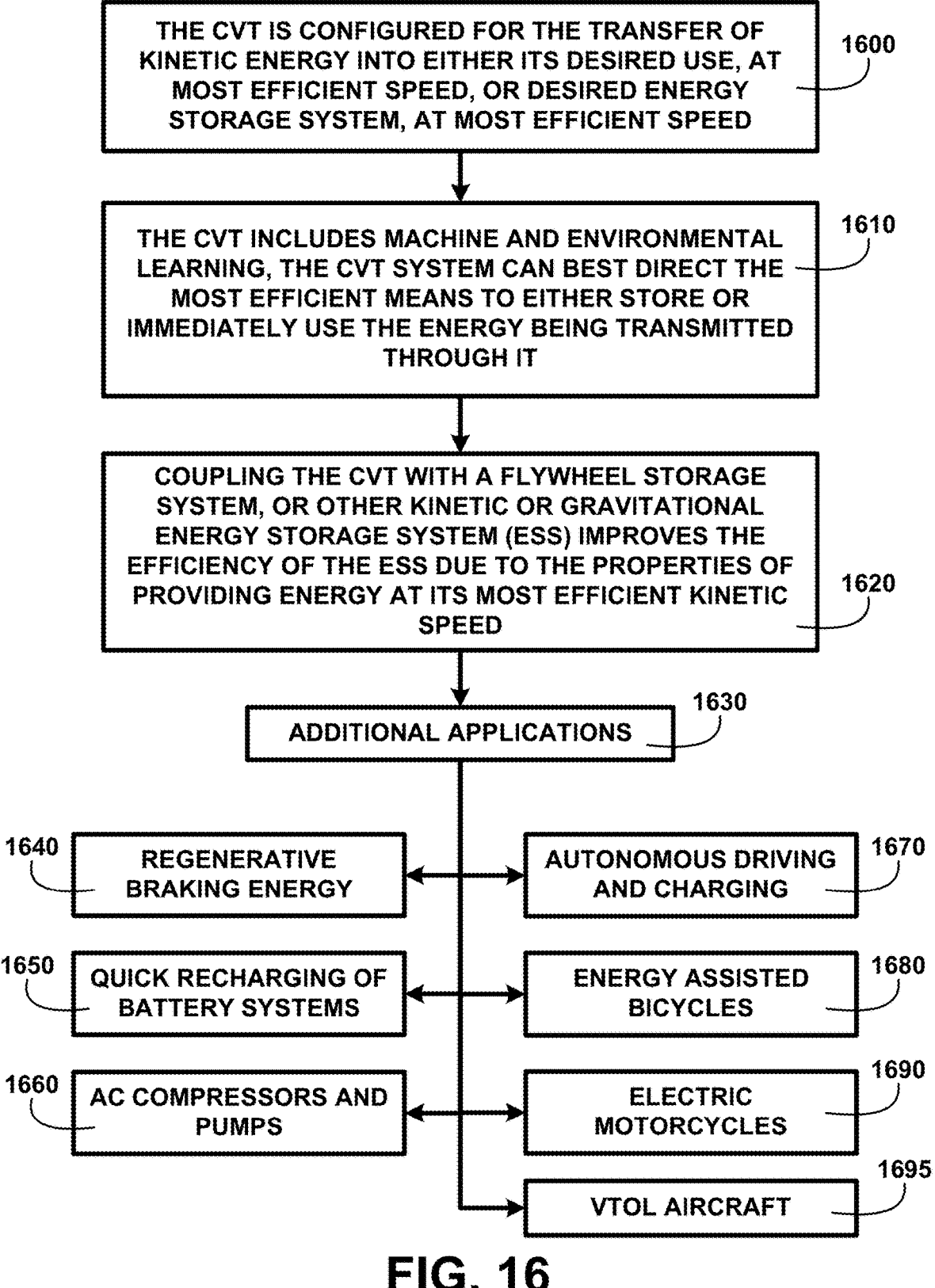

THE CVT IS CONFIGURED FOR THE TRANSFER OF KINETIC ENERGY INTO EITHER ITS DESIRED USE, AT MOST EFFICIENT SPEED, OR DESIRED ENERGY STORAGE SYSTEM, AT MOST EFFICIENT SPEED — 1600

THE CVT INCLUDES MACHINE AND ENVIRONMENTAL LEARNING, THE CVT SYSTEM CAN BEST DIRECT THE MOST EFFICIENT MEANS TO EITHER STORE OR IMMEDIATELY USE THE ENERGY BEING TRANSMITTED THROUGH IT — 1610

COUPLING THE CVT WITH A FLYWHEEL STORAGE SYSTEM, OR OTHER KINETIC OR GRAVITATIONAL ENERGY STORAGE SYSTEM (ESS) IMPROVES THE EFFICIENCY OF THE ESS DUE TO THE PROPERTIES OF PROVIDING ENERGY AT ITS MOST EFFICIENT KINETIC SPEED — 1620

ADDITIONAL APPLICATIONS — 1630

1640 — REGENERATIVE BRAKING ENERGY

1670 — AUTONOMOUS DRIVING AND CHARGING

1650 — QUICK RECHARGING OF BATTERY SYSTEMS

1680 — ENERGY ASSISTED BICYCLES

1660 — AC COMPRESSORS AND PUMPS

1690 — ELECTRIC MOTORCYCLES

1695 — VTOL AIRCRAFT

FIG. 16

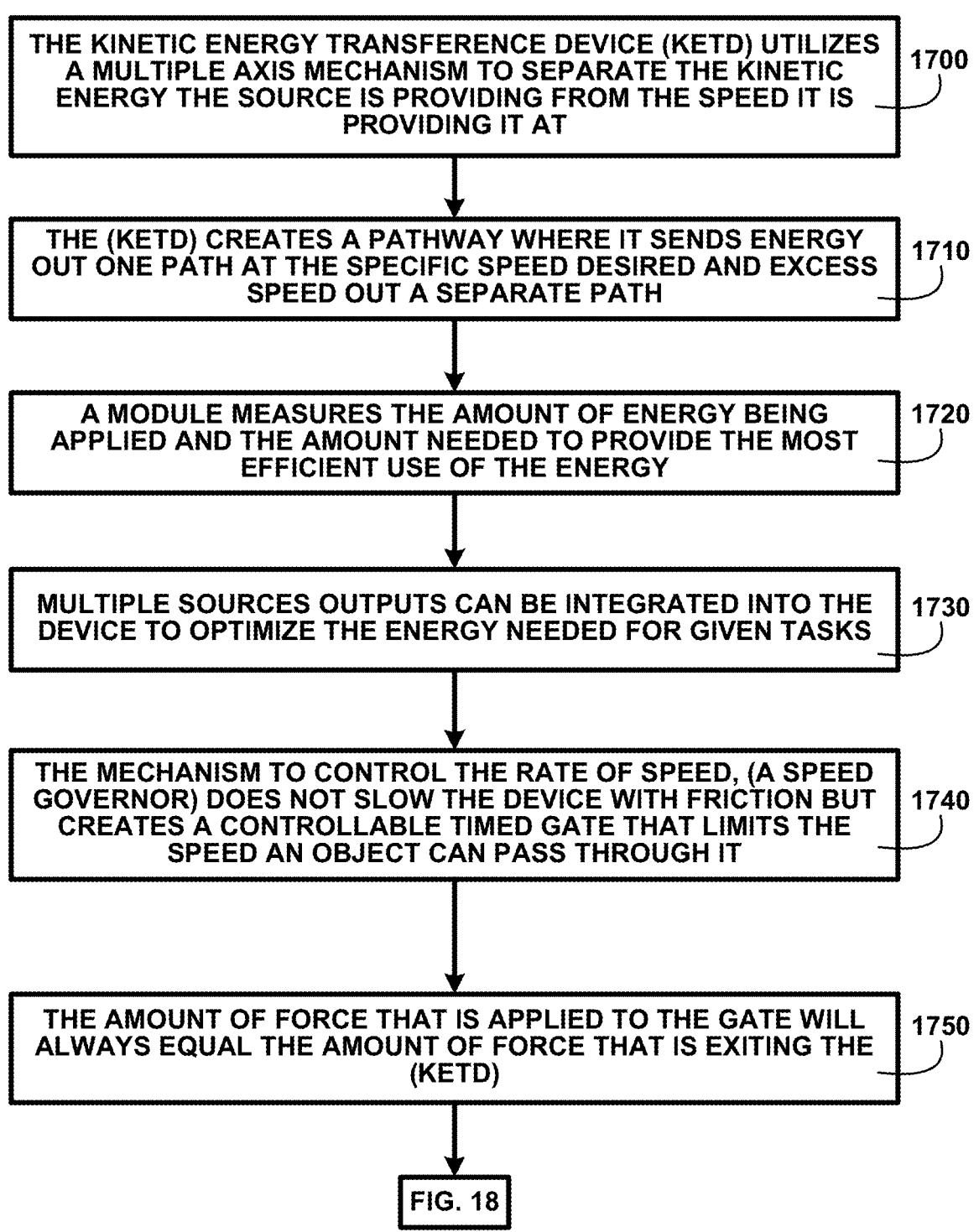

THE KINETIC ENERGY TRANSFERENCE DEVICE (KETD) UTILIZES A MULTIPLE AXIS MECHANISM TO SEPARATE THE KINETIC ENERGY THE SOURCE IS PROVIDING FROM THE SPEED IT IS PROVIDING IT AT — 1700

THE (KETD) CREATES A PATHWAY WHERE IT SENDS ENERGY OUT ONE PATH AT THE SPECIFIC SPEED DESIRED AND EXCESS SPEED OUT A SEPARATE PATH — 1710

A MODULE MEASURES THE AMOUNT OF ENERGY BEING APPLIED AND THE AMOUNT NEEDED TO PROVIDE THE MOST EFFICIENT USE OF THE ENERGY — 1720

MULTIPLE SOURCES OUTPUTS CAN BE INTEGRATED INTO THE DEVICE TO OPTIMIZE THE ENERGY NEEDED FOR GIVEN TASKS — 1730

THE MECHANISM TO CONTROL THE RATE OF SPEED, (A SPEED GOVERNOR) DOES NOT SLOW THE DEVICE WITH FRICTION BUT CREATES A CONTROLLABLE TIMED GATE THAT LIMITS THE SPEED AN OBJECT CAN PASS THROUGH IT — 1740

THE AMOUNT OF FORCE THAT IS APPLIED TO THE GATE WILL ALWAYS EQUAL THE AMOUNT OF FORCE THAT IS EXITING THE (KETD) — 1750

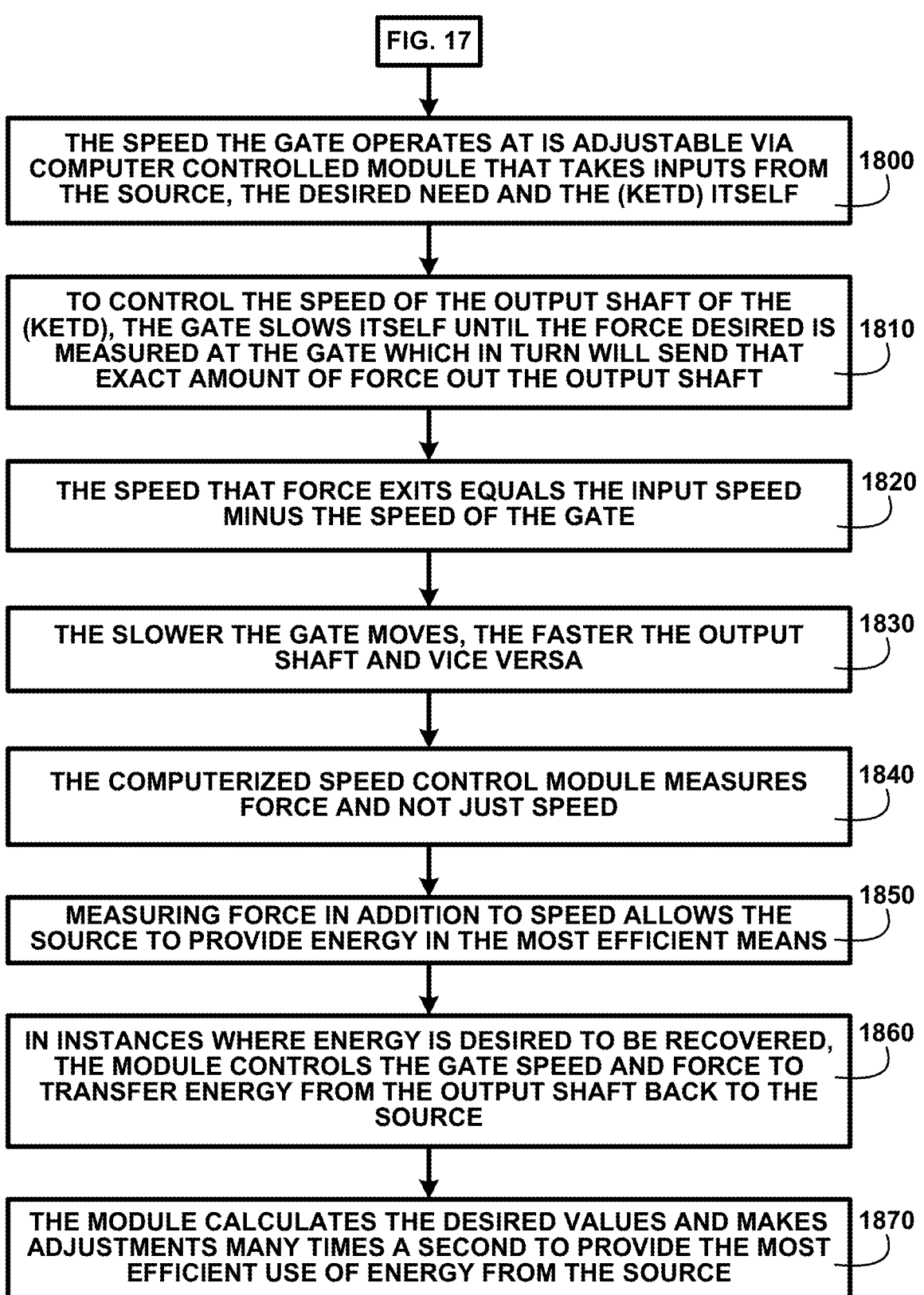

FIG. 17

THE SPEED THE GATE OPERATES AT IS ADJUSTABLE VIA COMPUTER CONTROLLED MODULE THAT TAKES INPUTS FROM THE SOURCE, THE DESIRED NEED AND THE (KETD) ITSELF   1800

TO CONTROL THE SPEED OF THE OUTPUT SHAFT OF THE (KETD), THE GATE SLOWS ITSELF UNTIL THE FORCE DESIRED IS MEASURED AT THE GATE WHICH IN TURN WILL SEND THAT EXACT AMOUNT OF FORCE OUT THE OUTPUT SHAFT   1810

THE SPEED THAT FORCE EXITS EQUALS THE INPUT SPEED MINUS THE SPEED OF THE GATE   1820

THE SLOWER THE GATE MOVES, THE FASTER THE OUTPUT SHAFT AND VICE VERSA   1830

THE COMPUTERIZED SPEED CONTROL MODULE MEASURES FORCE AND NOT JUST SPEED   1840

MEASURING FORCE IN ADDITION TO SPEED ALLOWS THE SOURCE TO PROVIDE ENERGY IN THE MOST EFFICIENT MEANS   1850

IN INSTANCES WHERE ENERGY IS DESIRED TO BE RECOVERED, THE MODULE CONTROLS THE GATE SPEED AND FORCE TO TRANSFER ENERGY FROM THE OUTPUT SHAFT BACK TO THE SOURCE   1860

THE MODULE CALCULATES THE DESIRED VALUES AND MAKES ADJUSTMENTS MANY TIMES A SECOND TO PROVIDE THE MOST EFFICIENT USE OF ENERGY FROM THE SOURCE   1870

FIG. 18

PLANETARY GEAR 2210

SUN GEAR 2600

RING GEAR 2612

SATELLITE GEAR 2610

CARRIER GEAR GATE 2620

SPEED GOVERNOR LOBE DISC CONNECTION BOLTS 2640

OUTPUT SHAFT 2630

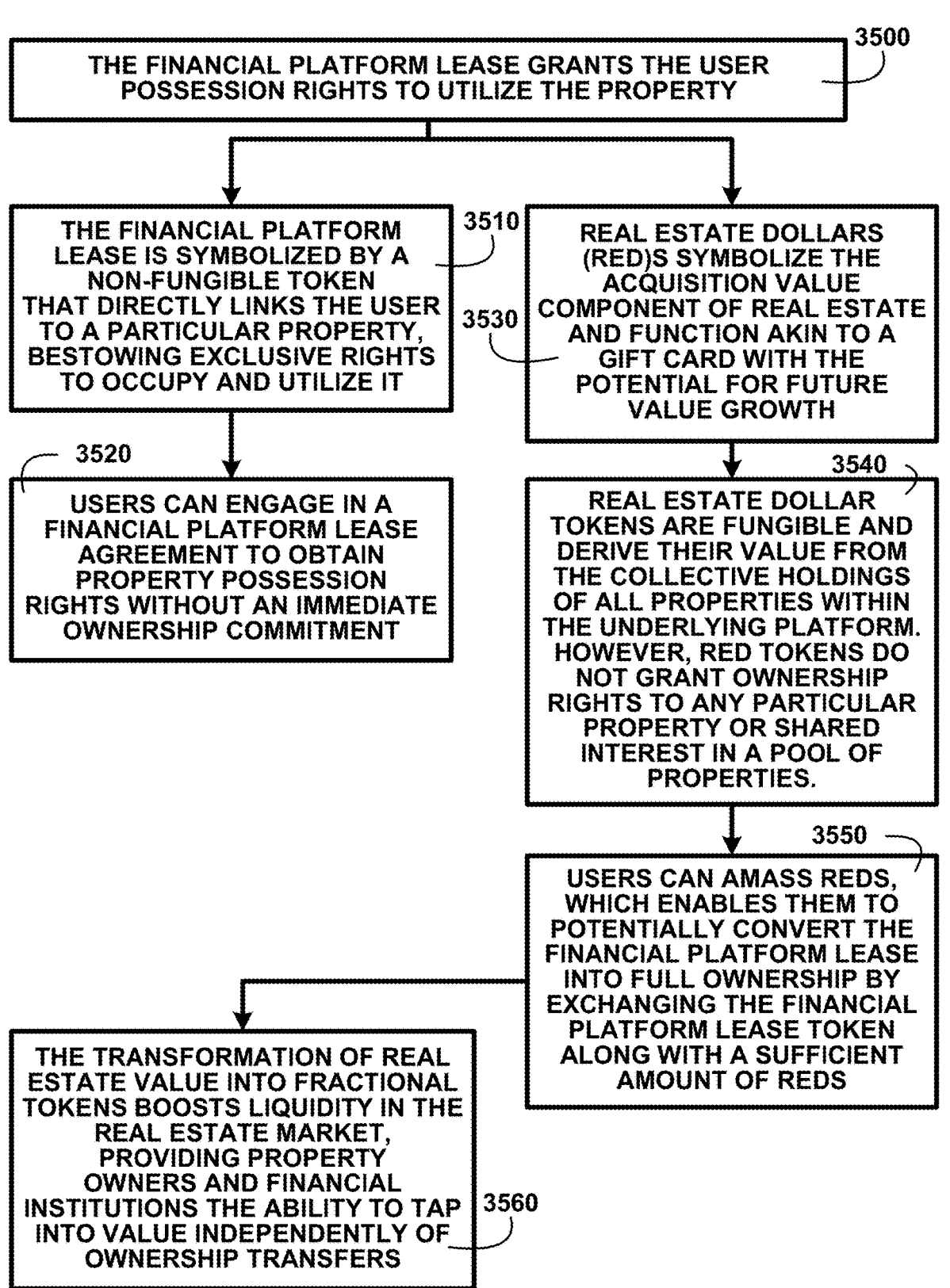

THE FINANCIAL PLATFORM LEASE GRANTS THE USER POSSESSION RIGHTS TO UTILIZE THE PROPERTY — 3500

THE FINANCIAL PLATFORM LEASE IS SYMBOLIZED BY A NON-FUNGIBLE TOKEN THAT DIRECTLY LINKS THE USER TO A PARTICULAR PROPERTY, BESTOWING EXCLUSIVE RIGHTS TO OCCUPY AND UTILIZE IT — 3510

REAL ESTATE DOLLARS (RED)S SYMBOLIZE THE ACQUISITION VALUE COMPONENT OF REAL ESTATE AND FUNCTION AKIN TO A GIFT CARD WITH THE POTENTIAL FOR FUTURE VALUE GROWTH — 3530

3520 — USERS CAN ENGAGE IN A FINANCIAL PLATFORM LEASE AGREEMENT TO OBTAIN PROPERTY POSSESSION RIGHTS WITHOUT AN IMMEDIATE OWNERSHIP COMMITMENT

REAL ESTATE DOLLAR TOKENS ARE FUNGIBLE AND DERIVE THEIR VALUE FROM THE COLLECTIVE HOLDINGS OF ALL PROPERTIES WITHIN THE UNDERLYING PLATFORM. HOWEVER, RED TOKENS DO NOT GRANT OWNERSHIP RIGHTS TO ANY PARTICULAR PROPERTY OR SHARED INTEREST IN A POOL OF PROPERTIES. — 3540

USERS CAN AMASS REDS, WHICH ENABLES THEM TO POTENTIALLY CONVERT THE FINANCIAL PLATFORM LEASE INTO FULL OWNERSHIP BY EXCHANGING THE FINANCIAL PLATFORM LEASE TOKEN ALONG WITH A SUFFICIENT AMOUNT OF REDS — 3550

THE TRANSFORMATION OF REAL ESTATE VALUE INTO FRACTIONAL TOKENS BOOSTS LIQUIDITY IN THE REAL ESTATE MARKET, PROVIDING PROPERTY OWNERS AND FINANCIAL INSTITUTIONS THE ABILITY TO TAP INTO VALUE INDEPENDENTLY OF OWNERSHIP TRANSFERS — 3560

FIG. 35

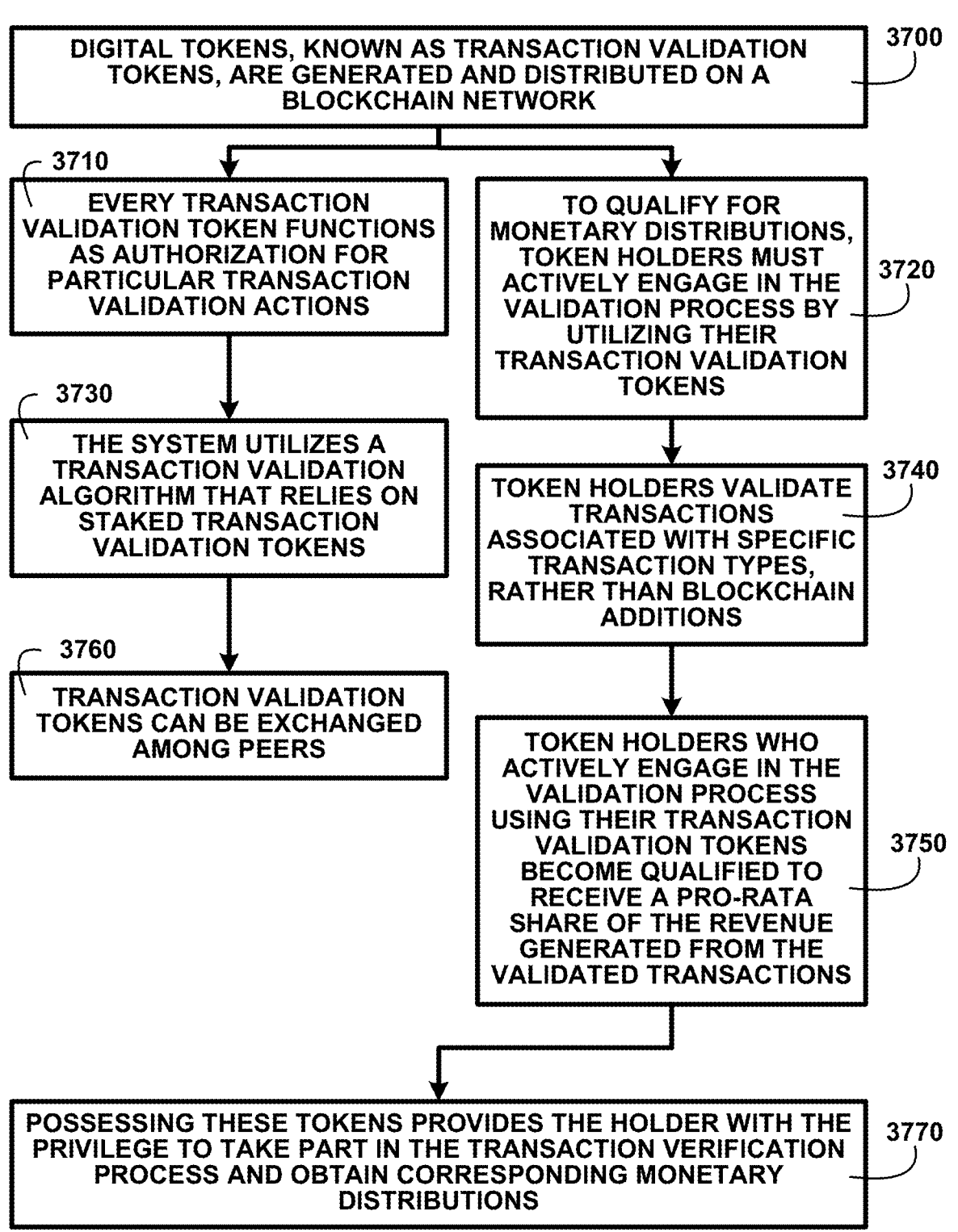

DIGITAL TOKENS, KNOWN AS TRANSACTION VALIDATION TOKENS, ARE GENERATED AND DISTRIBUTED ON A BLOCKCHAIN NETWORK — 3700

EVERY TRANSACTION VALIDATION TOKEN FUNCTIONS AS AUTHORIZATION FOR PARTICULAR TRANSACTION VALIDATION ACTIONS — 3710

TO QUALIFY FOR MONETARY DISTRIBUTIONS, TOKEN HOLDERS MUST ACTIVELY ENGAGE IN THE VALIDATION PROCESS BY UTILIZING THEIR TRANSACTION VALIDATION TOKENS — 3720

THE SYSTEM UTILIZES A TRANSACTION VALIDATION ALGORITHM THAT RELIES ON STAKED TRANSACTION VALIDATION TOKENS — 3730

TOKEN HOLDERS VALIDATE TRANSACTIONS ASSOCIATED WITH SPECIFIC TRANSACTION TYPES, RATHER THAN BLOCKCHAIN ADDITIONS — 3740

TRANSACTION VALIDATION TOKENS CAN BE EXCHANGED AMONG PEERS — 3760

TOKEN HOLDERS WHO ACTIVELY ENGAGE IN THE VALIDATION PROCESS USING THEIR TRANSACTION VALIDATION TOKENS BECOME QUALIFIED TO RECEIVE A PRO-RATA SHARE OF THE REVENUE GENERATED FROM THE VALIDATED TRANSACTIONS — 3750

POSSESSING THESE TOKENS PROVIDES THE HOLDER WITH THE PRIVILEGE TO TAKE PART IN THE TRANSACTION VERIFICATION PROCESS AND OBTAIN CORRESPONDING MONETARY DISTRIBUTIONS — 3770

FIG. 37

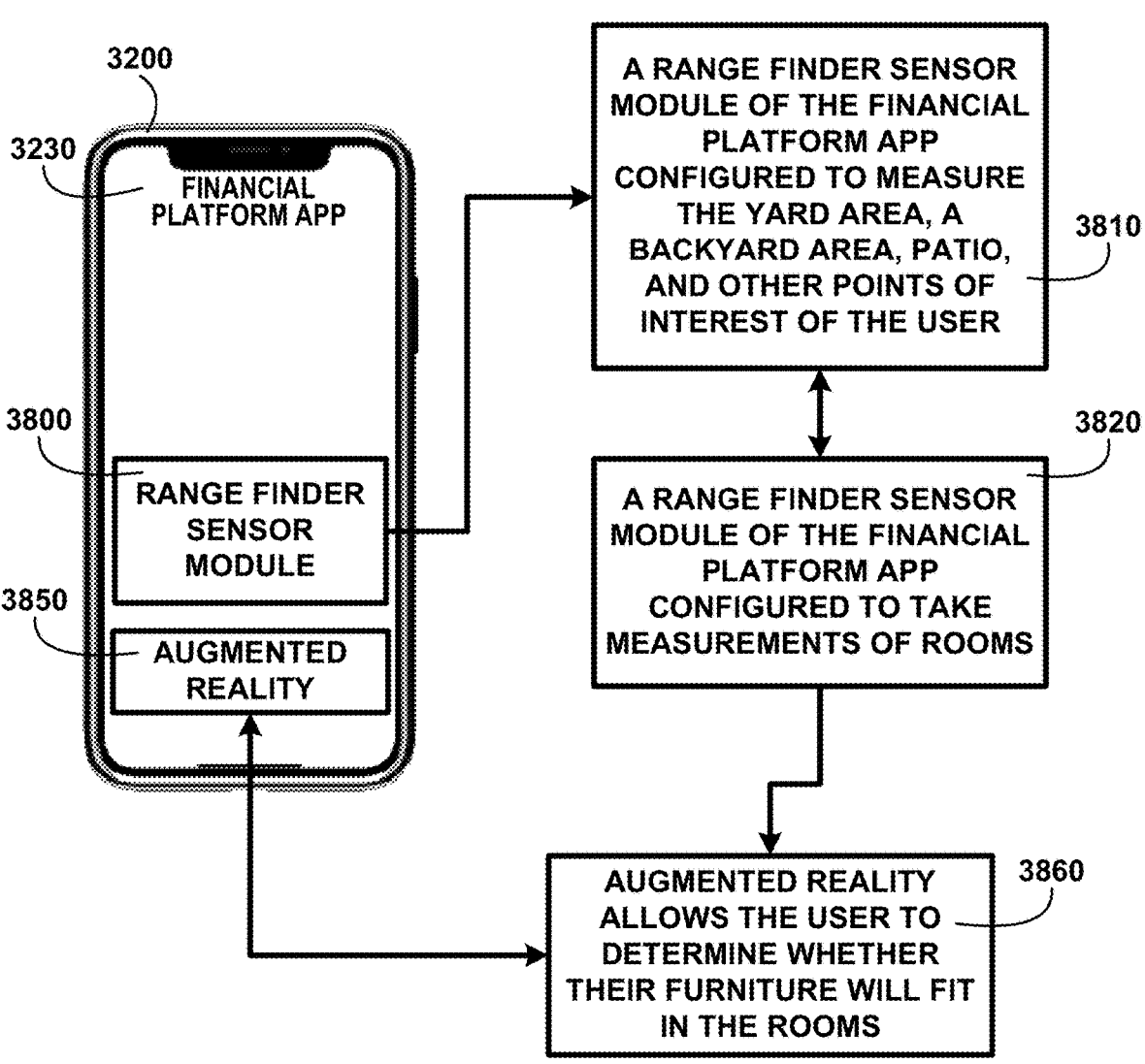

3200

3230

FINANCIAL PLATFORM APP

A RANGE FINDER SENSOR MODULE OF THE FINANCIAL PLATFORM APP CONFIGURED TO MEASURE THE YARD AREA, A BACKYARD AREA, PATIO, AND OTHER POINTS OF INTEREST OF THE USER

3810

3800

RANGE FINDER SENSOR MODULE

A RANGE FINDER SENSOR MODULE OF THE FINANCIAL PLATFORM APP CONFIGURED TO TAKE MEASUREMENTS OF ROOMS

3820

3850

AUGMENTED REALITY

AUGMENTED REALITY ALLOWS THE USER TO DETERMINE WHETHER THEIR FURNITURE WILL FIT IN THE ROOMS

REAL ESTATE NAVIGATION SYSTEM FOR REAL ESTATE TRANSACTIONS

CROSS-REFERENCE TO RELATED APPLICATIONS

This patent application is a continuation-in-part application based on pending U.S. Non-Provisional patent application Ser. No. 17/968,045 filed Oct. 18, 2022, entitled "TRANSMISSION PLATFORM METHOD AND DEVICES", by Karin M. Somoza, which is a continuation-in-part of the, U.S. Non-Provisional patent application Ser. No. 17/829,210 filed on May 31, 2022, entitled "KINETIC ENERGY TRANSFERENCE DEVICE METHOD AND DEVICES", by Karin M. Somoza, which is a continuation of the, U.S. Non-Provisional patent application Ser. No. 17/488,020 filed on Sep. 28, 2021, entitled "KINETIC ENERGY TRANSFERENCE DEVICE METHOD AND DEVICES", by Karin M. Somoza, the U.S. patent applications and U.S. patents being incorporated herein by reference.

BACKGROUND

Modern combustion engines have narrow operating ranges where they are either the most efficient or produce the most power. Electric motors also have efficient operating ranges although they are broader than combustion engines. Matching the best performance of engines or motors with the desired needs means auto manufacturers use Lex and expensive multi-speed transmissions or none at all in many EVs. The best way to match the efficiency of engines and motors with needs is with a Continually Variable Transmission but current designs can be very inefficient due to their need to use friction to create the variable ratios needed. The inefficiency of other CVTs negates gains from the use of a CVT when applied to moderate to high horsepower applications.

BRIEF DESCRIPTION OF THE DRAWINGS

FIG. 4 shows a block diagram of an overview of a speed and force control module of one embodiment.

FIG. 6A shows for illustrative purposes only an example of a lobed disc of one embodiment.

FIG. 6B shows for illustrative purposes only an example of a lobed disc coupled to a planetary gear set from the gear set perspective of one embodiment.

FIG. 6C shows for illustrative purposes only an example of a lobed disc coupled to a planetary gear set from the lobed disc perspective of one embodiment.

FIG. 8 shows a block diagram of an overview of primary kinetic source combustion engines on automobiles of one embodiment.

FIG. 11 shows for illustrative purposes only an example of a primary kinetic source of one embodiment.

FIG. 16 shows a block diagram of an overview of additional applications and features of one embodiment.

FIG. 17 shows a block diagram of an overview of a multiple-axis mechanism of one embodiment.

FIG. 18 shows a block diagram of an overview of the KETD features of one embodiment.

FIG. 35 shows a block diagram of an overview of a financial platform lease agreement of one embodiment.

FIG. 37 shows a block diagram of an overview of transaction validation token functions of one embodiment.

FIG. 38 shows for illustrative purposes only an example of a range finder module of one embodiment.

DETAILED DESCRIPTION OF THE INVENTION

In the following description, reference is made to the accompanying drawings, which form a part hereof, and in which are shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a real estate navigation system for real estate transactions are described for illustrative purposes and the underlying system can apply to any number and multiple types of real estate. In one embodiment of the present invention, the real estate navigation system for real estate transactions can be configured using an electronic control box. The real estate navigation system for real estate transactions can be configured to include a navigation system and can be configured to include a digital trust using the present invention.

The terms "transaction validation tokens (TVT)" and "tokenized value tokens (TVT)" used herein are used interchangeably without any change in meaning.

Figure 1:
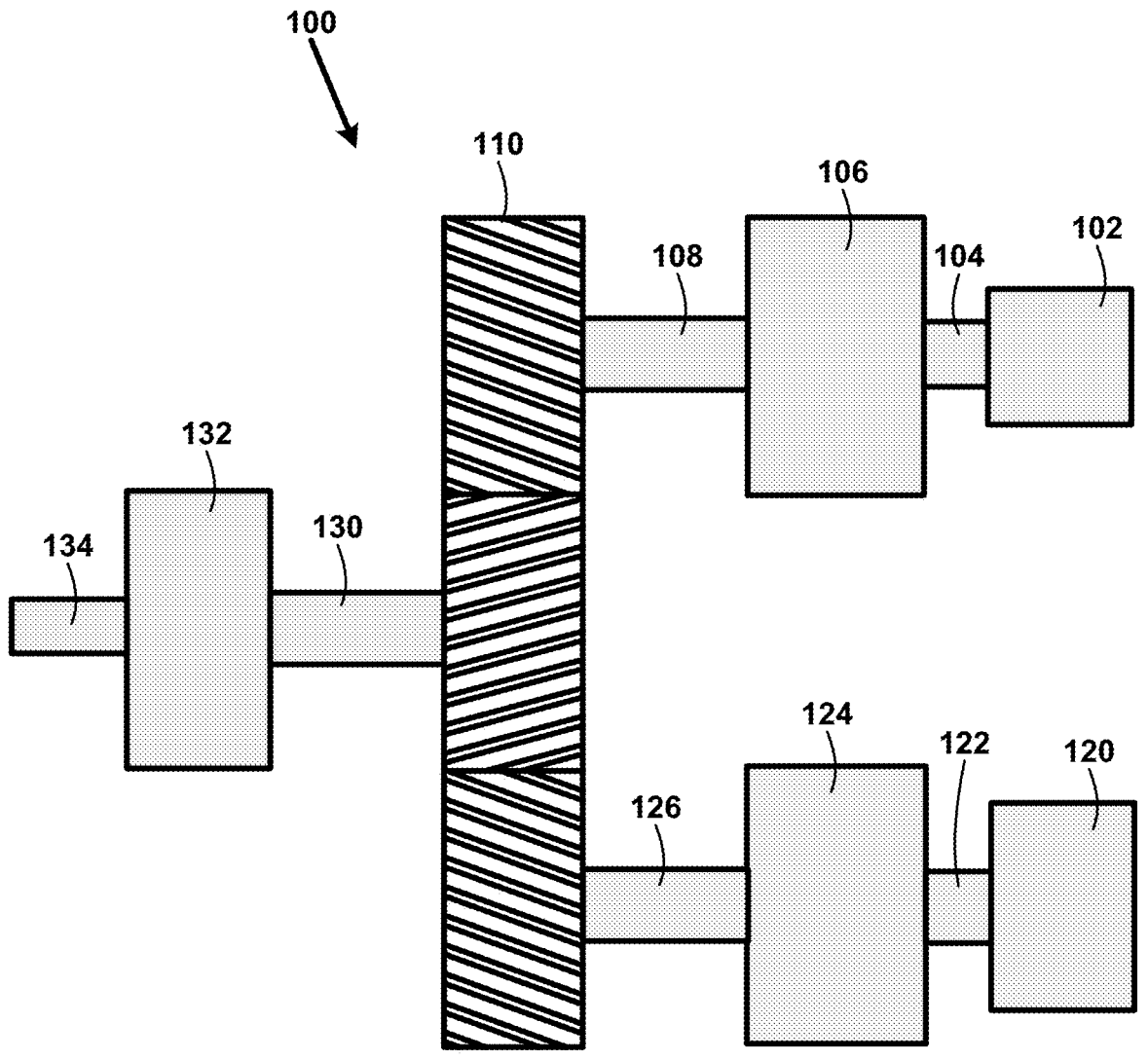
FIG. 1 shows for illustrative purposes only an example of a kinetic energy transference device of one embodiment.

FIG. 1 shows for illustrative purposes only an example of a kinetic energy transference device of one embodiment. FIG. 1 shows a kinetic energy transference device 100 with a primary kinetic source, for example, a gas engine 102 transferring force through the primary kinetic source axle 104 of FIG. 1 to CVT planetary gear system and gate #1 106. The transferred force is input #1 108 which is transferred to a planetary gear set 110. The transferred force is stored in the flywheel storage system 120 through the CVT planetary gear system secondary kinetic axle 122 and gate #2 124 in one instance. In another instance, force is transferred from the flywheel storage system 120 through the CVT planetary gear system and gate #2 124 to INPUT #2 axle 126 to the planetary gear set 110.

In one embodiment from the planetary gear set 110 force (kinetic energy) is transferred to an automobile wheel 134 through an output automobile wheel 130 axle through a CVT planetary gear system and gate #3 132. In another embodiment force (kinetic energy) is transferred from the automobile wheel 134 through the CVT planetary gear system and gate #3 132 and output automobile wheel 130 axle to the planetary gear set 110. This force is stored in the flywheel storage system 120 in one embodiment.

The kinetic energy transference device (KETD) 100 is integrated into a continually variable transmission (CVT) planetary gear system 110. A primary kinetic source is coupled to the primary kinetic source axle 104. The primary kinetic source axle 104 is coupled to the primary kinetic source transfer gear. A first speed-governed kinetic energy transfer gear coupled to the first-speed governor transfers the measured amount of kinetic energy needed to provide the most efficient use of the energy for a first operation through the first speed-governed kinetic energy axle.

The excess speed is always transferred into the moving gate. This moving gate flows at the speed that is subtracted from the input speed to provide the desired output speed. No excess speed leaves the CVT planetary gear system. The speed is divided into two paths, with one being the speed of the gate and the other being to flow out to the desired load. The first computer-controlled module analyses the kinetic energy imparted from the primary kinetic source and the kinetic energy needed to provide the most efficient use of the energy for a first operation to determine the measured amount of kinetic energy to transfer through the first speed governor. The measured amount of kinetic energy determined is transmitted to the first speed governor. The first speed governor adjusts the kinetic energy control devices to impart the measured amount of kinetic energy to the first speed-governed kinetic energy axle.

Data received from the second operation system is processed in the second computer-controlled module and analyzed to determine the current kinetic energy needed for the second operation. The second speed governor makes adjustments in the kinetic energy control devices to transfer additional kinetic energy to the second operation system. The additional kinetic energy from the stored kinetic energy is transferred from the KETD flywheel surplus kinetic energy transfer gear to a second speed-governed kinetic energy transfer gear coupled to a second speed-governed etic energy axle.

The KETD flywheel surplus kinetic energy transfer gear is coupled to the third computer-controlled module that is coupled to the KETD flywheel surplus kinetic energy axle. The third computer-controlled module receives data from the first computer-controlled module and the second computer-controlled module. The data received from the two modules is analyzed by the third computer-controlled module to determine how much surplus kinetic energy to transfer to one of the operations of one embodiment.

DETAILED DESCRIPTION

Figure 2:
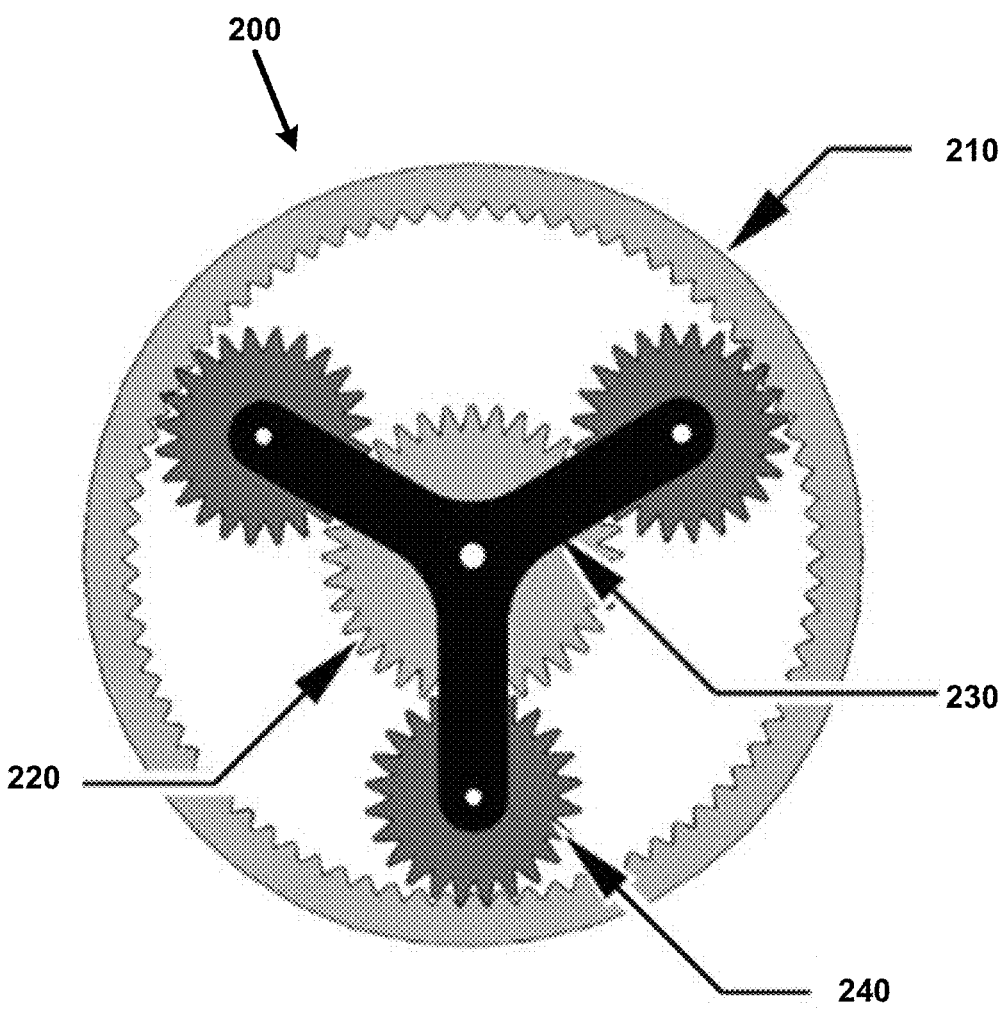
FIG. 2 shows for illustrative purposes only an example of a planetary gear system of one embodiment.

FIG. 2 shows for illustrative purposes only an example of a planetary gear system of one embodiment. FIG. 2 shows a planetary gear system 200 forming a kinetic energy transfer gear set connected to the CVT planetary gear system 110 of FIG. 1. A sun gear 220 is connected to the input side of the CVT planetary gear system 110 of FIG. 1 and each planet gear 240. A planetary carrier 230 is connected to the output side of the CVT planetary gear system 110 of FIG. 1 and each planet gear 240. A ring gear 210 is connected to the Speed Governor. The speed of the sun gear 220 (input) minus the speed of the ring gear 210 also referred to as a speed governor equals the speed of the planetary carrier 230 (Output). This calculation assumes the gears are equal in size. A change in the proportion of the gears will change the ratio but the overall effect is the same.

Figure 3A:
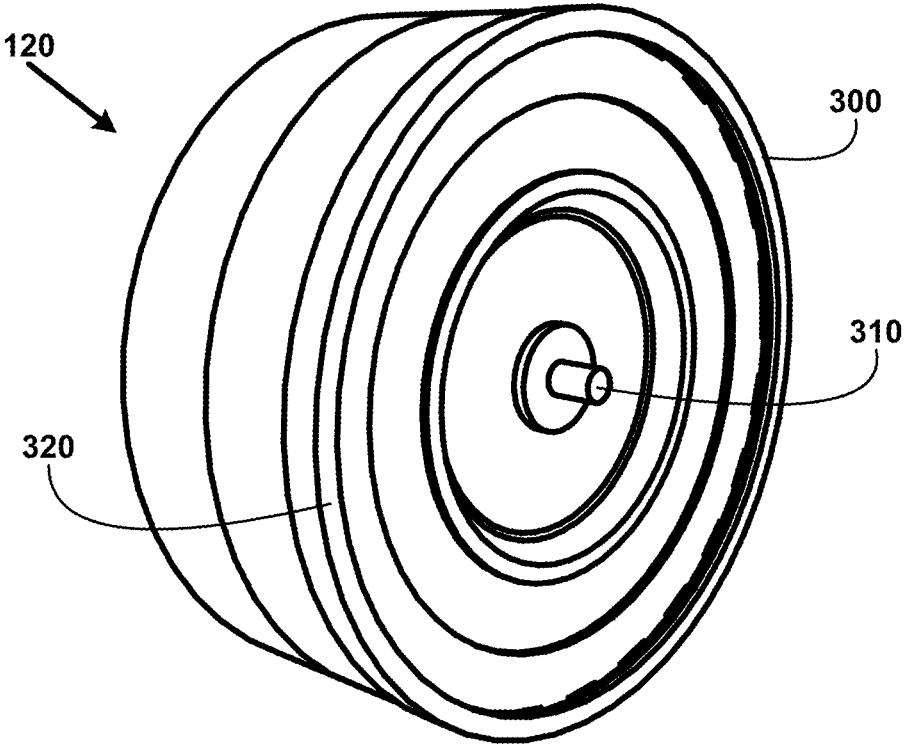
FIG. 3A shows for illustrative purposes only an example of a flywheel storage system of one embodiment.

Flywheel Storage System:

FIG. 3A shows for illustrative purposes only an example of a flywheel storage system of one embodiment. FIG. 3A shows a flywheel storage system 120 in a flywheel containment 300 housing. The flywheel containment 300 housing includes an airtight case 320 allowing a vacuum to be created inside flywheel containment housing 300. A flywheel axle 310 is rotated with a speed and force delivered through a coupled planetary gear system 200 of FIG. 2 kinetic energy transfer drive train of one embodiment.

The primary kinetic energy source of the flywheel storage system 120 of FIG. 1. The flywheel storage system 120 of FIG. 1 is coupled to the continually variable transmission (CVT) planetary gear system 110 of FIG. 1. The CVT planetary gear system 110 of FIG. 1 is integrated with a multiple-axis mechanism kinetic energy transference device. The multiple-axis mechanism kinetic energy transference devices include multiple gates or speed governors, wherein each is configured to include a computer-controlled module. The computer-controlled modules process operational data to determine the most efficient use of the kinetic energy for each operation.

The measured most efficient use amount of the kinetic energy for each operation is transmitted to the multiple gates or speed governors. The multiple gates or speed governors make adjustments in speed many times a second. The adjusted speed transfer of the measured amount of kinetic energy for each operation is made through multiple gears and output shafts/drive shafts to serve each operation. Surplus kinetic energy not needed for operations is stored in the flywheel storage system of one embodiment.

Figure 3B:
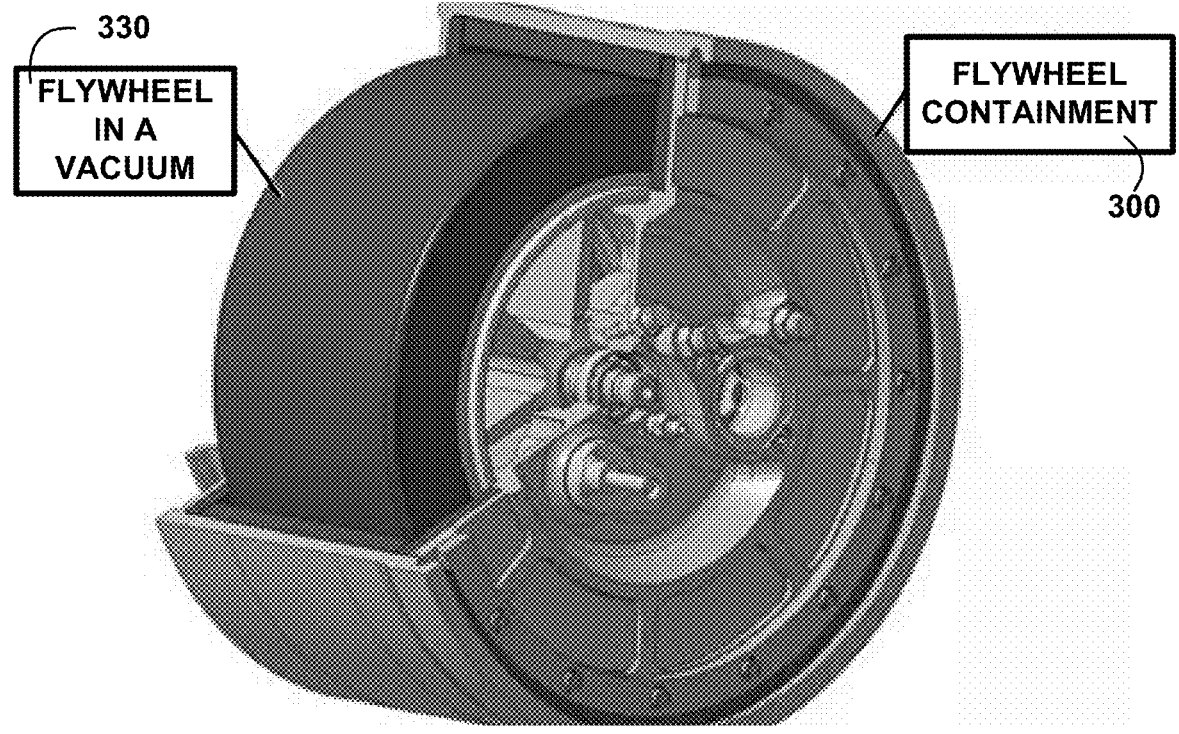
FIG. 3B shows for illustrative purposes only an example of a vacuum-sealed flywheel storage system of one embodiment.

Flywheel in a Vacuum:

FIG. 3B shows for illustrative purposes only an example of a vacuum-sealed flywheel storage system of one embodiment. FIG. 3B shows a cut-away of the flywheel containment 300 housing. The cut-away of the flywheel containment 300 housing reveals a flywheel in a vacuum 330. The creation of the vacuum surrounding the flywheel reduces drag that would be caused by air within the airtight case 320 of FIG. 3A increasing the efficiency of the flywheel of one embodiment.

Speed and Force Control Module:

FIG. 4 shows a block diagram of an overview of a speed and force control module of one embodiment. FIG. 4 shows a speed and force control module 400. The computerized speed control module measures force and speed 410. Measuring force and speed allows the primary kinetic energy source to provide energy in the most efficient means 420. In instances where energy is desired to be recovered, the speed and force control module controls the gate speed and force to transfer energy from the output shaft back to the primary kinetic energy source 430. The speed and force control module calculates the desired energy values and makes adjustments in force and speed, many times a second to provide the most efficient use of energy from the source 440 of one embodiment.

In a system that only has an engine (power source) and an output (Automobile wheel), only one CVT planetary gear system is required since there is only one path energy that can travel between the power source and automobile wheel. Regardless of which direction the energy is flowing, it can only flow through one path.

In a system where a third input/output is added, two more CVT planetary gear systems are required to cover the 2 additional paths to function with the one added force source. For example, in a system with an engine (Gas), a Flywheel storage system 120 of FIG. 1, and an automobile wheel, three CVT planetary gear systems are needed for the three different paths energy can flow. Path 1: Energy can run from the Engine to the Automobile wheel and back if needed. Path 2: Energy can run from the Engine to the Flywheel and back if needed. Path 3: Energy can run from the Flywheel to the Automobile wheel and back if needed.

There is a need for each source to have a CVT planetary gear system 120 of FIG. 1 because, to force energy into the desired location, the gate on the side that is not accepting or delivering the energy needs to be resisting and at a higher level than the receiving side. If you are directing energy being recovered from the Automobile wheel into the Flywheel, the Gate on the Engine side must be resisting at a higher level than the flywheel to force that energy into the flywheel.

When working with two or more CVT planetary gear systems with their corresponding Gate control module, a Master Control Module must be in place to correspond with the different gate controls. Continuous monitoring of the energy demands and availability is needed to properly set the correct gate speed and force of the different CVT planetary gear system 120 of FIG. 1 gates to properly direct the transference of energy to and from its desired locations. Each CVT planetary gear system 120 of FIG. 1 is controlled by its force control module. Each force control module is controlled by a Master Control Module. The master control module sets the speed and/or pressure of the CVT planetary gear system speed governors/gates to direct the energy in the direction desired. Other embodiments include an electric motor/generator in place of the gas engine with batteries to store and deliver energy.

A first-speed-governed kinetic energy transfer gear coupled to the first-speed governor 842 of FIG. 8 transfers the measured amount of kinetic energy needed to provide the most efficient use of the energy for a first operation through the first-speed governed kinetic energy axle 844 of FIG. 8. The excess speed not needed for the first operation is transferred out a separate path to a KETD flywheel surplus kinetic energy transfer gear. The first computer-controlled module 840 of FIG. 8 includes the first digital processor and the first transceiver.

Figure 7:
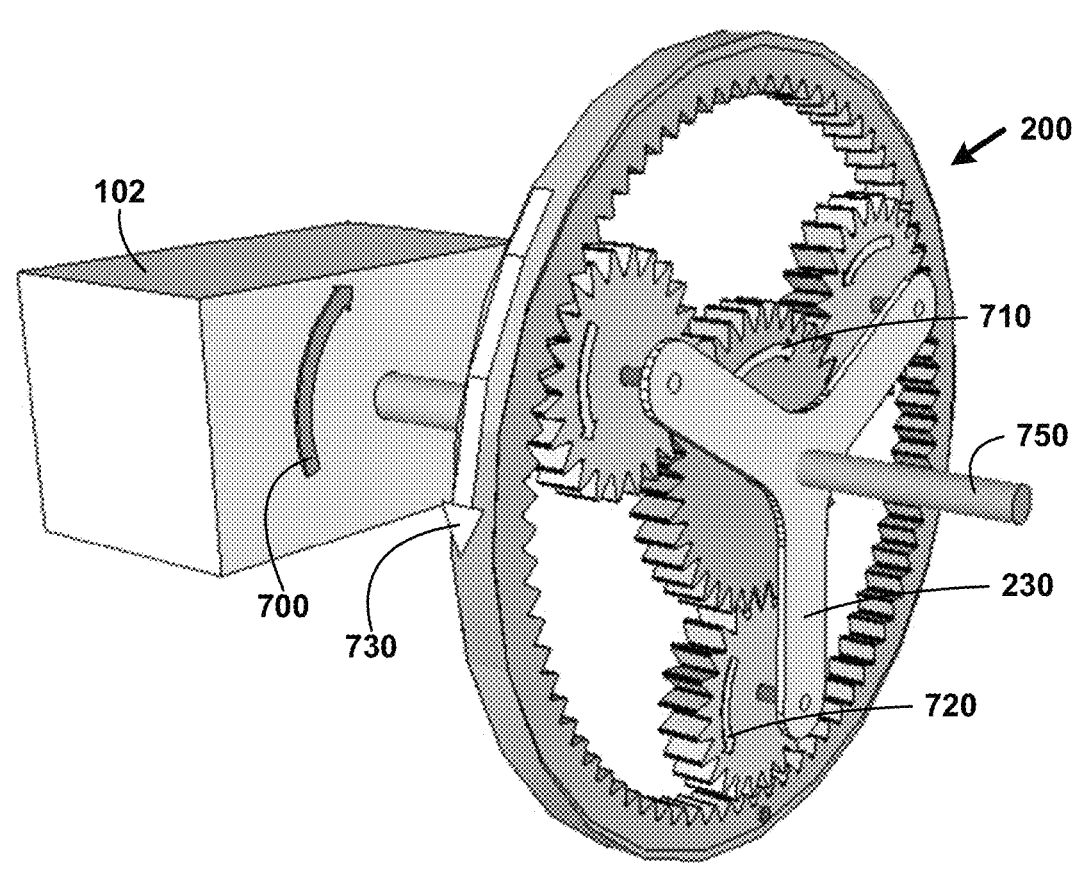
FIG. 7 shows for illustrative purposes only an example of planetary gear set movement of one embodiment.

The first computer-controlled module 840 of FIG. 8 using the first digital processor analyses the kinetic energy imparted from the primary kinetic source 700 of FIG. 7 and the kinetic energy needed to provide the most efficient use of the energy for a first operation to determine the measured amount of kinetic energy to transfer through the first-speed governor 842 of FIG. 8. The measured amount of kinetic energy determined is transmitted using wirelessly bidirectional signals from a first transceiver to the first-speed governor 842 of FIG. 8. The first-speed governor 842 of FIG. 8 adjusts the kinetic energy control devices to impart the measured amount of kinetic energy to the first speed-governed kinetic energy axle 844 of FIG. 8.

Data is received through a second transceiver from the second operation system. The data provided is processed in the second computer-controlled module 850 of FIG. 8 where a second digital processor analyses the current kinetic energy needed for the second operation and existing kinetic energy being received to determine if additional kinetic energy is needed or whether the existing kinetic energy being received is more than the current kinetic energy needed creating a surplus of kinetic energy.

The determination of a shortfall or surplus is transmitted in this instance over hard-wired cabling instead of using the second-speed governor 852 of FIG. 8 installed transceiver. The second-speed governor 852 of FIG. 8 makes adjustments in the kinetic energy control devices to in one embodiment transfer additional kinetic energy to the second operation system, for example, a braking system through the second speed governed kinetic energy axle 854 of FIG. 8.

In another embodiment, a transfer of the surplus kinetic energy from the second operation system to the second speed-governed kinetic energy transfer gear is made through the second speed-governed kinetic energy axle 854 of FIG.

8. In the latter instance, any surplus kinetic energy obtained from the second operation is transferred from the second speed-governed kinetic energy transfer gear to the KETD flywheel surplus kinetic energy transfer gear.

The KETD flywheel surplus kinetic energy transfer gear is coupled to the third computer-controlled module that is coupled to the KETD flywheel surplus kinetic energy axle. The third computer-controlled module includes a third digital processor and a third transceiver. The third transceiver receives data from the first computer-controlled module 840 of FIG. 8 and the second computer-controlled module 850 of FIG. 8. The data received from the two modules is analyzed by the third digital processor to determine where and how much kinetic energy to transfer surplus kinetic energy and how much surplus kinetic energy is coming from the two sources if applicable of one embodiment. The description continues in FIG. 5.

Figure 5:
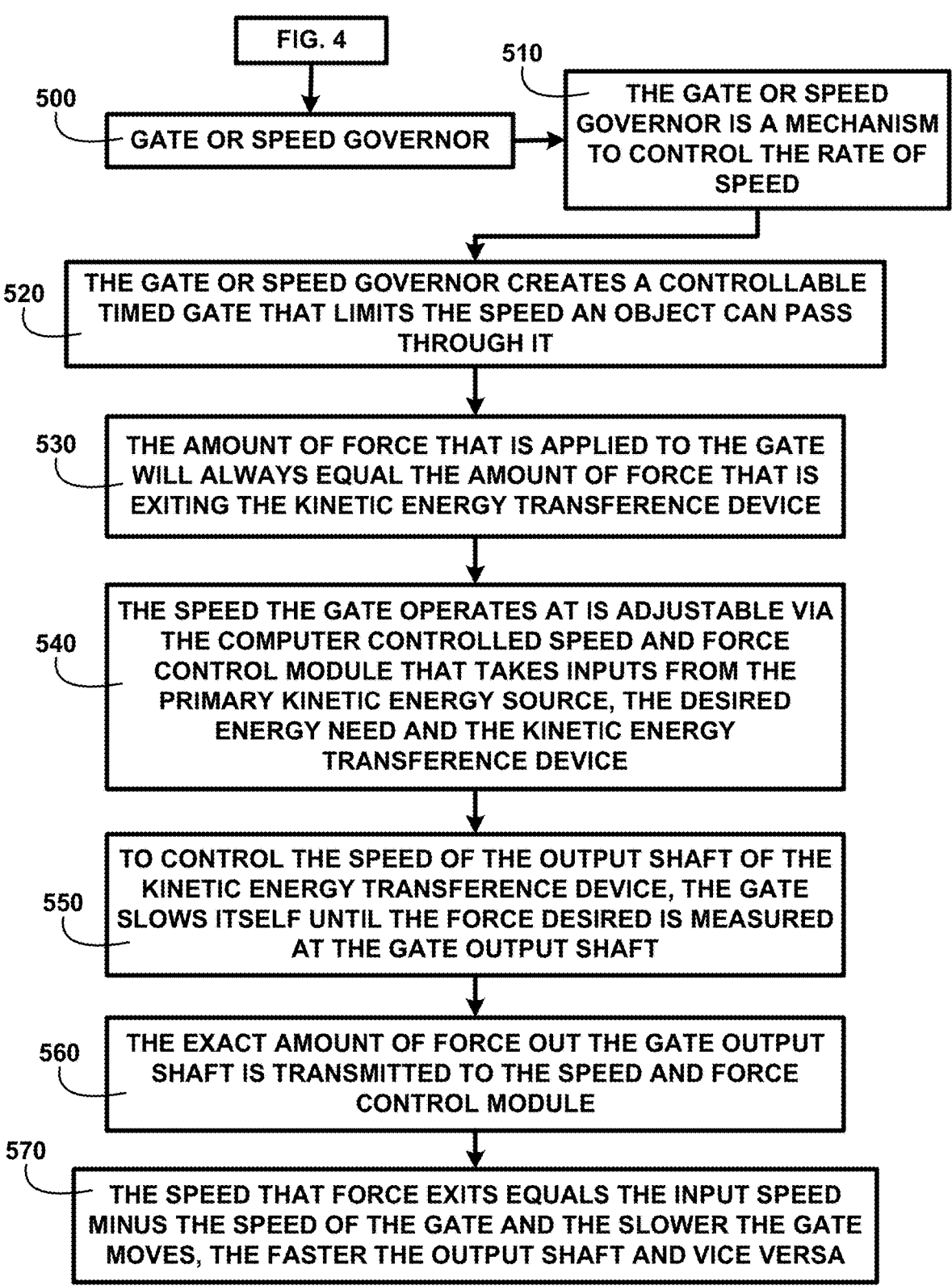
FIG. 5 shows a block diagram of an overview of a gate or speed governor of one embodiment.

Gate or Speed Governor:

FIG. 5 shows a block diagram of an overview of a gate or speed governor of one embodiment. FIG. 5 shows a continuation from FIG. 4 showing a gate or speed governor 500. The gate or speed governor is a mechanism to control the rate of speed 510. The gate or speed governor creates a controllable timed gate that limits the speed an object can pass through it 520. The amount of force that is applied to the gate will always equal the amount of force that is exiting the kinetic energy transference device 530. The speed the gate operates is adjustable via the computer-controlled speed and force control module that takes inputs from the primary kinetic energy source, the desired energy needs, and the kinetic energy transference device 540.

To control the speed of the output shaft of the kinetic energy transference device, the gate slows itself until the force desired is measured at the gate output shaft 550. The exact amount of force out the gate output shaft is transmitted to the speed and force control module 560. The speed that forces exits equals the input speed minus the speed of the gate and the slower the gate moves, the faster the output shaft and vice versa 570 of one embodiment.

A Lobed Disc:

FIG. 6A shows for illustrative purposes only an example of a lobed disc of one embodiment. FIG. 6A shows a lobed disc 600 used in transferring kinetic energy from, for example, a wheel to a planetary gear set of one embodiment.

FIG. 6B shows for illustrative purposes only an example of a lobed disc coupled to a planetary gear set from the gear set prospective of one embodiment. FIG. 6B shows a lobed disc coupled to a planetary gear set from the gear set prospective. The lobed disc 600 is connected to the planetary gear system 200 forming a kinetic energy transfer gear set connected to the CVT planetary gear system 110 of FIG. 1. The lobed disc, when speed and force are applied to the lobed disc, transfers kinetic energy with a rod coupled to the ring gear 210 of the planetary gear set of one embodiment.

FIG. 6C shows for illustrative purposes only an example of a lobed disc coupled to a planetary gear set from the lobed disc prospective of one embodiment. FIG. 6C shows a lobed disc coupled to a planetary gear set from the lobed disc prospective. The lobed disc 600 is connected to the planetary gear system 200 forming a kinetic energy transfer gear set connected to the CVT planetary gear system 110 of FIG. 1. A rotating lobed disc transfers the speed and force of its rotation to the ring gear 210. In one instance the speed and force energy transferred to the ring gear 210 is further transferred to the flywheel of one embodiment.

The Planetary Gear Set Movement:

FIG. 7 shows for illustrative purposes only an example of planetary gear set movement of one embodiment. FIG. 7 shows planetary gear set movement when speed and force of kinetic energy are transferred for a primary energy source. Seen are the different movements when the input is moving. The input in this instance is the primary kinetic source, for example, a gas engine 102 turning in this example in a gas engine clockwise direction 700. The planetary gear system 200 forms a kinetic energy transfer gear set. The primary kinetic source energy is transferred to the sun gear 220 of FIG. 2 which rotates also in a sun gear clockwise direction 710. The sun gear clockwise direction 710 is transferred to each planet gear 240 of FIG. 2 that rotates in a planetary carrier 230 of FIG. 2 counterclockwise direction 720.

The planetary carrier 230 of FIG. 2 counter-clockwise direction 720 rotates the ring gear 210 of FIG. 2 in a ring gear counter-clockwise direction 730. Each planet gear 240 of FIG. 2 is coupled to the planetary carrier 230 that remains stationary. The CVT kinetic force is input into the sun gear and that force is split between the ring gears. The CVT is the speed governor, and the planetary carrier 230 is the output. The speed/force minus the speed/force to the ring gear equals the speed/force that exits the carrier shaft 750. All the planet gears 240 of FIG. 2 move the planetary carrier 230 of FIG. 2 and do not enter the equation.

The force/speed can enter through the input/sun gear 220 of FIG. 2 or through the carrier shaft 750 when a car is decelerating. The ring gear controls which direction that force/speed goes, either into the ring gear or to the sun gear. When the CVT is connected to a Flywheel storage device, the energy can either come from it through the sun gear 220 of FIG. 2 or can be input back into it through the same gear. Depending on if the auto is accelerating or decelerating of one embodiment.

Primary Kinetic Source Combustion Engines on Automobiles:

FIG. 8 shows a block diagram of an overview of primary kinetic source combustion engines on automobiles of one embodiment. FIG. 8 shows combustion engines on automobiles are most efficient at certain RPM speeds, but their uses require the power to be delivered at variable RPM speeds of 800. In one embodiment, combustion engines on automobiles are a group of primary kinetic sources 802. A primary kinetic source axle 104 is coupled to a flywheel storage system 120. A flywheel is used for a kinetic energy transference device (KETD) 100 in a kinetic energy recovery system 810.

The first computer-controlled module 840 is electronically coupled to a first-speed governor 842. The first-speed governor 842 is coupled to the kinetic energy transference device (KETD) 100 and to a first-speed governed kinetic energy axle 844. The first speed-governed kinetic energy axle 844 is coupled to an automobile drive train 820 and is a mechanism to control the rate of speed of the automobile drive train 820.

A second computer-controlled module 850 is electronically coupled to a second-speed governor 852. The kinetic energy recovery system 810 determines any excess kinetic energy not needed by the automobile drive train 820. The excess kinetic energy determined is passed through to a second speed-governed kinetic energy axle 854 for transference to an automobile braking system 830 of one embodiment.

Figure 9:
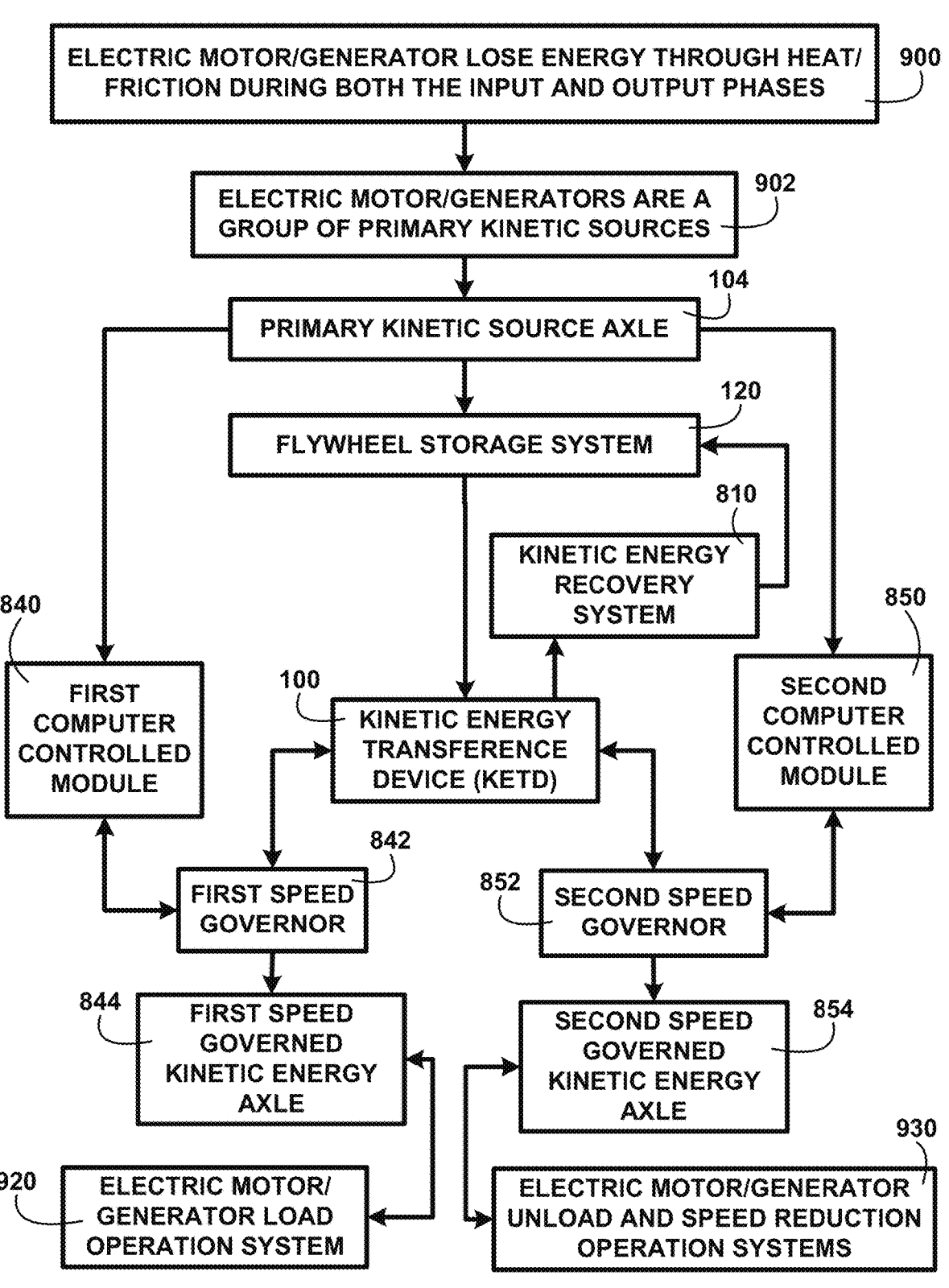
FIG. 9 shows a block diagram of an overview of the primary kinetic source electric motor/generator of one embodiment.

Primary Kinetic Source Electric Motor/Generator:

FIG. 9 shows a block diagram of an overview of the primary kinetic source electric motor/generator of one embodiment. FIG. 9 shows electric motor/generator loses energy through heat/friction during both the input and output phases 900. In one embodiment, electric motors/generators are a group of primary kinetic sources 902. A primary kinetic source axle 104 is coupled to a flywheel storage system 120. A flywheel is used for a kinetic energy transference device (KETD) 100 in a kinetic energy recovery system 810.

The first computer-controlled module 840 is electronically coupled to a first-speed governor 842. The first-speed governor 842 is coupled to the kinetic energy transference device (KETD) 100 and to a first-speed governed kinetic energy axle 844. The first speed-governed kinetic energy axle 844 is coupled to an electric motor/generator load operation system 920 and is a mechanism to control the rate of speed of the electric motor/generator load operation system 920.

A second computer-controlled module 850 is electronically coupled to a second-speed governor 852. The kinetic energy recovery system 810 determines any excess kinetic energy not needed by the electric motor/generator load operation system 920. The excess kinetic energy determined is passed through to a second speed-governed kinetic energy axle 854 for transference to an electric motor/generator unload and speed reduction operation systems 930 of one embodiment.

Figure 10:
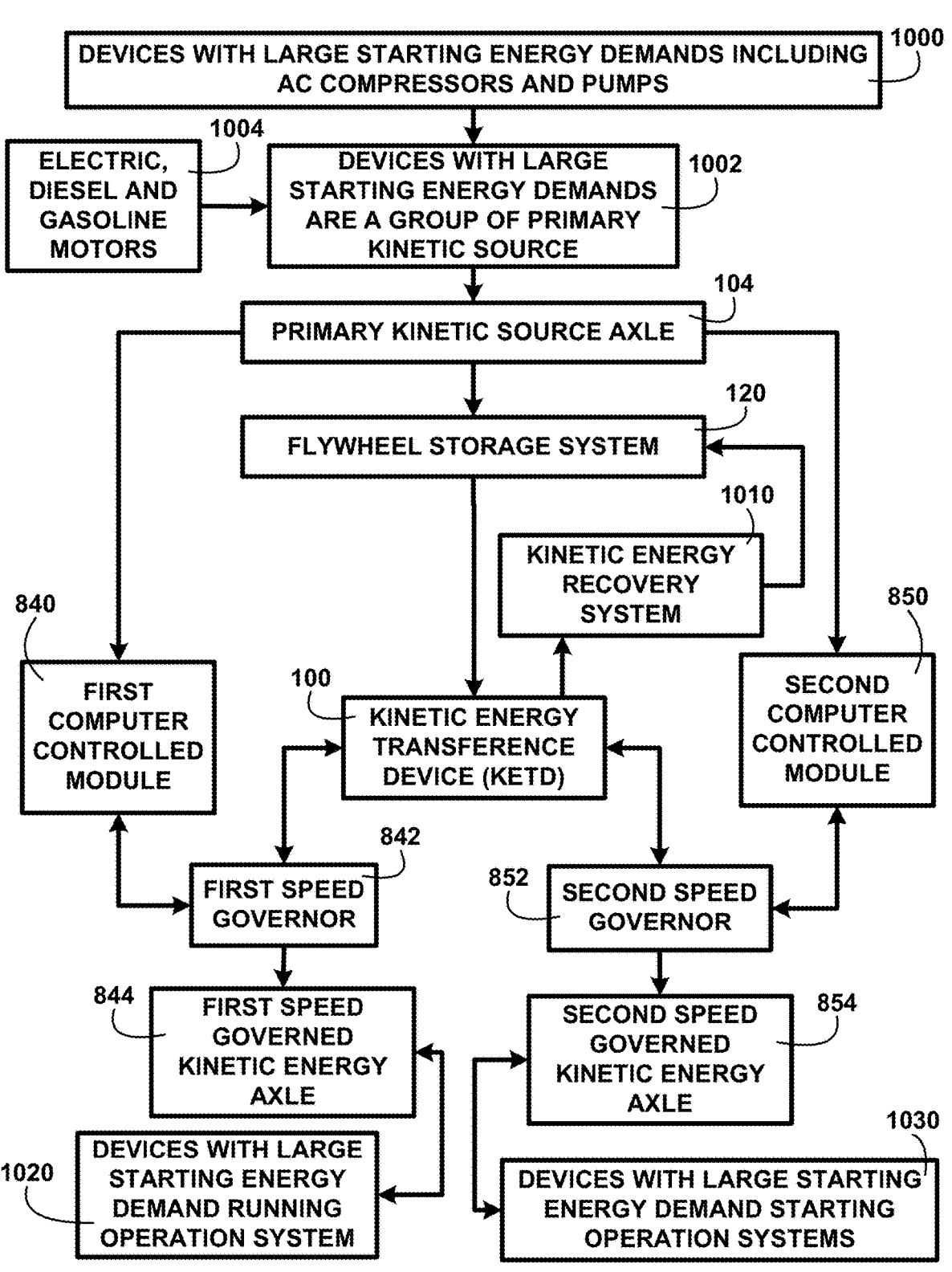
FIG. 10 shows a block diagram of an overview of primary kinetic source devices with large starting energy demands of one embodiment.

Primary Kinetic Source Devices with Large Starting Energy Demands:

FIG. 10 shows a block diagram of an overview of primary kinetic source devices with large starting energy demands of one embodiment. FIG. 10 shows devices with large starting energy demands including AC compressors and pumps 1000 and electric, diesel, and gasoline motors 1004. In one embodiment, devices with large starting energy demands are a group of primary kinetic sources 1002. A primary kinetic source axle 104 is coupled to a flywheel storage system 120. A flywheel is used for a kinetic energy transference device (KETD) 100 in a kinetic energy recovery system 1010.

The first computer-controlled module 840 is electronically coupled to a first-speed governor 842. The first-speed governor 842 is coupled to the kinetic energy transference device (KETD) 100 and to a first-speed governed kinetic energy axle 844. The first speed-governed kinetic energy axle 844 is coupled to devices with large starting energy demand running operation system 1020 and is a mechanism to control the rate of speed of the devices with large starting energy demand running operation system 1020.

A second computer-controlled module 850 is electronically coupled to a second-speed governor 852. The kinetic energy recovery system 1010 determines any excess kinetic energy not needed by the devices with large starting energy demand running operation system 1020. The excess kinetic energy determined is passed through to a second speed-governed kinetic energy axle 854 for transference to devices with large starting energy demand starting operation systems 1030 of one embodiment.

A Primary Kinetic Source:

FIG. 11 shows for illustrative purposes only an example of a primary kinetic source of one embodiment. FIG. 11 shows a kinetic energy source coupled to a flywheel storage device system 1100. The primary kinetic energy source 1110 supplies energy in the form of speed and force that in part may be stored in the flywheel storage system 120. A continually variable transmission (CVT) planetary gear system 1120 is a multiple-axis mechanism kinetic energy transference device 1130. The continually variable transmission (CVT) planetary gear system 1120 includes multiple gates or speed governors, wherein each is configured to include a computer-controlled module 1140.

Computer-controlled modules process operational data to determine the measured most efficient use of the kinetic energy for each operation 1150. The measured most efficient use amount of the kinetic energy for each operation is transmitted to the multiple gates or speed governors 1155. The multiple gates or speed governors make adjustments in speed many times a second 1160. Transfer of the measured amount of the kinetic energy for each operation is made through multiple gears and output shafts/drive shafts to serve each operation 1170. Surplus kinetic energy not needed for operations is stored in the flywheel storage system 1180 of one embodiment.

Figure 12:
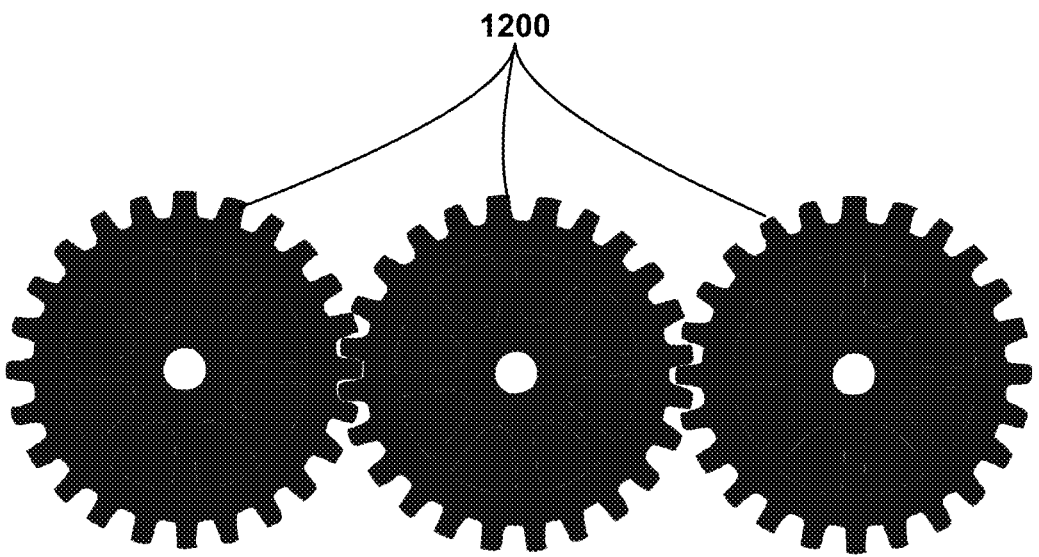
FIG. 12 shows for illustrative purposes only an example of a transfer gears of one embodiment.

Transfer Gears:

FIG. 12 shows for illustrative purposes only an example of a transfer gears of one embodiment. FIG. 12 shows in one embodiment transfer gears 1200 are aligned side to side whereas in another embodiment the transfer gears are configured in a triangular orientation of one embodiment.

Figure 13:
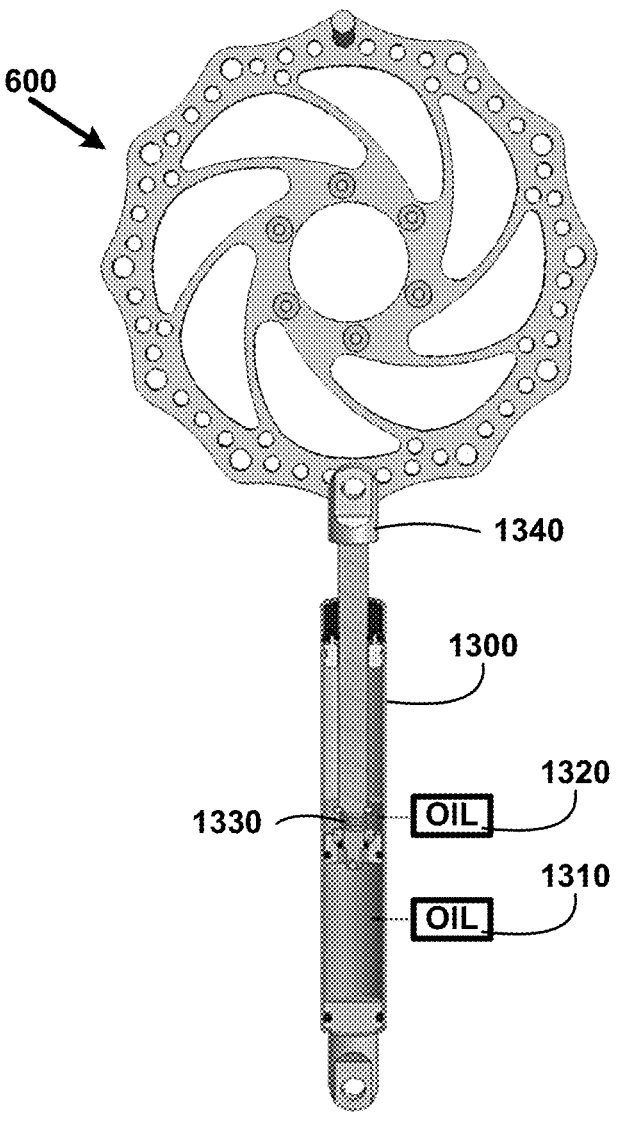
FIG. 13 shows for illustrative purposes only an example of a hydraulic actuator coupled to a lobed disc of one embodiment.

A Hydraulic Actuator 1300 Coupled to a Lobed Disc:

FIG. 13 shows for illustrative purposes only an example of a hydraulic actuator coupled to a lobed disc of one embodiment. FIG. 13 shows a hydraulic actuator 1300 coupled to a lobed disc 600 to transfer kinetic energy. The hydraulic actuator 1300 is also used as a shock absorber in autos. There is a valve 1330 at the end of the rod 1340 inside the chamber which controls the amount of fluid in this instance oil that can pass from beneath the rod 1310 to the area around the rod 1320. By adjusting this valve, the force needed to move the rod up or down becomes easier or harder. To act as a speed governor, this actuator connects to a wheel bearing that rides on the outer edge of the lobed disc 600.

As the disc above rotates, the lobes on the disc cause the actuator to go in and out. By controlling the valve 1330 in the actuator 1300, the force needed for the disc to turn increases or decreases. The greater the force applied to the actuator 1300, the equal amount of force exits the planetary carrier 230 of FIG. 2 of the CVT, and the speed goes with it. This actuator valve can be controlled electronically and adjusted to direct the desired speed or force out the carrier shaft 750 of FIG. 7. The CVT control module takes input from the speed entering the CVT, the force that is being applied, the desired speed and force being called for, and the current speed force exiting the output/carrier shaft 750 of FIG. 7 of one embodiment.

Figure 14A:
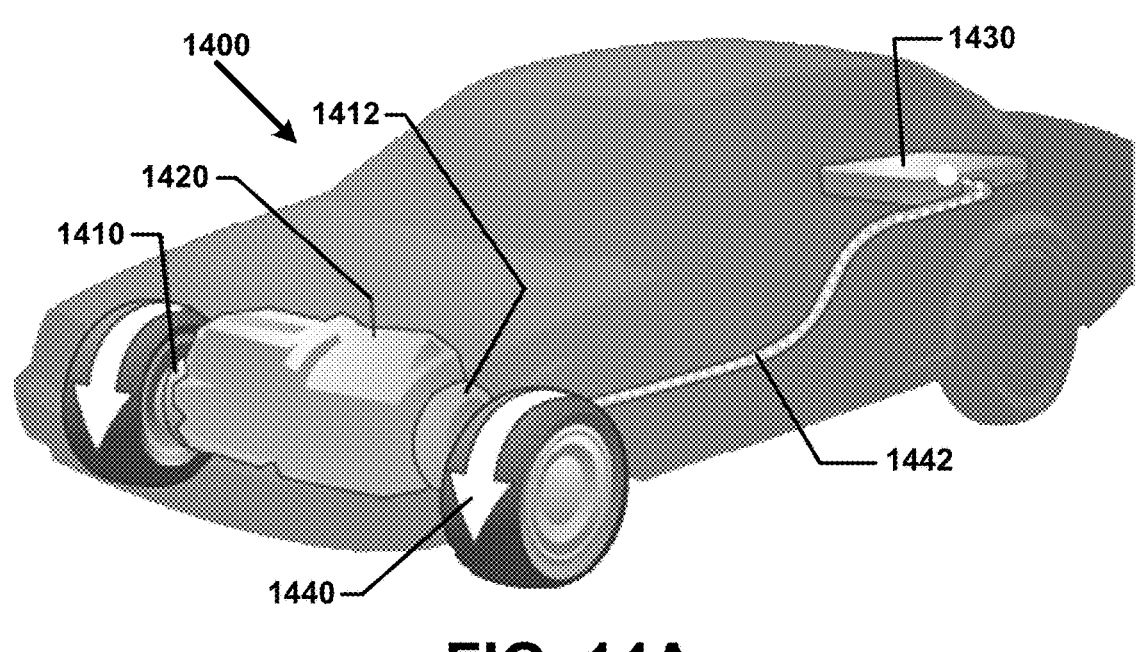
FIG. 14A shows for illustrative purposes only an example of a hybrid automobile regenerative brakes of one embodiment.

Hybrid Automobile Regenerative Brakes:

FIG. 14A shows for illustrative purposes only an example of a hybrid automobile regenerative brakes of one embodiment. FIG. 14A shows a hybrid automobile with regenerative brakes 1400. A right electric motor 1410 and at times a gasoline engine 1420 and a left electric motor 1412 provide power to the front wheels. Kinetic brake energy 1440 is developed when decelerating or stopping.

The kinetic brake energy 1440 is fed back to the battery 1430. The kinetic energy transference device 100 of FIG. 1 reduces the energy consumed for actual deceleration and stopping and transfers the increased recovered braking energy 1442 to the battery 1430 of one embodiment.

Figure 14B:
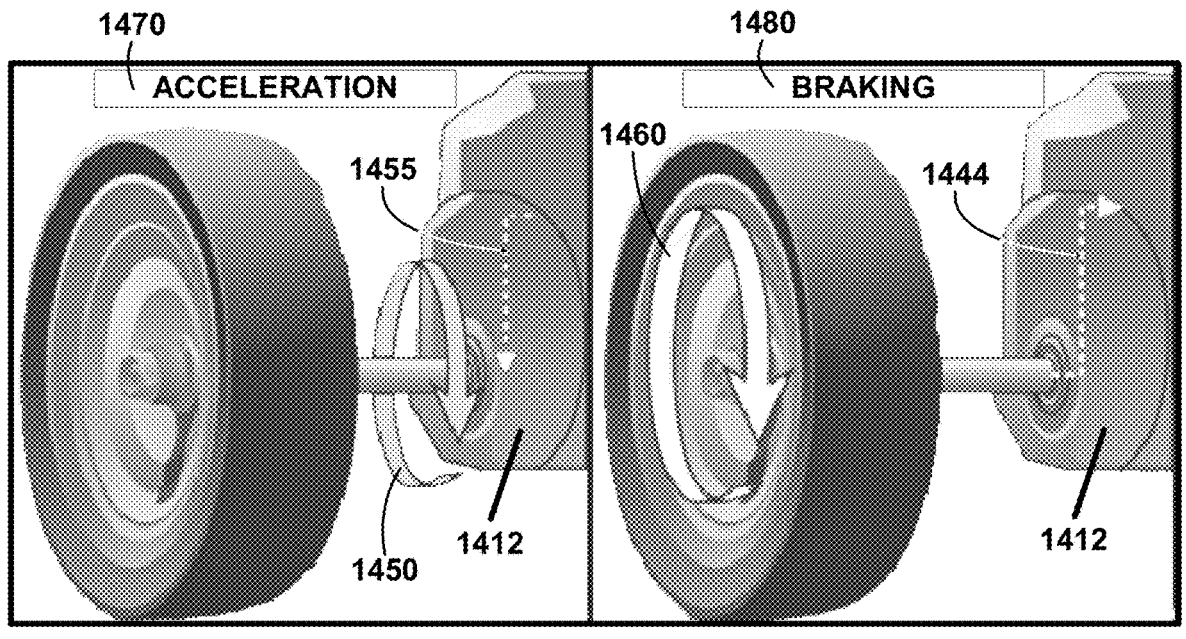
FIG. 14B shows for illustrative purposes only an example of acceleration and braking for hybrid automobile regenerative brakes of one embodiment.

FIG. 14B shows for illustrative purposes only an example of acceleration and braking for hybrid automobile regenerative brakes of one embodiment. FIG. 14B shows in the left panel an example of acceleration 1470. In this example, acceleration 1470 is powered by the left electric motor 1412. Acceleration energy 1450 is supplemented using the stored kinetic energy from the kinetic energy transference device 100 of FIG. 1 thereby reducing the acceleration energy from the left electric motor 1455 of one embodiment.

The right panel shows braking 1480 wherein energy from the left electric motor 1412 is conserved in part and kinetic brake energy 1460 is generated. The kinetic energy transference device 100 of FIG. 1 provides a portion of the braking energy needed reducing the energy needed to decelerate and increasing the recovered braking energy that is transferred 1444 to the battery 1430 of FIG. 14A of one embodiment.

Figure 15A:
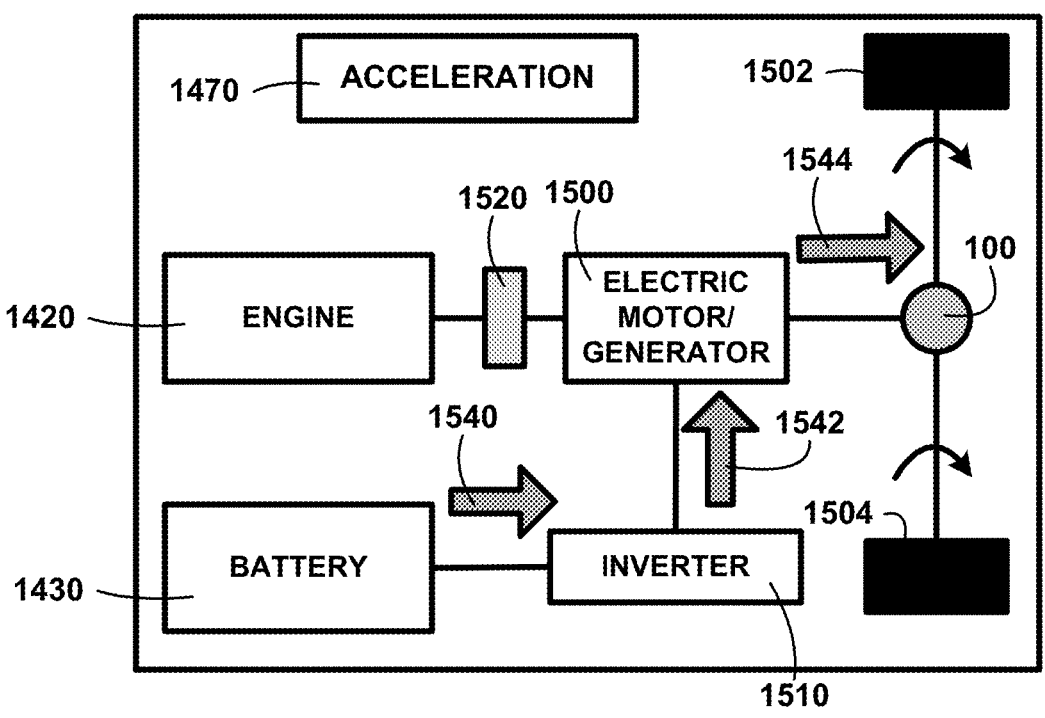
FIG. 15A shows for illustrative purposes only an example of the acceleration kinetic energy flow of one embodiment.

Acceleration Kinetic Energy Flow:

FIG. 15A shows for illustrative purposes only an example of the acceleration kinetic energy flow of one embodiment. FIG. 15A shows how kinetic energy flows, for example, in an automobile during acceleration 1470. Kinetic energy from an engine 1420 is transferred to a clutch 1520 to an electric motor/generator 1500. Additional energy is transferred 1540 from a battery 1430 to an inverter 1510 and transferred 1542 to the electric motor/generator 1500. The combined energy is transferred 1544 to the kinetic energy transference device 100 and split a left drive wheel 1502 and a right drive wheel 1504 of one embodiment.

Figure 15B:
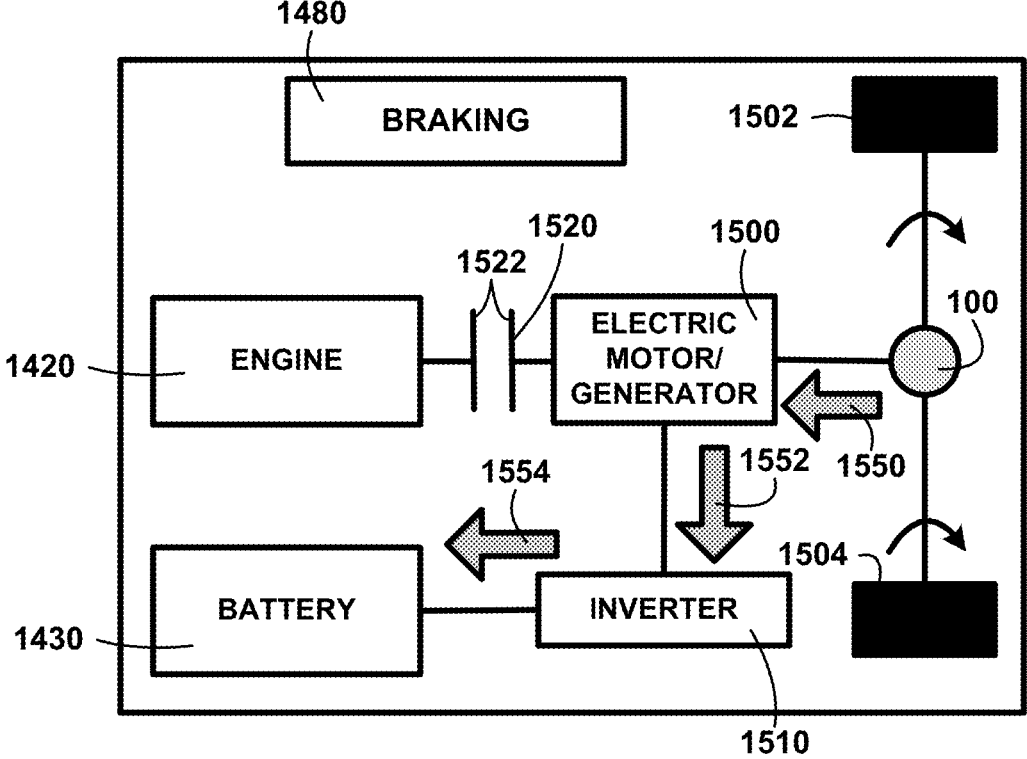
FIG. 15B shows for illustrative purposes only an example of the braking kinetic energy flow of one embodiment.

Braking Kinetic Energy Flow:

FIG. 15B shows for illustrative purposes only an example of the braking kinetic energy flow of one embodiment. FIG. 15B shows how kinetic energy flows, for example, in an automobile during braking 1480. Kinetic energy from an engine 1420 is not transferred 1522 through the clutch 1520 to an electric motor/generator 1500. The kinetic energy generated is transferred 1550 from the left wheel 1502 and right wheel 1504 through the kinetic energy transference device 100. The braking energy generated is converted to electricity in the electric motor/generator 1500. The converted electricity is transferred from 1552 to the inverter 1510. The inverter 1510 regulates the characteristics of the electrical energy and transfers 1554 to the battery 1430 of one embodiment.

The CVT can recover as much energy as it can deliver as that limit is set by the gate or speed governor 500 of FIG. 5 and it does not matter in which direction the energy is flowing. In and out requires the same mechanics so for the same cost to be able to recover 1500 horsepower, the CVT can also supply that much power. If the specifications are for the CVT to be able to recover 1500 horsepower, then it can deliver that much too, and for no additional costs. If the flywheel and CVT can handle 1500 HP input, it can also deliver that much power if desired and for no additional cost.

Additional Applications and Features:

FIG. 16 shows a block diagram of an overview of additional applications and features of one embodiment. FIG. 16 shows additional applications and features of the kinetic energy transference device 100 of FIG. 1. The CVT is configured for the transfer of kinetic energy into either it is desired use, at the most efficient speed, or desired energy storage system, at the most efficient speed 1600.

The CVT includes machine and environmental learning, the CVT system can best direct the most efficient means to either store or immediately use the energy being transmitted through it 1610. Coupling the CVT with a flywheel storage system, or another kinetic or gravitational energy storage system (ESS) improves the efficiency of the ESS due to the properties of providing energy at its most efficient kinetic speed 1620.

The kinetic energy transference device 100 of FIG. 1 has additional applications 1630 other than automobiles. As described regenerative braking energy 1640 of vehicles and equipment that starts and stops recover energy that can reduce starting energy with the stored energy being applied to starting motors to reduce costs, wear, and tear of motors, and save time by shorting the start-up period.

Quick recharging of battery systems 1650 is achieved by applying the stored energy in the recharging system on top of the other energy sources. Reducing start-up time with stored energy augmenting normal power consumption also reduces stress on motors of AC compressors and pumps 1660.

Autonomous driving and charging 1670 is improved by reducing energy consumption and applying stored and recovered energy to extend driving time and distance. An autonomous auto can drive itself to the nearest most efficient charging station at times, not desirable for most humans. Using the CVT and its learning systems, the auto can locate, calculate, and arrive at the most efficient location to recharge its energy storage systems. At the charging station, the CVT system can determine and direct the energy into the most efficient storage system.

Riders of energy-assisted bicycles 1680 do not need to work as hard as the kinetic energy transference device 100 of FIG. 1 will apply stored and recovered energy to add non-rider exerted effort to power the energy-assisted bicycles 1680. Most energy-assisted bicycles use electric motors and chemical batteries to assist. These systems are charged at home and recover energy during their use. Instead of using electric motors and batteries, they can employ the CVT with flywheel storage. Keeping kinetic energy in its form is more efficient than transferring it to and from chemical storage systems. A CVT bicycle system can provide greater range and less weight than other battery/electric systems. Additionally, a CVT with a flywheel bicycle system can convert energy from its rider, through a crank system, to continually collect energy at the desired rate but deliver energy as needed such as the increase in the amount of energy needed for steep inclines.

The same is true for electric motorcycles 1690 with reducing energy consumption and applying stored and recovered energy to extend driving time and distance. Because the CVT can very efficiently transmit kinetic energy, systems using weights can be more efficient when employing the CVT to transmit the kinetic energy from the gravitational pull to the electrical generator. The same works in reverse for converting electricity to lift the weight again. In systems like windmills and hydro plants, keeping the energy in kinetic form is more efficient. Utilizing the CVT will increase the net amount of energy from a system by decreasing the amount of loss of energy during the charging and discharging phases. With machine learning, utilizing the CVT to direct where to store the energy will also increase the system's net efficiency.

The main use of energy for VTOL aircraft 1695 and most aircraft is to get the craft airborne. Current flywheel technology allows more energy density than batteries so using flywheels, coupled with the CVT, can provide better efficiency for the new wave of VTOL and electric aircraft. The high demands of energy for lifting an aircraft into flight mode can be better handled by drawing that energy from flywheels rather than batteries. This would lessen the weight needed if that energy had to come from batteries. Most current aircraft designs do not recover energy in the slowing down and landing portions of their flight. With the CVT, before landing, the craft can recover energy during the slow down and descent phases of the flight and store that energy in the flywheels to use again during the vertical landing phases. During traditional flights, during the slow down and descent portion of the flight, the aircraft bleeds off speed gradually. This means the energy is being consumed by friction and not recovered. Our CVT will shorten this phase and recover the energy to use during the final landing phase. This will decrease the total flight time and allow passengers to reach their destination quicker and with less total energy needed of one embodiment.

Multiple Axis Mechanism:

FIG. 17 shows a block diagram of an overview of a multiple-axis mechanism of one embodiment. FIG. 17 shows the kinetic energy transference device (KETD) utilizes a multiple-axis mechanism to separate the kinetic energy the source is providing from the speed it is providing it at 1700. The (KETD) creates a pathway where it sends energy out of one path at the specific speed desired and excess speed out to a separate path 1710. A module measures the amount of energy being applied and the amount needed to provide the most efficient use of the energy 1720. Multiple sources of outputs can be integrated into the device to optimize the energy needed for given tasks 1730. The mechanism to control the rate of speed, (a speed governor) does not slow the device with friction but creates a controllable timed gate that limits the speed an object can pass through it 1740. The amount of force that is applied to the gate will always equal the amount of force that is exiting the (KETD) 1750 of one embodiment. The descriptions continue in FIG. 18.

KETD Features:

FIG. 18 shows a block diagram of an overview of the KETD features of one embodiment. FIG. 18 shows a continuation from FIG. 17 with the speed the gate operates at is adjustable via a computer-controlled module that takes inputs from the source, the desired need, and the (KETD) itself 1800. To control the speed of the output shaft of the (KETD), the gate slows itself until the force desired is measured at the gate which in turn will send that exact amount of force out of the output shaft 1810. The speed that forces exits equals the input speed minus the speed of the gate 1820. The slower the gate moves, the faster the output shaft and vice versa 1830. The computerized speed control module measures force and not just speed 1840. Measuring force in addition to speed allows the source to provide energy in the most efficient means 1850. In instances where energy is desired to be recovered, the module controls the gate speed and force to transfer energy from the output shaft back to the source 1860. The module calculates the desired values and makes adjustments many times a second to provide the most efficient use of energy from the source 1870 of one embodiment.

It should be noted that the descriptions that follow, for example, in terms of a transmission platform method and devices are described for illustrative purposes and the underlying system can apply to any number and multiple types of combustion engines and electric motors. In one embodiment of the present invention, the transmission platform method and devices can be configured using an electronic control box. The transmission platform method and devices can be configured to include a planetary gear and can be configured to include a speed governor using the present invention.

Figure 19:
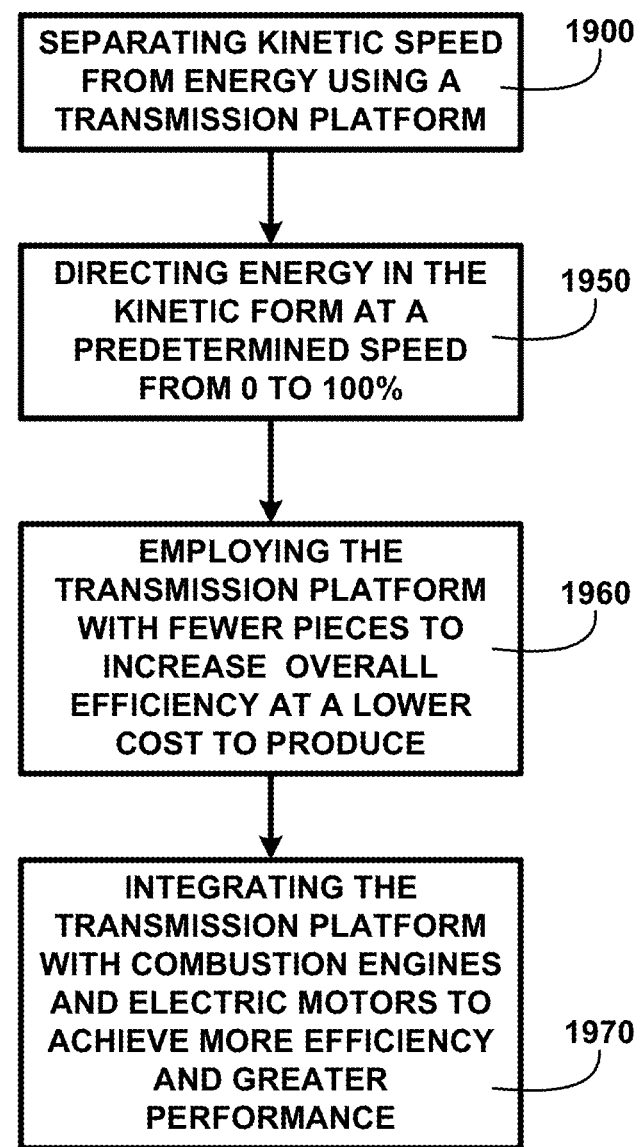
FIG. 19 shows a block diagram of an overview flow chart of a transmission platform of one embodiment.

Transmission Platform:

FIG. 19 shows a block diagram of an overview flow chart of a transmission platform of one embodiment. FIG. 19 shows separating kinetic speed from energy using a transmission platform 1900. The transmission platform 1900 is used for directing energy in the kinetic form at a predetermined speed from 0 to 100% 1950. Power systems increase efficiency by employing the transmission platform with fewer pieces to increase overall efficiency at a lower cost to produce 1960. The transmission platform 1900 is adaptable for integrating the transmission platform with combustion engines and electric motors to achieve more efficiency and greater performance 1970.

The transmission platform 1900 does not need friction to adjust ratios and can deliver the best efficiency of combustion engines or electrical motors at any desired speed. The transmission platform 1900 separates kinetic speed from energy and can direct energy in the kinetic form at any desired speed from 0 to 100%. The transmission platform 1900 is smaller, lighter, and with fewer pieces which translates to an even greater overall efficiency as well as a much lower cost to produce. Employing this technology also leads to other integrations that can provide more efficiency and greater performance of one embodiment.

Figure 20:
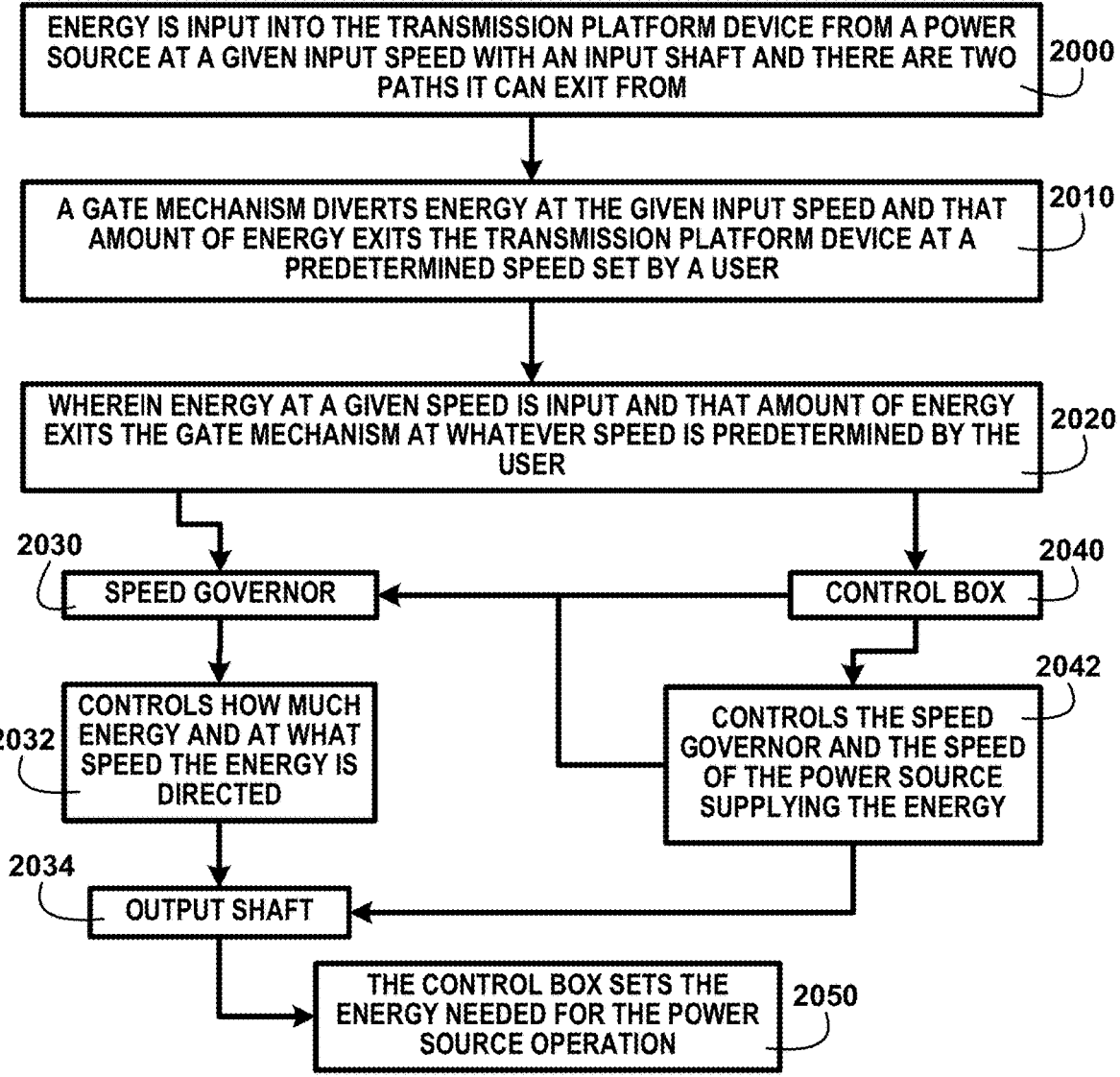
FIG. 20 shows a block diagram of an overview of the energy input of one embodiment.

Energy Input:

FIG. 20 shows a block diagram of an overview of the energy input of one embodiment. FIG. 20 shows energy is input into the transmission platform device from a power source at a given input speed with an input shaft and there are two paths it can exit from 2000. A gate mechanism diverts energy at the given input speed and that amount of energy exits the transmission platform device at a predetermined speed set by a user 2010. Wherein energy at a given speed is input and that amount of energy exits the gate mechanism at whatever speed is predetermined by the user 2020. A speed governor 2030 controls how much energy and at what speed the energy is directed 2032 to an output shaft 2034.

A control box 2040 controls the speed governor and the speed of the power source supplying the energy 2042. The control box 2040 regulated speed is conveyed through the output shaft 2034. The control box sets the energy needed for the power source operation 2050 of one embodiment.

Figure 21:
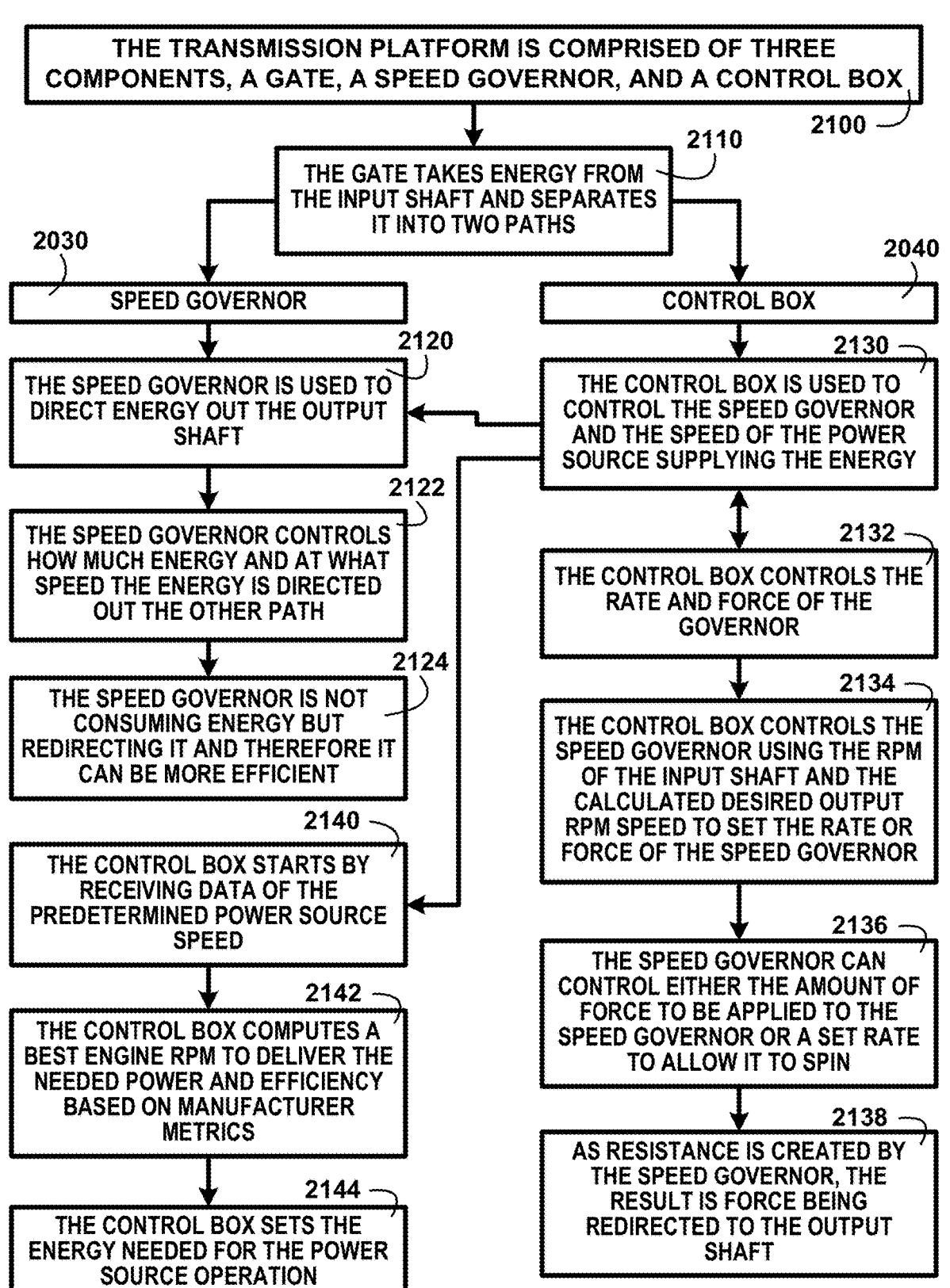
FIG. 21 shows a block diagram of an overview of the transmission platform's three components of one embodiment.

The Transmission Platform has Three Components:

FIG. 21 shows a block diagram of an overview of the transmission platform's three components of one embodiment. FIG. 21 shows the transmission platform is comprised of three components, a gate, a speed governor, and a control box 2100. The gate takes energy from the input shaft and separates it into two paths 2110. Another component is the speed governor 2030. The speed governor is used to direct energy out of the output shaft 2120. The speed governor controls how much energy and at what speed the energy is directed out the other path 2122. The speed governor is not consuming energy but redirecting it and therefore it can be more efficient 2124.

The control box 2040 is a computer that includes processors, memory devices, and communication devices including wired and wireless devices. The control box is used to control the speed governor and the speed of the power source supplying the energy 2130. The control box controls the rate and force of the governor 2132. The control box controls the speed governor using the RPM of the input shaft and the calculated desired output RPM speed to set the rate or force of the speed governor 2134.

The speed governor can control either the amount of force to be applied to the speed governor or a set rate to allow it to spin 2136. As resistance is created by the speed governor, the result is the force being redirected to the output shaft 2138. The control box starts by receiving data of the predetermined power source speed 2140. The control box computes the best engine RPM to deliver the needed power and efficiency based on manufacturer metrics 2142 downloaded and stored in the memory devices. The control box sets the energy needed for the power source operation 2144 of one embodiment.

Figure 22:
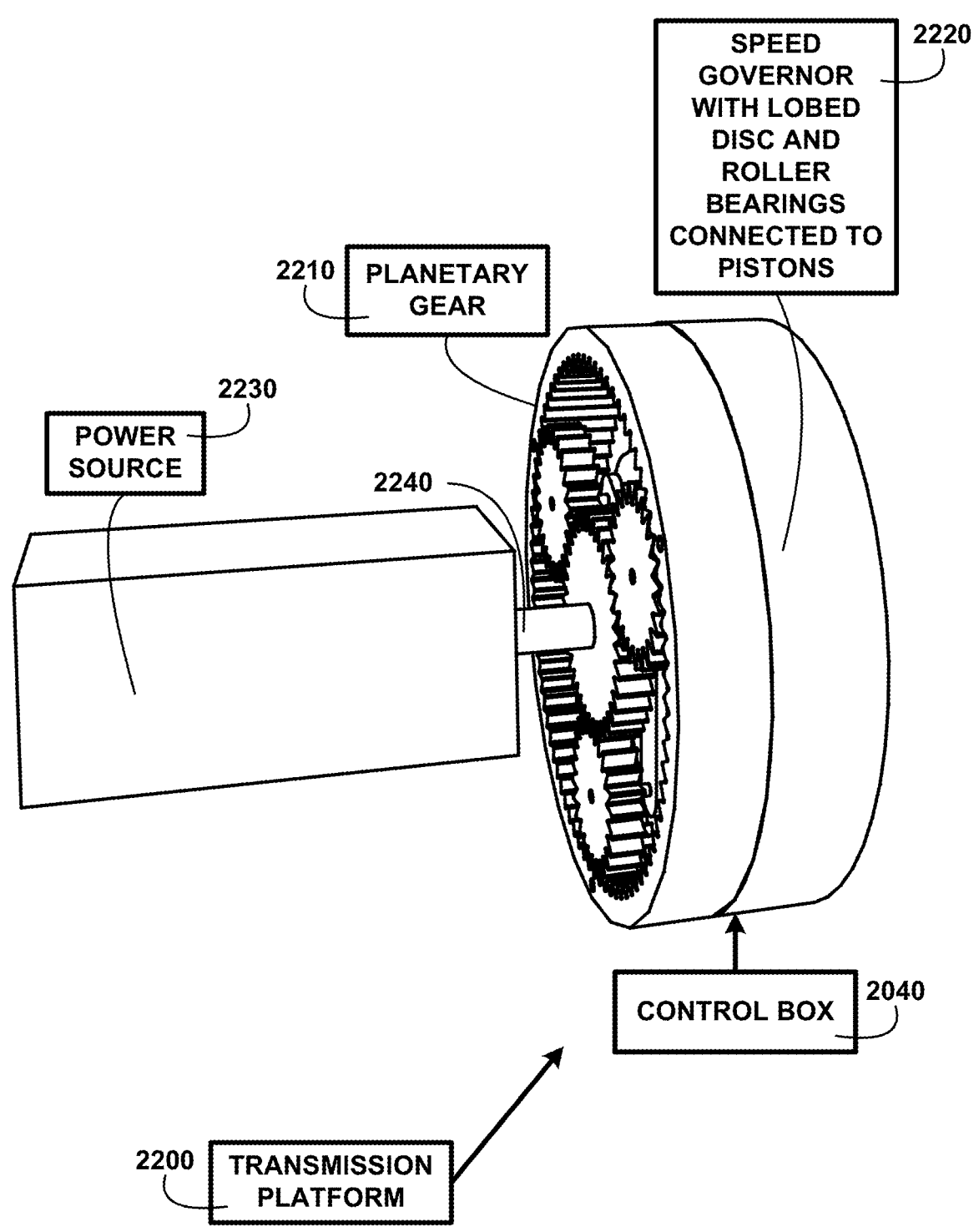
FIG. 22 shows for illustrative purposes only an example of a transmission platform prospective side view of one embodiment.

Transmission Platform Perspective Side View:

FIG. 22 shows for illustrative purposes only an example of a transmission platform prospective side view of one embodiment. FIG. 22 shows a side view of the transmission platform 2200. The transmission platform 2200 includes a planetary gear 2210 which is the gate mechanism that takes energy from the input shaft and separates it into two paths. One path is to the ring gear of the speed governor with lobed disc and roller bearings connected to pistons 2220. The other path is to the carrier gear of the planetary gear 2210. The control box 2040 communicates to the speed governor to convert the kinetic energy input into a predetermined speed for the power source 2230 and the output speed of a predetermined speed for the operations receiving devices 2240 of the power source 2230 energy. The two paths include one connected to the speed governor that controls how much energy and at what speed the energy is directed out, and the other path to the operations receiving devices of one embodiment.

Figure 23:
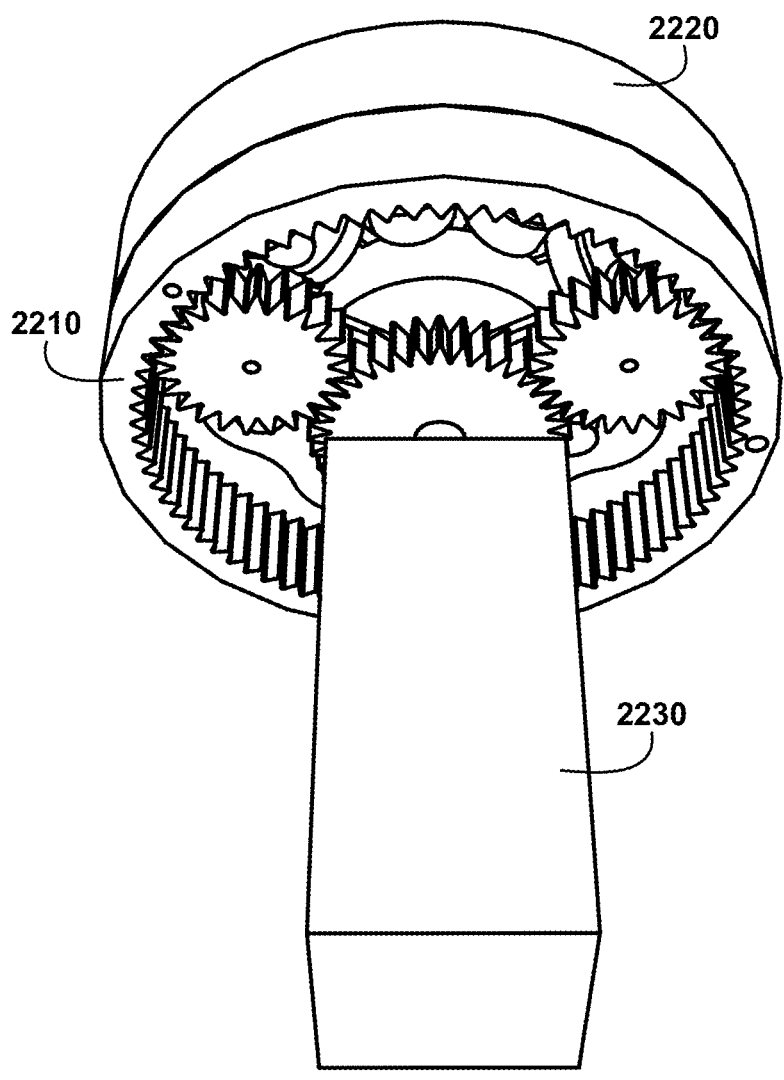
FIG. 23 shows for illustrative purposes only an example of a transmission platform prospective power source end view of one embodiment.

Transmission Platform Prospective Power Source End View:

FIG. 23 shows for illustrative purposes only an example of a transmission platform prospective power source end view of one embodiment. FIG. 23 shows the transmission platform 2200 of FIG. 22 from a power source perspective. The planetary gear 2210 connected to the speed governor with lobed disc and roller bearings connected to pistons 2220 is fed energy from the power source 2230 through an input shaft. The control box 2040 of FIG. 20 is not shown. In one embodiment the control box 2040 of FIG. 20 can be integrated into the speed governor of one embodiment.

Figure 24:
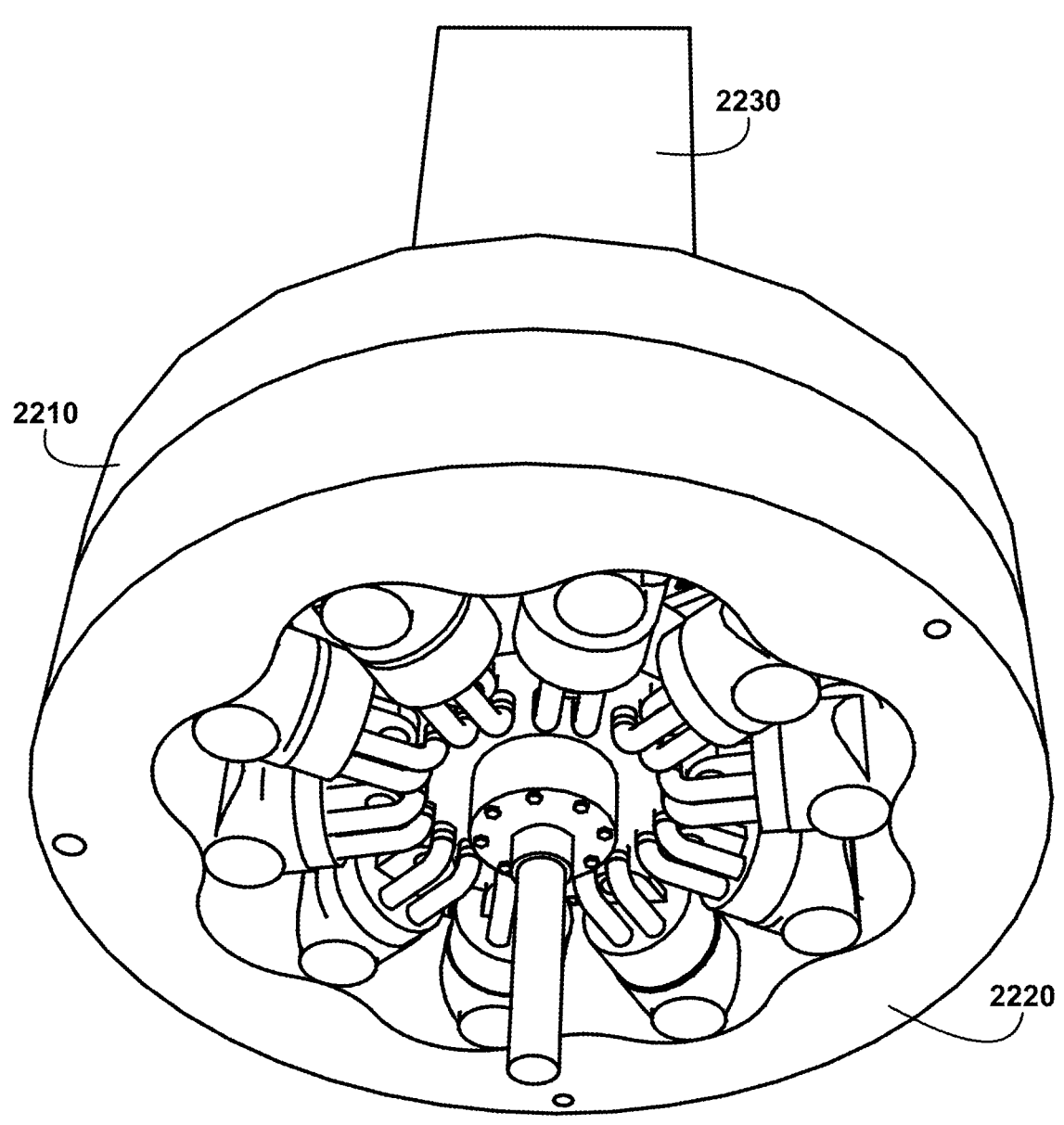
FIG. 24 shows for illustrative purposes only an example of a transmission platform prospective speed governor end view of one embodiment.

Transmission Platform Prospective Speed Governor End View:

FIG. 24 shows for illustrative purposes only an example of a transmission platform prospective speed governor end view of one embodiment. FIG. 24 shows the power source 2230, planetary gear 2210, and speed governor with lobed disc and roller bearings connected to pistons 2220 assemblages in a view from the speed governor end. The components are interconnected with the control box 2040 of FIG. 20 to form the transmission platform 1900 of FIG. 19 of one embodiment.

Figure 25:
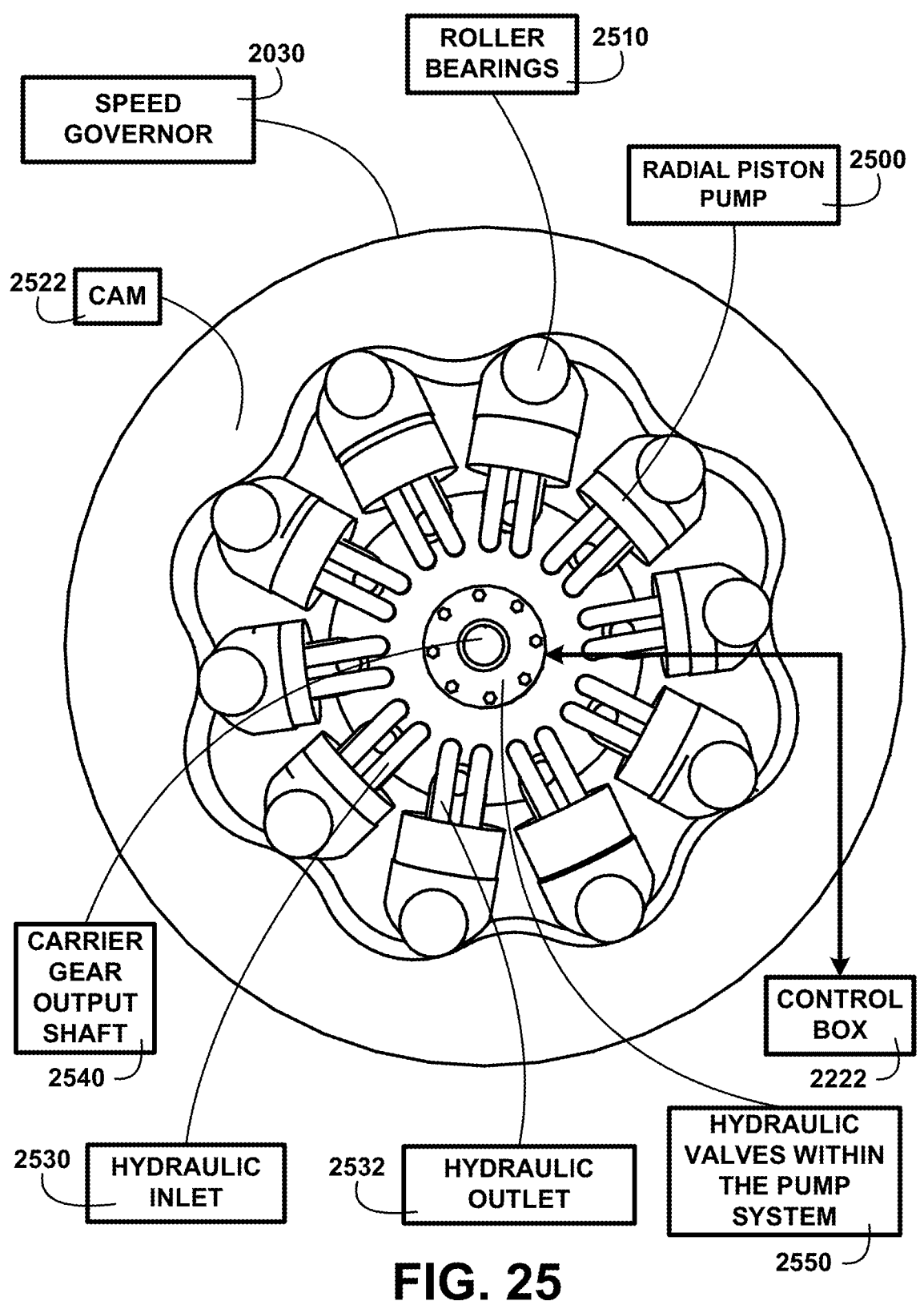
FIG. 25 shows for illustrative purposes only an example of a speed governor of one embodiment 5.

Speed Governor:

FIG. 25 shows for illustrative purposes only an example of a speed governor of one embodiment. FIG. 25 shows a plurality of a radial piston pump 2500 and roller bearing 2510 components of the speed governor 2030. The roller bearing 2510 components are moved by the rotating lobed disc cam 2522. Hydraulic fluid flows through a hydraulic inlet 2530 into the radial piston pump 2500 as the pump is extended. Hydraulic fluid is pressurized when the radial piston pump 2500 is pushed in by the rotating lobed disc cam 2522 and flows out the hydraulic outlet 2532. Hydraulic valves within the pump system 2550 are controlled by the control box 2222 to regulate the pressure of the hydraulic fluid which regulates the speed of the energy output. The carrier gear output shaft 2540 passes through the speed governor 2030.

The speed governor 2030 uses a hydraulic motor or pump system illustrated with a radial piston pump and controls speed by controlling hydraulic valves within the pump. The governor is not consuming energy but redirecting it and therefore it can be more efficient.

The control box 2222 controls the rate and force of the speed governor 2030 as well as the speed and power of the motor or engine supplying power. The control box 2222 uses the predetermined speed and computes the engine RPM to deliver the needed power based on metrics downloaded from the manufacturer. The control box 2222 sets the speed of the engine or energy needed for the motor.

The second process of the control box 2222 is to control the speed governor 2030. This process uses the RPM of the input shaft and the calculated desired output rpm speed to set the rate or force of the speed governor 2030. The speed governor 2030 can control either the amount of force to be applied to the speed governor 2030 or a set rate to allow it to spin. As resistance is created by the speed governor 2030, the result is the force being redirected to the output shaft. This amount can be anywhere from 0 to 100% and eliminates the need for clutches or torque converters.

The radial piston pump is the speed governor 2030 and is connected to one of the shafts in the gate. As the shaft connected to the pump spins, resistance can be applied by controlling the fluid valves in the piston pump. By controlling the speed at which fluid can move from the cylinders in the pump, the resistance creates a pace at which energy is being diverted from one shaft of the gate to the other (output) shaft of the gate. This device is controlled by the control box 2222 computer module and can be set to speed or forced to be diverted.

To control speed, the module sets the timing for which the hydraulic valves open and what pace they open and close. The speed governor 2030 can direct force by controlling how much pressure the piston will be exerting. Following the laws of physics, every action has an equal and opposite reaction. In situations, like in tractor trailers, where significant energy can be directed to the wheels but when one of the wheels slips, the resistance greatly decreases until the wheel regains traction. If this happens quickly, the change in force and resistance gets absorbed into the drivetrain which can result in a broken axle or another part of the system.

With the transmission platform, if a wheel is spinning and catches traction, the shock is absorbed into the speed governor 2030 by pushing past the hydraulic resistance and allowing the shaft to spin instead of the output shaft or the engine. With traditional gear-to-gear systems, this shock of energy can lead to broken parts. With the transmission platform, these shocks are easily absorbed with no broken parts or even lapses in power delivery.

To deliver the output at continually variable speeds, a computer module is used to make continual adjustments. In the transmission platform, the control module accepts inputs from the driver, from the motor or engine, from the input and output shaft as well as aspects of the speed governor 2030 such as hydraulic pressure.

The transmission platform is a Continually Variable Transmission (CVT) that uses a computer module that can manage different uses to provide the most power, most efficiency, or any combination desired. It can also be set to deliver a set amount of energy (power) and the speed will continually adjust. Instead of the accelerator pedal of an auto being connected to the motor, with the transmission platform, the accelerator is connected to the computer module, and it delivers the inputs to the different devices.

The computer module can also be used to protect the equipment or deliver the best performance. In an example where a wheel is spinning and loses traction, the computer can reduce the power setting and deliver just enough to regain traction and prevent a sudden grip from sending a shock through the drive train. This module can also be used when multiple transmission platforms are used in the same vehicle similar to how EVs operate with multiple motors. There can be a separate transmission platform and module for each wheel with all of the modules connected and interacting with each other to deliver the best performance or efficiency of one embodiment.

Figure 26:
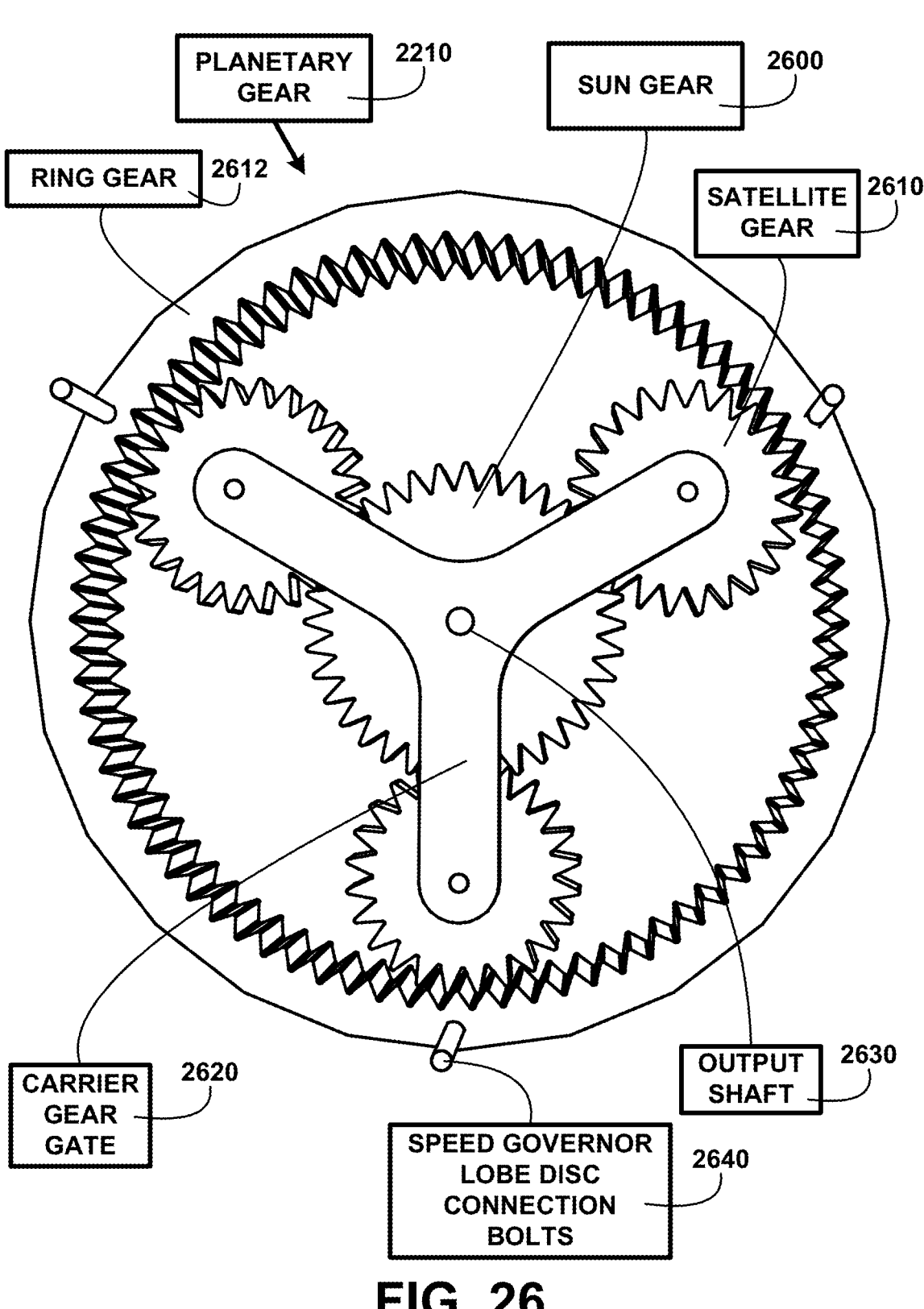
FIG. 26 shows for illustrative purposes only an example of a planetary gear of one embodiment.

Planetary Gear:

FIG. 26 shows for illustrative purposes only an example of a planetary gear of one embodiment. FIG. 26 shows the planetary gear 2210. The planetary gear 2210 includes a sun gear 2600, at least three satellite gears 2610, ring gear 2612, carrier gear gate 2620, the output shaft 2630, and a plurality of speed governor 2030 lobe disc connection bolts 2640. The carrier gear gate 2620 is also referred to herein as the gate. The transmission platform can use a planetary gear set for a differential where there is an input shaft and two paths through which the input shaft energy can flow out. The planetary gear set is also referred to as an epicyclic gear train. The components of the planetary gear set can be rotated independently and can be rotated separately or jointly. Different gear ratios are achieved with the rotation of the components separately or jointly. For example, the sun gear rotated with the input shaft will produce a first-gear ratio. Rotating the ring gear in an opposite rotational direction to the sun gear at the same time will change the gear ratio. In another example, the input (sun gear) is rotating counterclockwise, the output (carrier) is stationary, and the outer ring is rotating clockwise. Another example is when the input is moving and the output is also moving but the ring gear is stationary, and the input and output are both rotating counterclockwise. In a third example, a transition between gear ratio phases is with everything rotating. This transition is with a constant input, but the output goes from stationary to rotation. The outer ring will rotate counter to the input ring and the output and input will rotate in the same direction. The gear ratios achieved can be changed with changes in the individual gear diameters. In one embodiment the continual variable transmission can employ multiple planetary gear sets to increase the availability of various gear ratios. The rate at which the energy exits is the combination of the two output shafts that equals the energy from the input shaft. Energy flows through the transmission platform.

The transmission platform is the process of directing the flow of energy between two paths at the same time. Traditional transmissions direct energy in one path at a time and vary the speed ratio between the input and output by changing this path. By selecting different gear sets to connect the rotation between the input and output shaft, different ratios can be obtained.

The transmission platform controls the difference in speed between the input and output shaft by altering the paths on which energy is allowed to flow. The two paths of the transmission platform are from the input shaft to the output shaft or the speed governor 2030 of FIG. 25. The output speed will always equal the difference between the speeds of the input speed minus the speed of the speed governor 2030 of FIG. 25.

The resistance that is applied by the speed governor 2030 of FIG. 25 redirects energy to the only other path, which is the output shaft. The computer module controls the amount of resistance either by force or timing that the speed governor 2030 of FIG. 25 is allowing rotation to be redirected. Since energy flows to the path of least resistance, as long as there is greater resistance being applied to the speed governor 2030 of FIG. 25 than what is being applied to the output shaft, the energy will flow to the path of the output shaft. For illustrative purposes, when energy flows to the input shaft, it turns the sun gear of the planetary component of the transmission platform. This component acts as the gate and is the mechanical device that splits the flow of energy into two paths. One path will transmit to the planetary gears which are connected to the output shaft and the other path is the outer ring gear which is connected to the speed governor 2030 of FIG. 25.

The speed governor 2030 of FIG. 25 controls the amount of energy or limit of speed that will be allowed to pass through the path of the speed governor 2030 of FIG. 25. In one application using a hydraulic radial piston pump as a speed governor 2030 of FIG. 25, the outer ring of the planetary gear is connected to the outer lobe ring of the hydraulic pump. The outer lobe ring rotates and is resisted by hydraulic pistons that are connected to a stationary part of the Transmission platform. The resistance of the pistons is controlled by valves that can be set to resist a set amount of force, or hydraulic pressure, being applied to the pistons or to open and close on a time basis.

The control module of the Transmission platform computes the amount or speed of resistance to be applied and controls the hydraulic valves of the pistons. The outer lobe ring can only pass at a pace allowed by the pistons on the radial piston pump. As resistance is being applied to the pistons, the process slows the pace of the outer lobe ring which redirects energy from the outer ring gear of the planetary gear to the inner planetary gears that connect to the output shaft.

Figure 27:
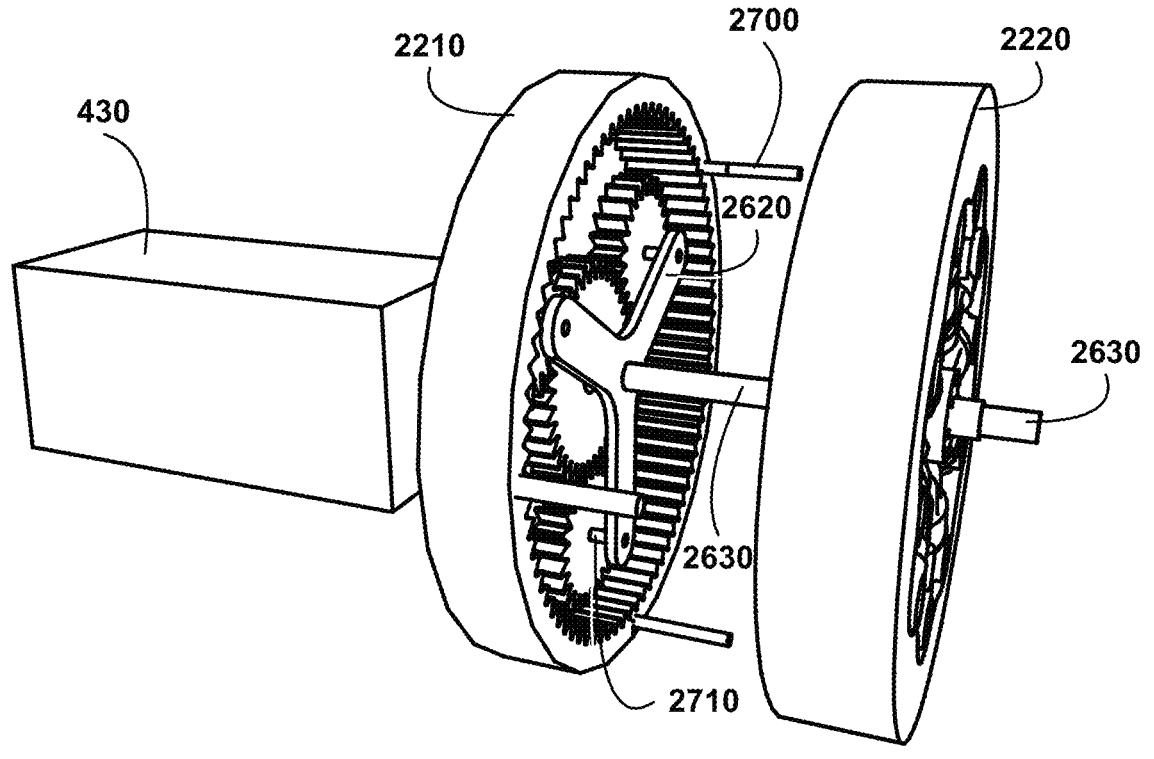
FIG. 27 shows for illustrative purposes only an example of a planetary gear connection to the speed governor of one embodiment.

Planetary Gear Connection to the Speed Governor:

FIG. 27 shows for illustrative purposes only an example of a planetary gear connection to the speed governor of one embodiment. FIG. 27 shows the power source 430 and the planetary gear 2210 separated from the speed governor with lobed disc and roller bearings connected to pistons 2220 for illustrative purposes. The carrier gear gate 820 of FIG. 8 shows a satellite gear to carrier gear gate connection pin 2710 connection. The output shaft 2630 originates from the carrier gear gate 2620 and passes through the speed governor 2030 of FIG. 20. The separation allows viewing the planetary gear to speed governor with lobed disc and roller bearings connected to pistons connection bolt 2700.

In the above, the radial piston pump was used for illustrative purposes of the mechanics of the transmission platform. In practical applications, a more custom-designed speed controller will be used since the torque and speed requirements cannot be as easily met with a radial piston design. A better design would more resemble a multi-piston caliper and disc brake setup. Instead of using a smooth disc and friction material pads, a lobed disc and roller bearings connected to pistons could be used. Various types of speed controllers can be created for the transmission platform depending on the particular use parameters. Depending on the torque and speed requirements, different designs might be better suited than others.

Auto industry uses of the transmission platform include energy recovery and reuse (flywheel technology). These uses increase performance with less engine size and a more efficient manner to store and reuse power. These uses also keep recovered energy in kinetic form. No loss to convert from kinetic to electrical and back and any heat loss or restrictions from battery components.

Auto industry uses of the transmission platform also include the enablement of different engine options, for example, diesel. Diesel engines have limited operating speed ranges. Transmission platform CVT can expand the operating range allowing the engine to operate at its most efficient range while delivering increased performance. With the transmission platform CVT, speed is controlled via the transmission and not by throttling the engine.

Auto industry uses of the transmission platform include efficient use of turbine engines. Turbines operate most efficiently and deliver their most energy at very high RPMs. Transmission platform CVT allows the greater efficiency of turbines to be applied in the auto industry utilizing two key aspects, first, using the Transmission platform CVT to control the speed desired, and second integrating with flywheel technology to store energy for big on-demand needs.

Auto industry uses of the transmission platform further include an increased performance with electric motors. Energy recovery and reuse where the transmission platform CVT provides the ability to capture the kinetic energy in braking applications, store it in a flywheel efficiently, and then when needed, allow it to be transmitted back to the drivetrain. High output delivery with moving energy from batteries to a drivetrain in substantial amounts creates heat and resistance. The transmission platform CVT can transmit energy in great amounts quickly, without heat or other restrictions. Electric motors have wide operating ranges, but they lose efficiency when needed to operate in the broad range needed for high-performance applications. The transmission platform CVT can allow electric motors to stay in their most efficient range while delivering power at all desired speeds of one embodiment.

Figure 28:
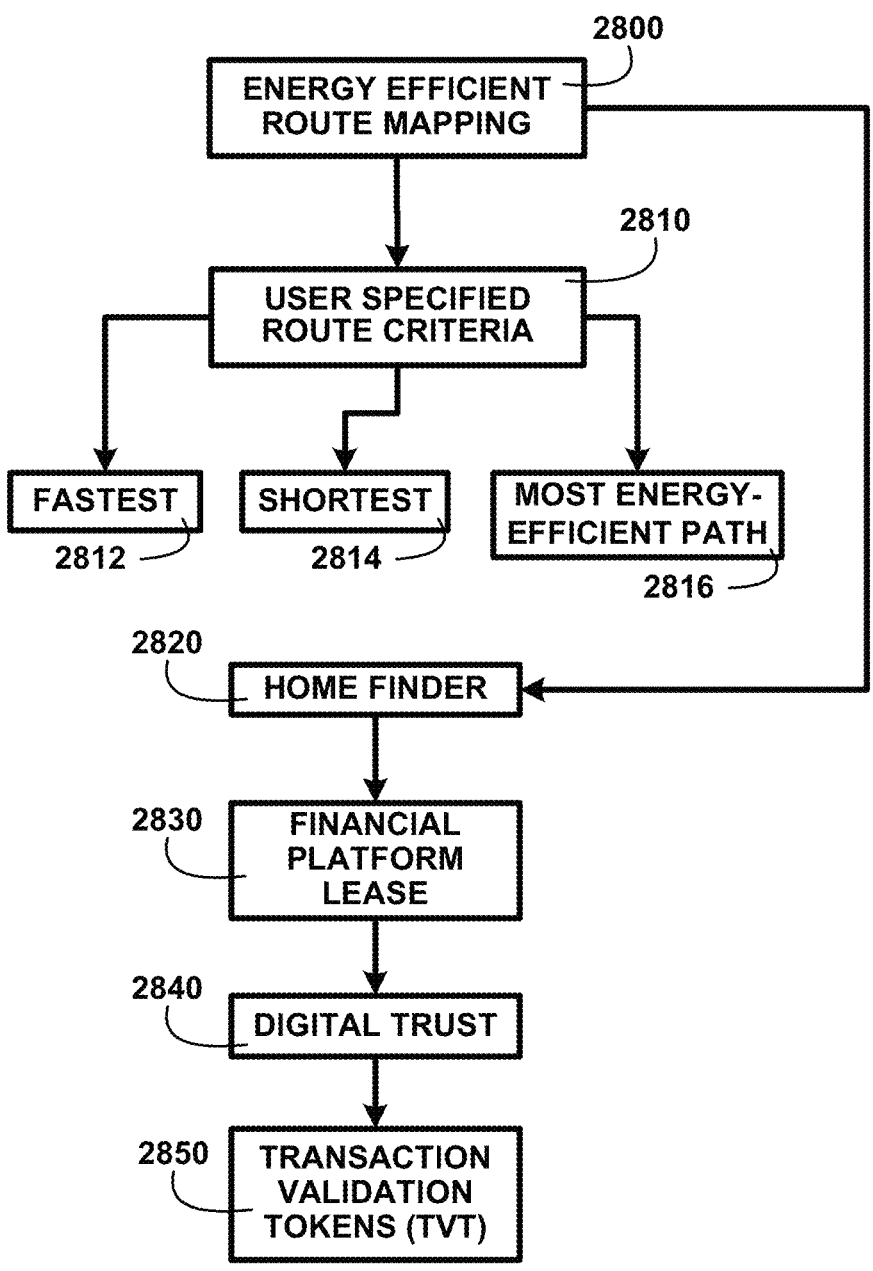
FIG. 28 shows a block diagram of an overview of energy-efficient route mapping of one embodiment.

Energy Efficient Route Mapping:

FIG. 28 shows a block diagram of an overview of energy-efficient route mapping of one embodiment. FIG. 28 shows energy-efficient route mapping 2800 based on user-specified route criteria 2810. The user-specified route criteria 2810 includes the fastest 2812, shortest 2814, and most energy-efficient path 2816 to visit a destination. In one embodiment, the destination includes visiting potential residences matching the user selections. To navigate to destinations based on the user inputting user-specified route criteria 2810 the quickest, shortest, or most energy-efficient route. The system will calculate the user's choice and display energy-efficient route mapping 2800 showing the route, measuring a distance using the appropriate street maps, and calculating the energy efficiency using posted speed limits, distance, and accumulated vehicle energy performance data. For the most energy-efficient, the system will use the data collected by the CVT system and use its calculations to plot the course.

The home finder 2820 system and method comprises a comprehensive process that transforms the property search experience. The home finder system uses components including user criteria definitions. Users can input specific criteria, such as location, price range, property type, and desired features, into the system. These criteria serve as the basis for property recommendations. Data analysis and property matching are performed by the system employing advanced data analysis techniques to match user-defined criteria with available property listings, and comparable prices of criteria matching properties.

This matching process considers various factors, including property attributes, location data, and user preferences. Navigation and direction are based upon identifying suitable properties, the system generates navigational directions to guide users, or autonomous vehicles, to the physical locations of these properties. Navigation can be provided through integration with GPS technology and mapping services.

Property information including property photos and/or videos is displayed on the user's mobile device with a financial platform app. Once a user reaches a property, the system displays detailed information about the property on a digital interface. This information may include property specifications, images, virtual tours, and historical data.

The home finder 2820 system will send a text email or message to the property owner and/or real estate agent to make a private showing arrangement. A private showing arrangement facilitates property viewing, and the home finder 2820 system enables users to directly contact property owners, agents, or representatives via integrated communication channels. Users can request private showings and schedule appointments in real time.

A financial platform lease program is initiated for property acquisition after a user identifies a property the user wants to acquire; the home finder system initiates the acquisition process. A financial platform lease 2830 is used after the user has identified a property the user selected for the user's residence. The user can use the financial platform lease to make it more affordable. The process separates the possession rights from the value of the property by tokenizing the value and use rights separately. This process greatly reduces the cost of homeownership and makes it more affordable.

A digital trust 2840 controls the ownership rights for the financial platform lease and other assets in the case of death, incapacitation, or any event chosen by the grantor. The process uses blockchain technology to create an immutable database and smart contracts to control access to one or more of the digital assets. The Grantor can designate x of n guardians needed to initiate the Digital Trust to transfer control of assets under its control.

Transaction validation tokens (TVT) 2850 are used in the process of finding a home and initiating a financial platform lease agreement and parties that were involved with the process will share a portion of the fees. These fees are disbursed via the TVTs. Each holder is entitled to a set portion of the monthly lease fees, but the holder must utilize the token in a validation process in a manner similar to staking and proof of stake processes. All of the tokens used in this validation process will share a pro-rata share of the total fees being disbursed per transaction pool.

The home finder 2820 system and method provides the user with efficient property identification: Users can quickly identify properties that meet their criteria; reducing time spent searching through irrelevant listings. The seamless navigation system provides step-by-step navigation or autonomous integration, enhancing user convenience and eliminating the possibility of getting lost. The home finder system collects and displays comprehensive property information, and the users have immediate access to comprehensive property details, enabling the users to make informed decisions about private showings. The financial platform app provides real-time communication to enable instant interaction with property owners or agents, simplifying the process of arranging private showings.

The home finder system 2820 and method represent an advancement in the field of property search and viewing. By combining data analysis, navigation, and real-time communication, the home finder system provides a responsive solution for individuals seeking to efficiently identify, evaluate, and arrange private showings of properties that match the user's preferences.

Figure 29:
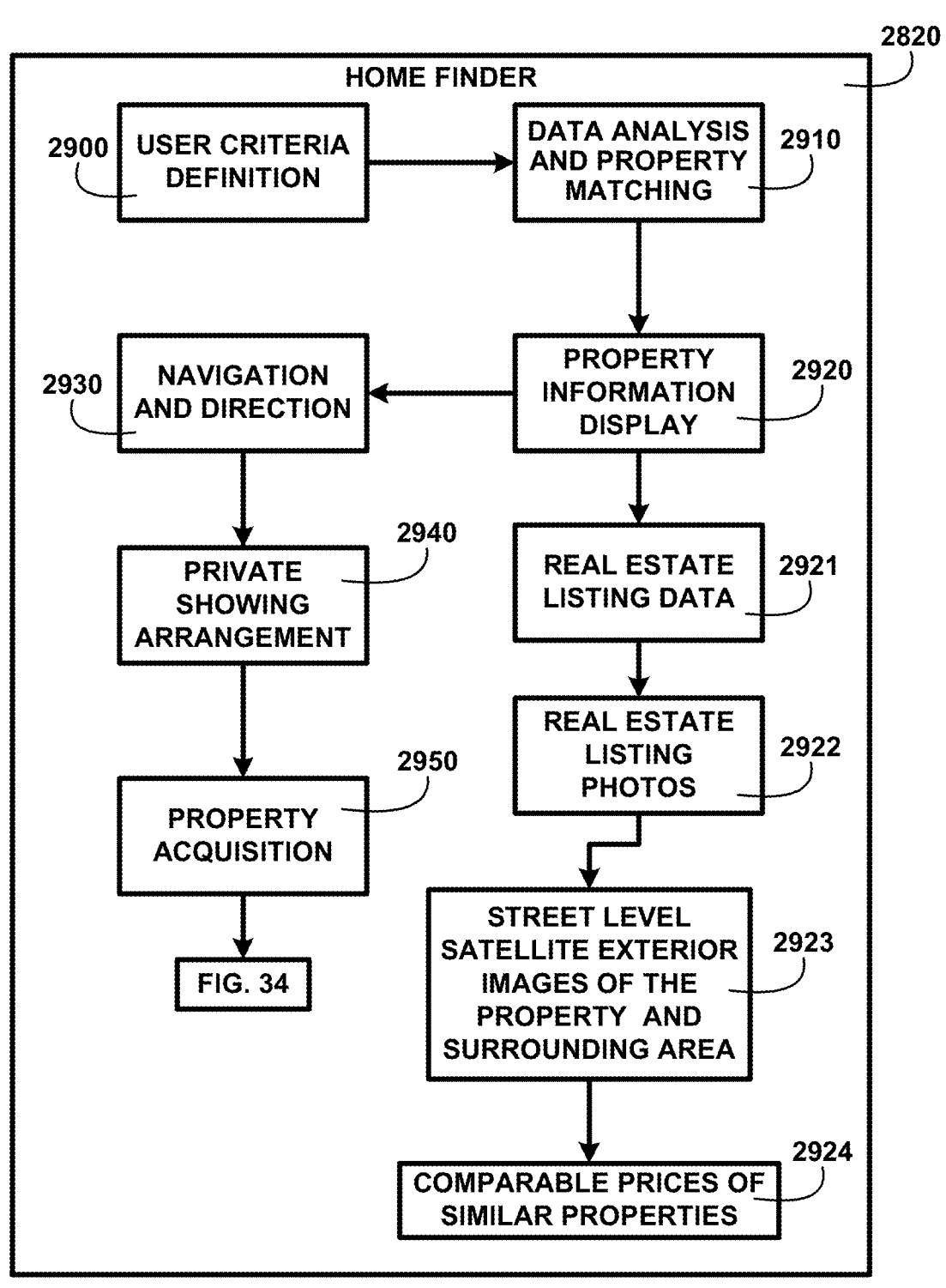
FIG. 29 shows a block diagram of an overview of a home finder of one embodiment.

Home Finder:

FIG. 29 shows a block diagram of an overview of a home finder of one embodiment. FIG. 29 shows the home finder 2820 using the user criteria definition 2900 to perform data analysis and property matching 2910. The data analysis and property matching use internet and MLS listing information to determine matches of properties to the user criteria definition 2900. Each matching property is shown with a property information display 2920 including real estate listing data 2921, real estate listing photos 2922, street-level satellite exterior images of the property and surrounding area 2923, comparable prices of similar properties 2924, interior photographs, and video images. The home finder 2820 activates the navigation and direction 2930 system to facilitate the user's travel to each matching property. The home finder 2820 provides a private showing arrangement 2940 with contact information displayed to the user including owner and real estate contact information. Upon the user selecting a property for a residence the home finder 2820 starts a property acquisition 2950 process on the financial platform using the financial platform lease program. The property acquisition 2950 is described in FIG. 34 of one embodiment.

Figure 30:
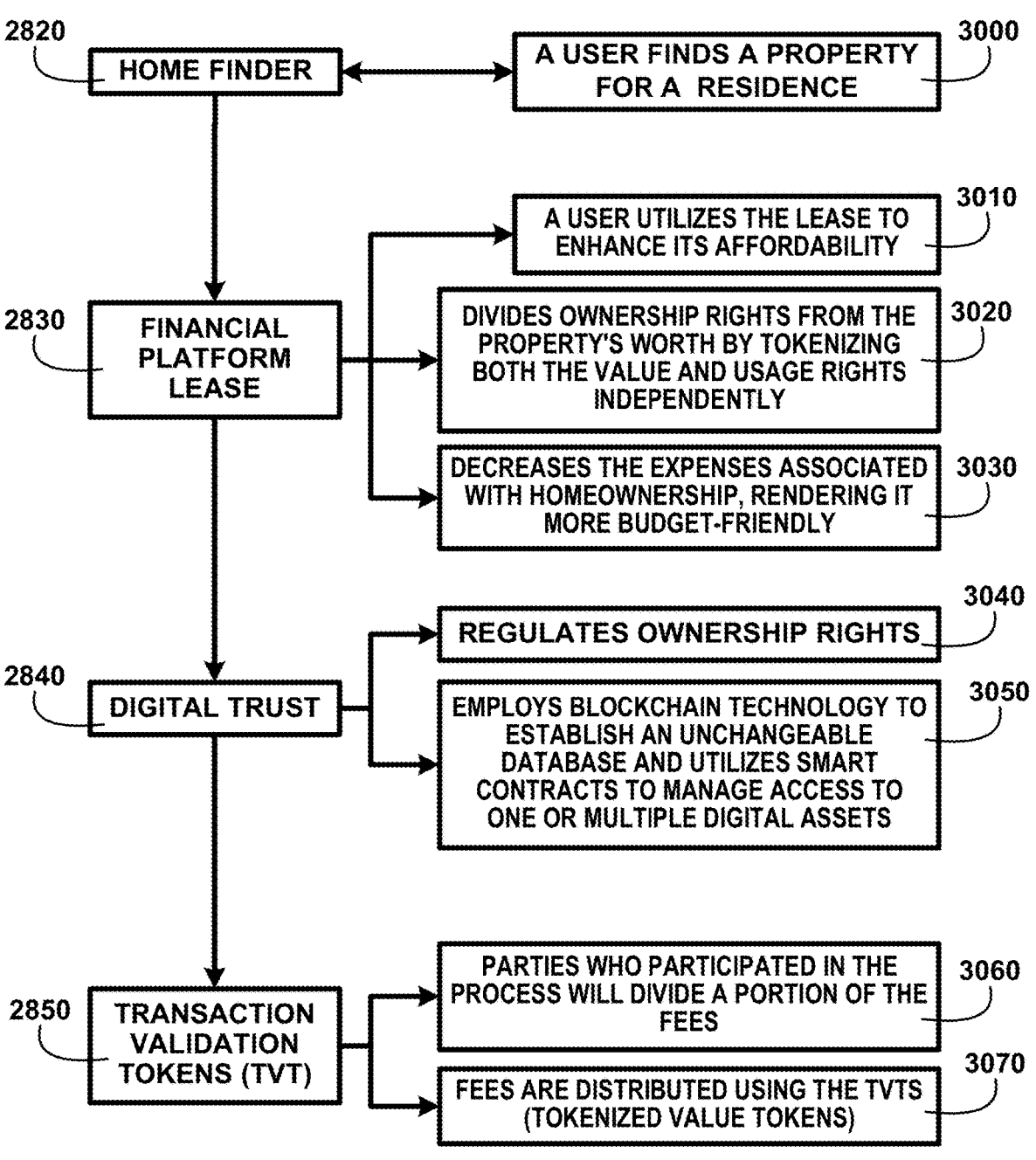
FIG. 30 shows a block diagram of an overview of a financial platform lease of one embodiment.

Financial Platform Lease:

FIG. 30 shows a block diagram of an overview of a financial platform lease of one embodiment. FIG. 30 shows the home finder 2820 after a user finds a property for a residence 3000 initiating the financial platform lease 2830. A user utilizes the lease to enhance its affordability 3010. The financial platform lease 2830 divides ownership rights from the property's worth by tokenizing both the value and usage rights independently 3020. The financial platform lease 2830 decreases the expenses associated with home-ownership, rendering it more budget-friendly 3030. The digital trust 2840 regulates ownership rights 3040 employs blockchain technology to establish an unchangeable database and utilizes smart contracts to manage access to one or multiple digital assets 3050. The transaction validation tokens (TVT) 2850 is used for parties who participated in the process and will divide a portion of the fees 3060. The fees are distributed using the TVTs (tokenized value tokens) 3070 to the participating parties of one embodiment.

Figure 31:
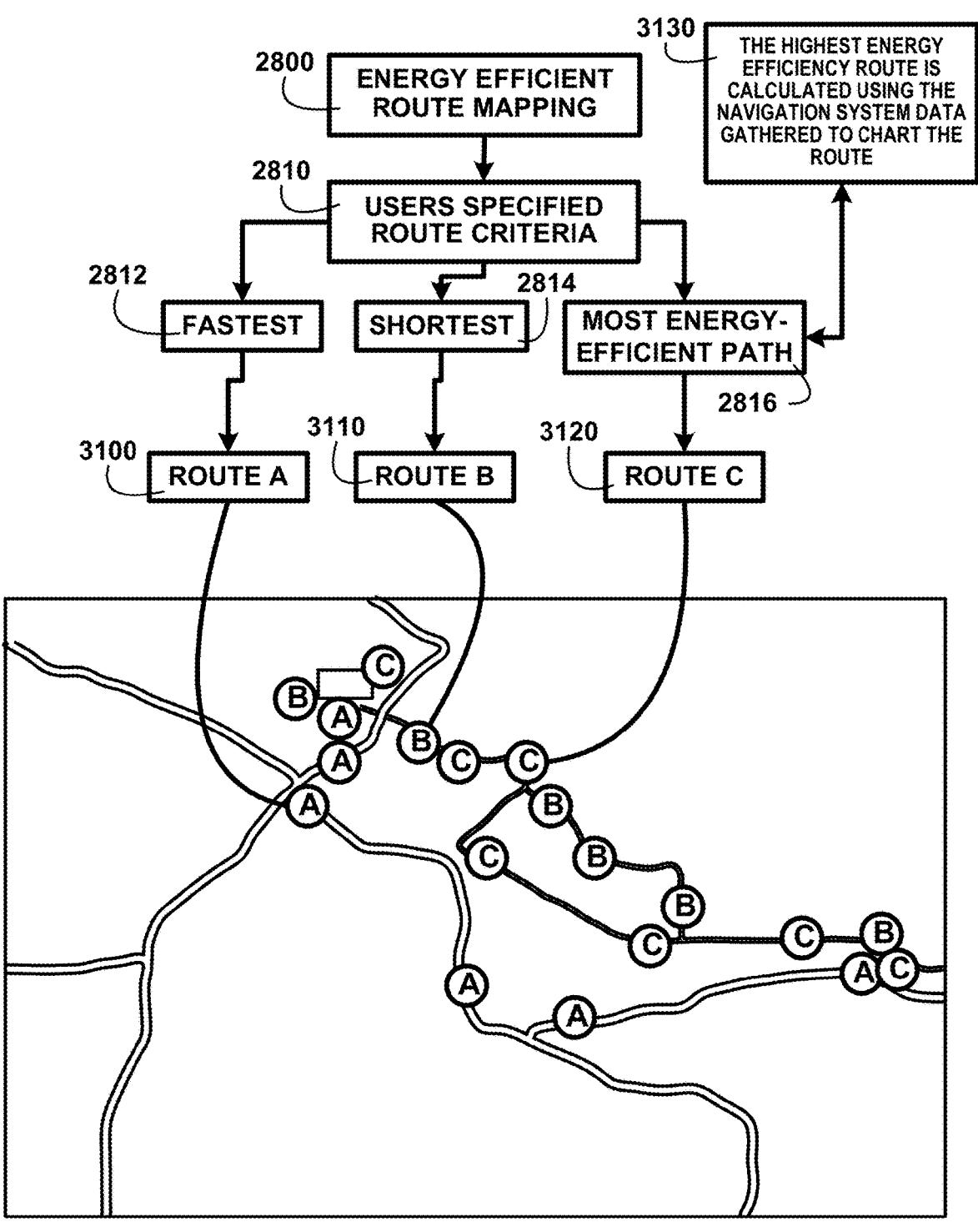
FIG. 31 shows for illustrative purposes only an example of user-specified route criteria of one embodiment.

User-Specified Route Criteria:

FIG. 31 shows for illustrative purposes only an example of user-specified route criteria of one embodiment. FIG. 31 shows the energy-efficient route mapping 2800 based on the user's specified route criteria 2810 of fastest 2812, shortest 2814, and most energy-efficient path 2816. The highest energy efficiency route is calculated using the navigation system data gathered to chart the route 3130. As shown in FIG. 31 the energy-efficient route mapping 2800 superimposes the users specified route criteria 2810 as shown with all three routes route A 3100, route B 3110, and route C 3120 are shown in this example to illustrate how the routes may differ of one embodiment.

Figure 32:
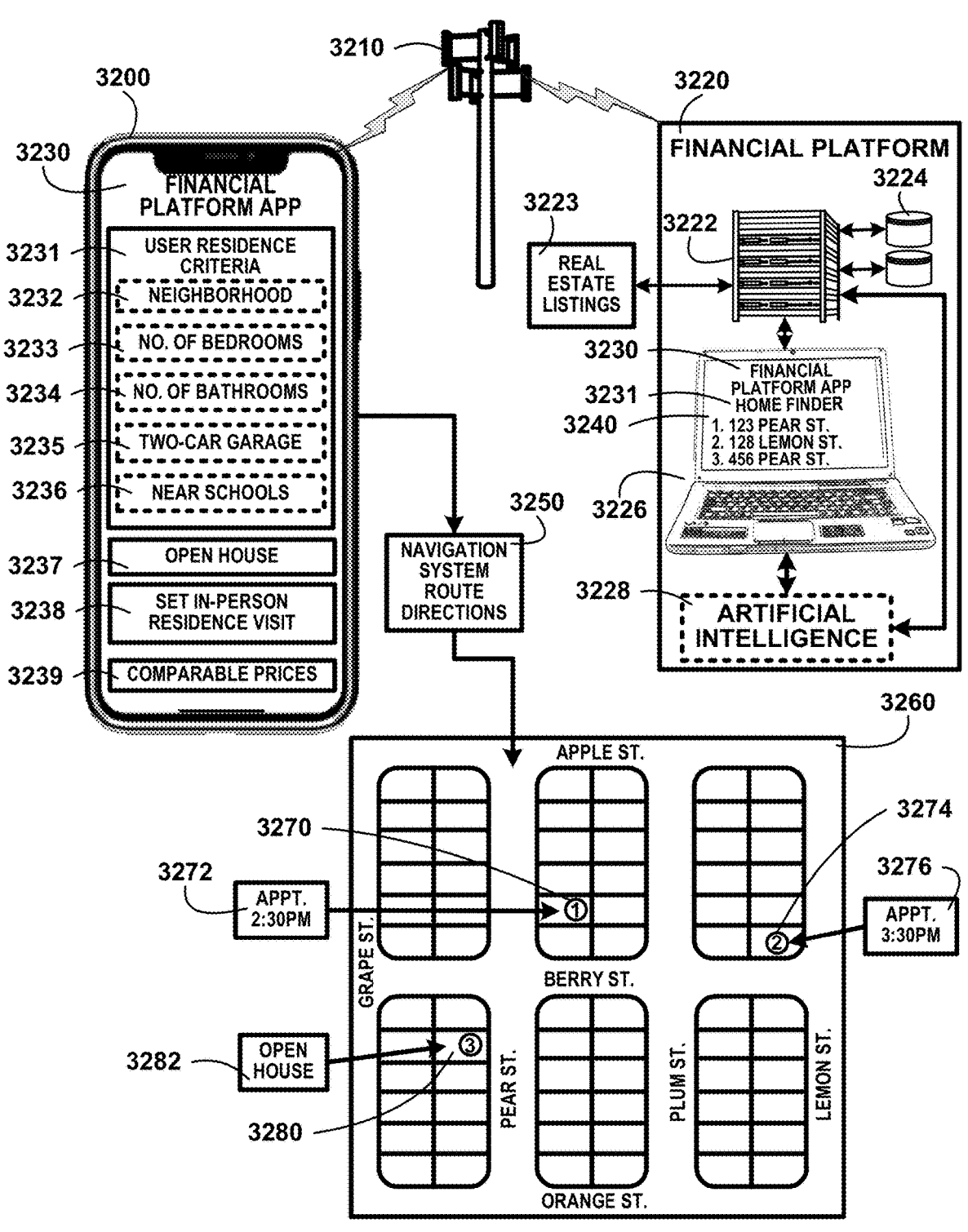
FIG. 32 shows a block diagram of an overview of user residence criteria of one embodiment.

User Residence Criteria:

FIG. 32 shows a block diagram of an overview of user residence criteria of one embodiment. FIG. 32 shows a user's mobile device 3200 having a financial platform app 3230. The user transmits user residence criteria 3231 including neighborhood 3232, no. of bedrooms 3233, no. of bathrooms 3234, two-car garage 3235, and near schools 3236. The user also transmits the inclusion of open house 3237, set in-person residence visit 3238 arrangements, and collect comparable prices 3239. The cellular transmission 3210 is received on a financial platform 3220 server 3222 and recorded on the financial platform 3220 databases 3234. A platform computer 3226 having the financial platform app 3230 uses the home finder 3231 to search and collect data from the internet and MLS real estate listings 3223 of residences matching user residence criteria 3240. A cellular transmission 3210 is sent to the user's mobile device 3200 with the results of an artificial intelligence 3228 analysis of the residences matching user residence criteria 3240. The analysis includes a navigation module determination of a navigation route 3250 on a street map 3260 to each of the residences matching user residence criteria 3240. In this example, the user is given a route to arrive at match 1 3270 for an appt. 2:30 pm 3272. After the first appointment, the user is routed to match 2 3274 for an appt. 3:30 pm 3276. After that appointment, the user is routed to match 3 3280 an open house 3282 to view in person the match 3 3280 residence. A navigation system screen coupled to a user continually variable transmission automobile dashboard is configured to display images and information about the residential real estate search results location and property characteristics. The navigation system is further configured to generate the fastest, shortest, and most energy-efficient routes to each of the locations and displays the routes on a street map to direct the user to the locations. A voice command module coupled to the navigation system is configured to allow the user to request routing to the nearest results location along the fastest route to the location. A video chat feature of the navigation system to configured to allow the user to chat with an owner of a property of one embodiment.

Figure 33:
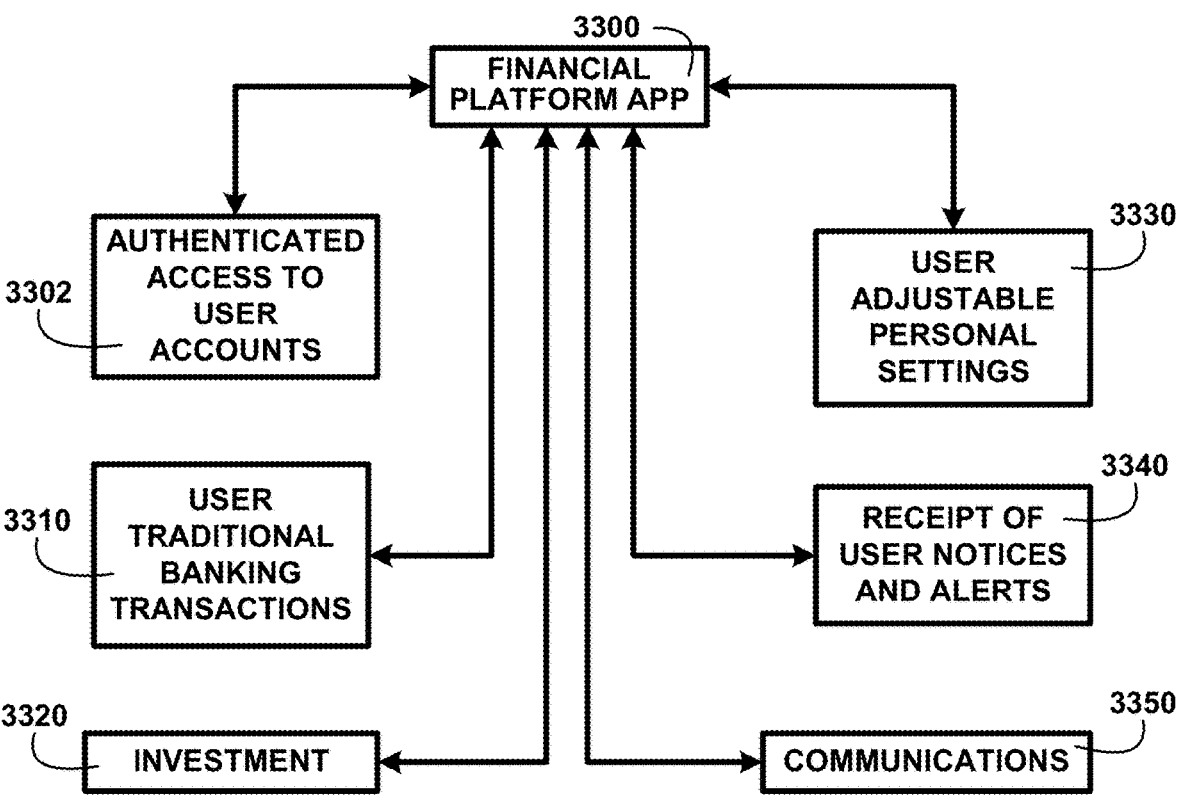
FIG. 33 shows a block diagram of an overview of a financial platform app of one embodiment.

Financial Platform App:

FIG. 33 shows a block diagram of an overview of a financial platform app of one embodiment. FIG. 33 shows the financial platform app 3300 that provides authenticated access to user accounts 3302. The financial platform app 3300 allows users traditional banking transactions 3310 for example paying bills. The financial platform app 3300 allows the user to transact an investment 3320 opportunity. User adjustable personal settings 3330 allow the user to update personal information, for example, an address change. The financial platform app 3300 also displays a receipt of user notices and alerts 3340 to keep the user current on events and possible actions for the user's attention. The financial platform app 3300 also provides the user with communications 3350 systems of one embodiment.

Figure 34:
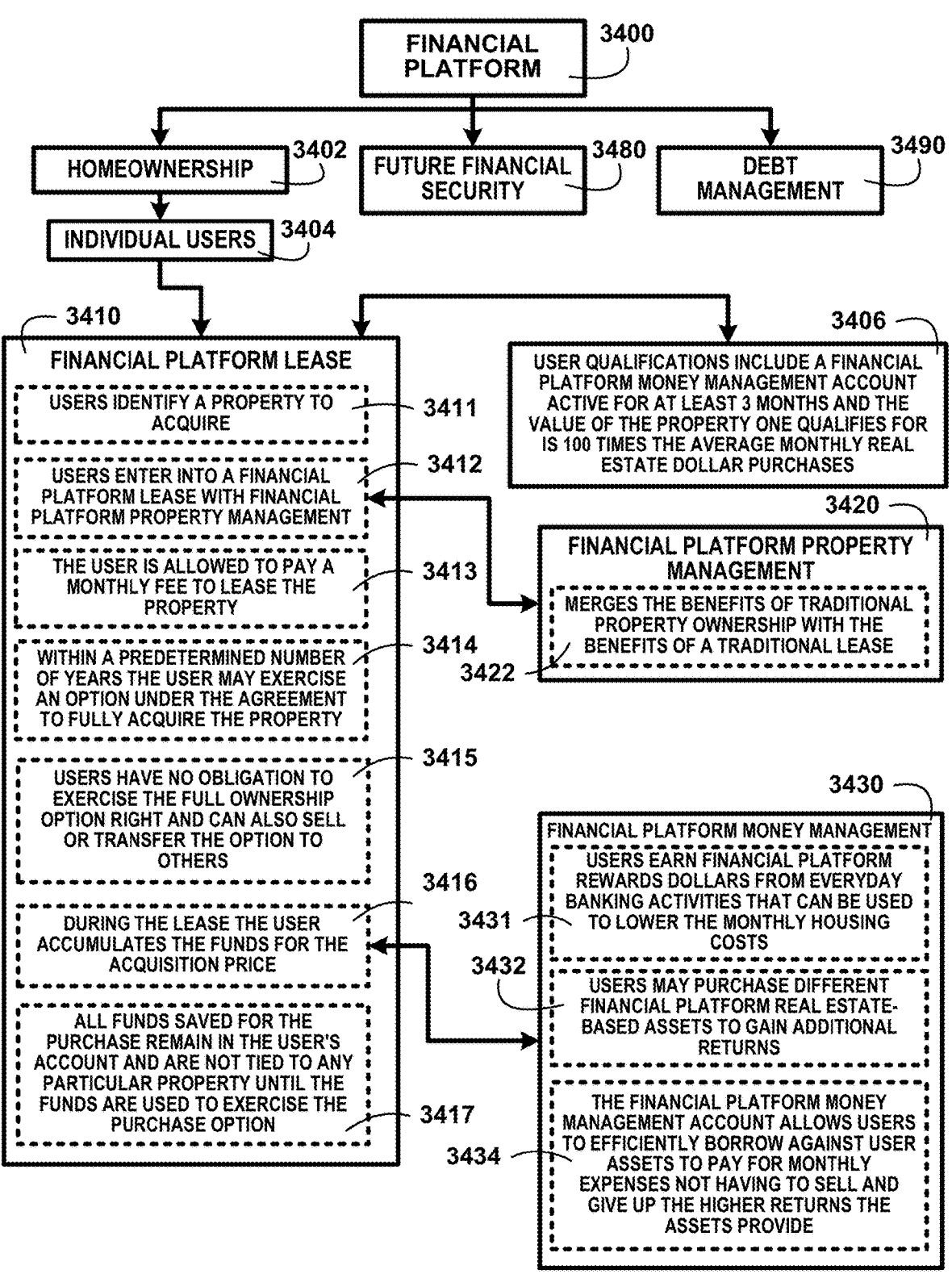
FIG. 34 shows a block diagram of an overview of the financial platform lease acquisition of one embodiment.

Financial Platform Lease Acquisition:

FIG. 34 shows a block diagram of an overview of the financial platform lease acquisition of one embodiment. FIG. 34 shows the financial platform 34000 has programs to assist users in acquiring homeownership 3402, future financial security 3480, and debt management 3490. Individual users 3404 can achieve user qualifications for a financial platform lease 3410. User qualifications include a financial platform money management account active for at least 3 months and the value of the property one qualifies for is 100 times the average monthly real estate dollar purchases 3406. The financial platform lease 3410 process includes where the users identify a property to acquire 3411. The users enter into a financial platform lease with financial platform property management 3412. The user is allowed to pay a monthly fee to lease the property 3413. Within a predetermined number of years, the user may exercise an option under the agreement to fully acquire the property 3414. Users have no obligation to exercise the full ownership option right and can also sell or transfer the option to others 3415.

During the lease, the user accumulates the funds for the acquisition price 3416. All funds saved for the purchase remain in the user's account and are not tied to any particular property until the funds are used to exercise the purchase option 3417. Financial platform property management 3420 merges the benefits of traditional property ownership with the benefits of a traditional lease 3422.

Using financial platform money management 3430 users earn financial platform rewards dollars from everyday banking activities that can be used to lower the monthly housing costs 3431. Users may purchase different financial platform real estate-based assets to gain additional returns 3432. The financial platform money management account allows users to efficiently borrow against user assets to pay for monthly expenses not having to sell and give up the higher returns the assets provide 3434 of one embodiment.

Financial platform Lease is a homeownership solution to simplify the home-buying process while fostering wealth building. Financial platform Lease offers a unique blend of traditional homeownership elements and leasing benefits, presenting an opportunity for individuals to own property for a predetermined year period. The financial platform lease includes qualification criteria and program variations for the path to homeownership and financial prosperity.

The Financial platform Lease grants full possession rights to a property for an impressive, predetermined year term. This extended ownership duration ensures stability and security for homeowners and their families, providing a true sense of ownership. An integral feature of the financial platform Lease is the option for users to convert the lease into traditional ownership at a predetermined price. This unique flexibility allows individuals to transition seamlessly to full ownership when the time is right. During the lease term, users pay approximately 0.6% of the property's value per month, a fee arable to traditional mortgage payments.

The Financial platform Lease includes a game-changing element Financial platform Rewards. These rewards enable users to reduce their monthly payments compared to conventional mortgages, significantly enhancing affordability. Financial platform Lease qualification is accessible to users with at least 6 months of financial activity through the financial platform can qualify. Property eligibility is based on the property's value being at least 60 times the user's average monthly deposits. Financial platform Lease offers flexibility, allowing users to sell their rights to others or terminate their lease with just 60 days' notice.

The essence of financial platform Lease lies in separating the right to use a property from its value, providing homeowners with greater control. Users have the freedom to convert an existing property they own into a financial platform Lease or use a financial platform Lease to acquire a new one. Payment flexibility is another key feature, including payment deferments during financial challenges. Financial platform Lease empowers users to save strategically, using the savings from lower monthly payments to participate in financial platform Money Management programs. This approach facilitates efficient wealth accumulation compared to traditional options.

Financial platform Lease offers four distinct programs to suit diverse financial goals. Each program varies in terms of deposit fees, credit requirements, and payment structures. The programs include Starter Financial Platform Lease, Basic Financial Platform Lease, Financial Platform Lease Plus, and Financial Platform Lease Premiere. Financial platform Lease represents a revolutionary approach to homeownership, offering a unique fusion of traditional and innovative elements.

Financial Platform Lease Agreement:

FIG. 35 shows a block diagram of an overview of a financial platform lease agreement of one embodiment. FIG. 35 shows the financial platform lease grants the user possession rights to utilize the property 3500. The financial platform lease is symbolized by a non-fungible token that directly links the user to a particular property, bestowing exclusive rights to occupy and utilize it 3510. Users can engage in a financial platform lease agreement to obtain property possession rights without an immediate ownership commitment 3520.

Real estate dollars (RED)s symbolize the acquisition value component of real estate and function akin to a gift card with the potential for future value growth 3530. Real estate dollar tokens are fungible and derive their value from the collective holdings of all properties within the underlying platform, however, red tokens do not grant ownership rights to any particular property or shared interest in a pool of properties. 3540.

Users can amass reds, which enables them to potentially convert the financial platform lease into full ownership by exchanging the financial platform lease token along with a sufficient amount of reds 3550. The transformation of real estate value into fractional tokens boosts liquidity in the real estate market, providing property owners and financial institutions the ability to tap into value independently of ownership transfers 3560 of one embodiment.

Figure 36:
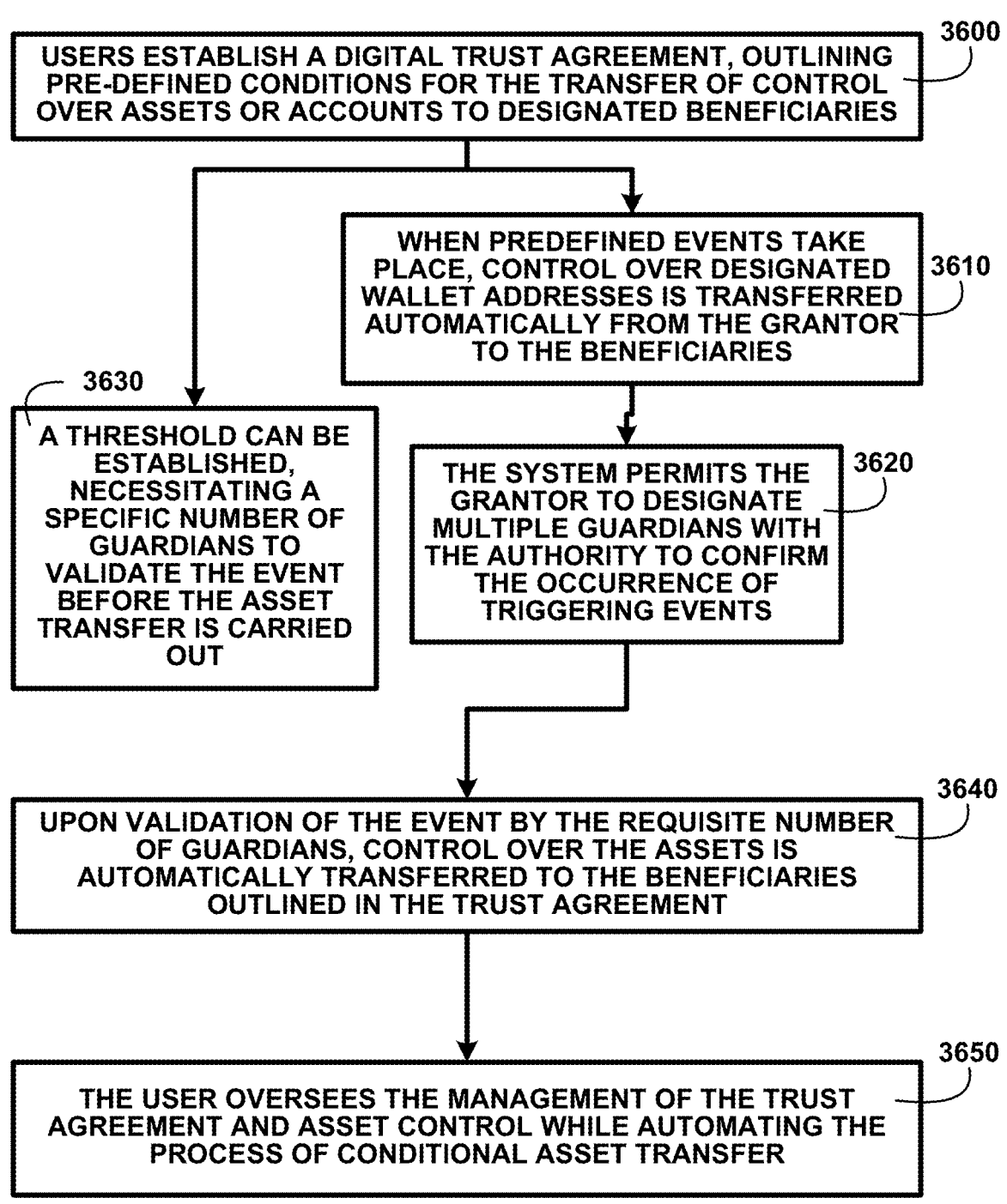
FIG. 36 shows a block diagram of an overview of the digital trust agreement of one embodiment.

Digital Trust Agreement:

FIG. 36 shows a block diagram of an overview of the digital trust agreement of one embodiment. FIG. 36 shows the transformation of real estate value into fractional tokens boosts liquidity in the real estate market, providing property owners and financial institutions the ability to tap into value independently of ownership transfers. Users establish a digital trust agreement, outlining pre-defined conditions for the transfer of control over assets or accounts to designated beneficiaries 3600. A threshold can be established, necessitating a specific number of guardians to validate the event before the asset transfer is carried out 3630.

When predefined events take place, control over designated wallet addresses is transferred automatically from the grantor to the beneficiaries 3610. The system permits the grantor to designate multiple guardians with the authority to confirm the occurrence of triggering events 3620. Upon validation of the event by the requisite number of guardians, control over the assets is automatically transferred to the beneficiaries outlined in the trust agreement 3640. The user oversees the management of the trust agreement and asset control while automating the process of conditional asset transfer 3650 of one embodiment.

Transaction Validation Token Functions:

FIG. 37 shows a block diagram of an overview of transaction validation token functions of one embodiment. FIG. 37 shows digital tokens, known as transaction validation tokens, are generated, and distributed on a blockchain network 3700. Every transaction validation token functions as authorization for particular transaction validation actions 3710. The system utilizes a transaction validation algorithm that relies on staked transaction validation tokens 3730. Transaction validation tokens can be exchanged among peers 3760.

To qualify for monetary distributions, token holders must actively engage in the validation process by utilizing their transaction validation tokens 3720. Token holders validate transactions associated with specific transaction types, rather than blockchain additions 3740. Token holders who actively engage in the validation process using their transaction validation tokens become qualified to receive a pro-rata share of the revenue generated from the validated transactions 3750. Possessing these tokens provides the holder with the privilege to take part in the transaction verification process and obtain corresponding monetary distributions 3770 of one embodiment.

Range Finder Module:

FIG. 38 shows for illustrative purposes only an example of a range finder module of one embodiment. FIG. 38 shows the user's mobile device 3200 having a financial platform app 3230. The financial platform app 3230 includes a range finder module 3800 and augmented reality 3850 programming. The range finder module 3800 includes a range finder sensor module of the financial platform app configured to measure the yard area, a backyard area, a patio, and other points of interest of the user 3810. The range finder sensor module of the financial platform app is configured to take measurements of rooms 3820. The augmented reality 3850 programming uses the measurements of rooms to scale the room in a virtual environment. The augmented reality allows the user to determine whether their furniture will fit in the rooms of one embodiment.

Figure 39:
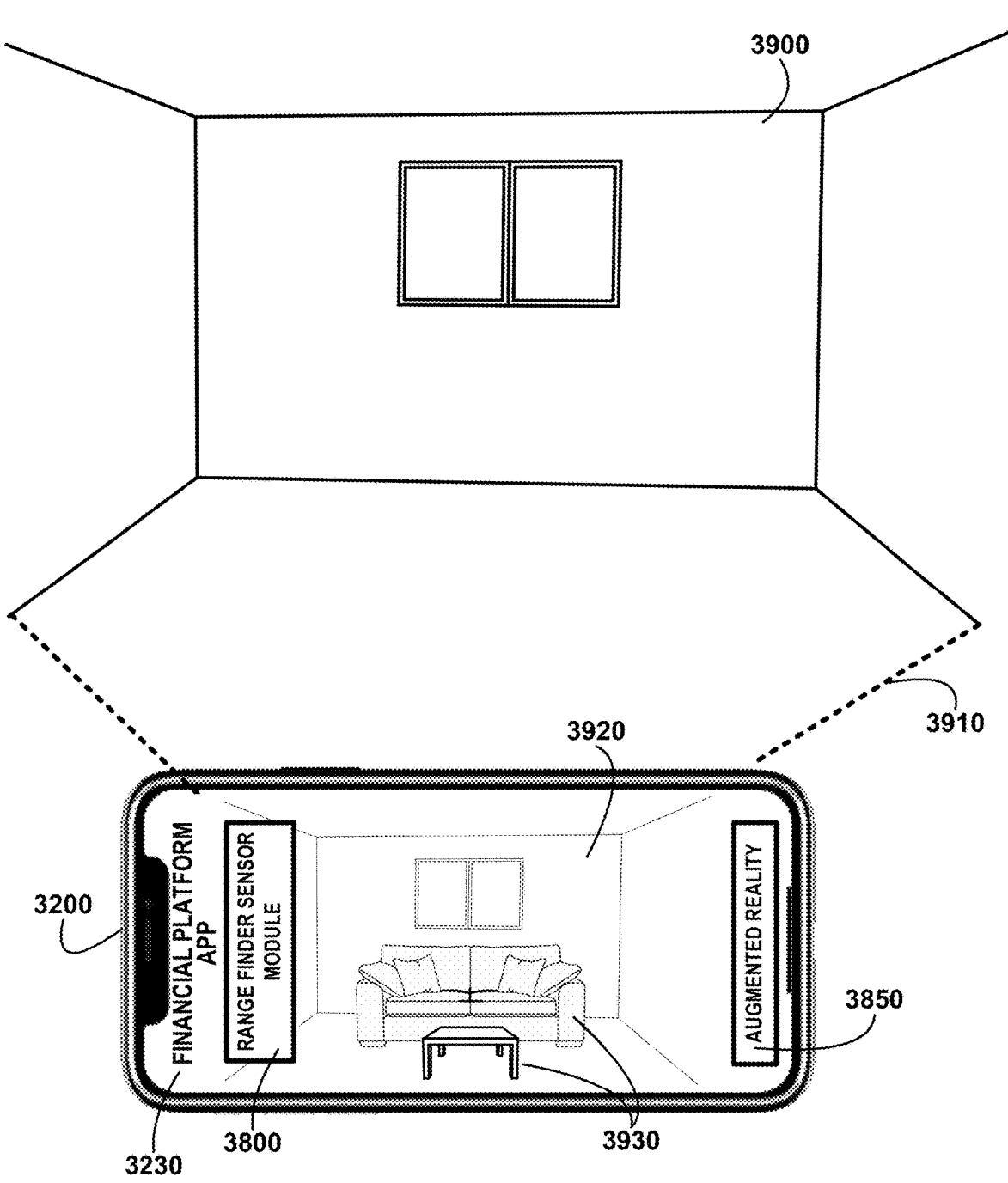
FIG. 39 shows for illustrative purposes only an example of augmented reality of one embodiment.

Augmented Reality:

FIG. 39 shows for illustrative purposes only an example of augmented reality of one embodiment. FIG. 39 shows an image of for example a living room that is measured using the range finder module 3800. The augmented reality 3850 programming scales 3910 the living room into a virtual environment 3920. The user may then place images of their living room furniture 3930 into the virtual living room environment and determine if the living room furniture 3930 fits of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A database and file management system for real estate transactions, comprising:

a real estate database comprising real estate information stored within files therein relating to a plurality of real estate parcels;

a server coupled to the plurality of real estate databases configured to receive the real estate information;

a mobile automobile having an integrated navigation system coupled to the server;

wherein the navigation system includes an energy-efficient route mapping module configured to compute real-estate parcel routes using kinetic-energy-optimized path modeling based on real-time automobile positional data;

a graphical user interface coupled to the navigation system and having geographical mapping data displayed on the graphical user interface, wherein the graphical user interface is configured to allow a user to search and collect the real estate database with voice commands for real estate parcels of interest to the user that is in close proximity to a real-time location of the mobile automobile;

a financial platform application installed on a user's mobile device coupled to the server configured to display property information including property photos and/or videos on the user's mobile device graphical user interface;

wherein the navigation system is further configured to compare and analyze the collected real estate parcels of interest and display on the graphical user interface recommended real estate parcels to the user based on the comparison and analysis;

wherein the navigation system is further configured to allow the user to select at least one preferred real estate parcel based on the recommended real estate parcels and create a mapped navigation route to be displayed on the graphical user interface;

wherein the energy-efficient route mapping system coupled to the navigation system configured to determine a user's specified route criteria of fastest, shortest, and most energy-efficient path to selected real estate destinations;

an appointment processor coupled to the navigation system and configured to allow the user to create a private showing appointment with a representative of the preferred real estate parcel;

a home finder system coupled to the server configured to send a text email or message to the property owner and/or real estate agent to make a private showing arrangement; and a negotiation processor coupled to the navigation system and configured to allow the user to negotiate at least one of a lease or sale of the preferred real estate parcel with the representative.

2. The database and file management system for real estate transactions of claim 1, wherein the navigation system is further configured to display images of the recommended real estate parcels.

3. The database and file management system for real estate transactions of claim 1, further comprising a real estate transaction application operating on a mobile device of the user configured to mirror the graphical user interface on the real estate transaction application when the user is not using the automobile.

4. The database and file management system for real estate transactions of claim 3, wherein the real estate transaction application is further configured to display videos of the recommended real estate parcels on the real estate transaction application.

5. The database and file management system for real estate transactions of claim 1, wherein the negotiation processor coupled is further configured to generate lease and sales contracts transmitted to the mobile device of the user.

6. The database and file management system for real estate transactions of claim 1, wherein the navigation system is further configured to display a virtual tour of the recommended real estate parcels with augmented reality views.

7. The database and file management system for real estate transactions of claim 1, wherein the navigation system is further configured to display a list of comparable properties that are similar to the recommended real estate parcels.

8. The database and file management system for real estate transactions of claim 1, wherein the navigation system is further configured to display an estimated value of the recommended real estate parcels based on third-party appraisal data.

9. The database and file management system for real estate transactions of claim 1, wherein the navigation system is further configured to allow the user to video chat with the representative of the recommended real estate parcels.

10. A database and file management system for real estate transactions, comprising:

a real estate database comprising real estate information stored within files therein relating to a plurality of real estate parcels;

a server coupled to the plurality of real estate databases configured to receive the real estate information;

a mobile automobile having an integrated navigation system coupled to the server;

wherein the navigation system includes an energy-efficient route mapping module configured to compute real-estate parcel routes using kinetic-energy-optimized path modeling based on real-time automobile positional data;

a graphical user interface coupled to the navigation system and having geographical mapping data displayed on the graphical user interface, wherein the graphical user interface is configured to allow a user to search and collect the real estate database with voice commands for real estate parcels of interest to the user that is in close proximity to a real-time location of the mobile automobile;

a financial platform application installed on a user's mobile device coupled to the server configured to display property information including property photos and/or videos on the user's mobile device graphical user interface;

wherein the navigation system is further configured to compare and analyze the collected real estate parcels of interest and display on the graphical user interface recommended real estate parcels to the user based on the comparison and analysis;

wherein the navigation system is further configured to allow the user to select at least one preferred real estate parcel based on the recommended real estate parcels and create a mapped navigation route to be displayed on the graphical user interface;

an energy-efficient route mapping system coupled to the navigation system configured to determine a user's specified route criteria of fastest, shortest, and most energy-efficient path to selected real estate destinations;

a real estate transaction application operating on a mobile device of the user configured to mirror the graphical user interface on the real estate transaction application when the user is not using the automobile;

an appointment processor coupled to the navigation system and configured to allow the user to create an a private showing appointment with a representative of the preferred real estate parcel;

a home finder system coupled to the server configured to send a text email or message to the property owner and/or real estate agent to make a private showing arrangement; and a negotiation processor coupled to the navigation system and configured to allow the user to negotiate at least one of a lease or sale of the preferred real estate parcel with the representative.

11. The database and file management system for real estate transactions of claim 10, wherein the navigation system is further configured to display images of the recommended real estate parcels.

12. The database and file management system for real estate transactions of claim 10, wherein the real estate transaction application is further configured to display videos of the recommended real estate parcels on the real estate transaction application.

13. The database and file management system for real estate transactions of claim 10, wherein the negotiation processor coupled is further configured to generate lease and sales contracts transmitted to the mobile device of the user.

14. The database and file management system for real estate transactions of claim 10, wherein the navigation system is further configured to display a virtual tour of the recommended real estate parcels with augmented reality views.

15. The database and file management system for real estate transactions of claim 10, wherein the navigation system is further configured to display a list of comparable properties that are similar to the recommended real estate parcels.

16. The database and file management system for real estate transactions of claim 10, wherein the navigation system is further configured to display an estimated value of the recommended real estate parcels based on third-party appraisal data.

17. A database and file management system for real estate transactions, comprising:

a real estate database comprising real estate information stored within files therein relating to a plurality of real estate parcels;

a server coupled to the plurality of real estate databases configured to receive the real estate information;

a mobile automobile having an integrated navigation system coupled to the server;

wherein the navigation system includes an energy-efficient route mapping module configured to compute real-estate parcel routes using kinetic-energy-optimized path modeling based on real-time automobile positional data;

a graphical user interface coupled to the navigation system and having geographical mapping data displayed on the graphical user interface, wherein the graphical user interface is configured to allow a user to search and collect the real estate database with voice commands for real estate parcels of interest to the user that is in close proximity to a real-time location of the mobile automobile;

a financial platform application installed on a user's mobile device coupled to the server configured to display property information including property photos and/or videos on the user's mobile device graphical user interface;

wherein the navigation system is further configured to compare and analyze the collected real estate parcels of interest and display on the graphical user interface recommended real estate parcels to the user based on the comparison and analysis;

wherein the navigation system is further configured to allow the user to select at least one preferred real estate parcel based on the recommended real estate parcels and create a mapped navigation route to be displayed on the graphical user interface;

an energy-efficient route mapping system coupled to the navigation system configured to determine a user's specified route criteria of fastest, shortest, and most energy-efficient path to selected real estate destinations;

a real estate transaction application operating on a mobile device of the user configured to mirror the graphical user interface on the real estate transaction application when the user is not using the automobile;

an appointment processor coupled to the navigation system and configured to allow the user to create an a private showing appointment with a representative of the preferred real estate parcel;

a home finder system coupled to the server configured to send a text email or message to the property owner and/or real estate agent to make a private showing arrangement;

a negotiation processor coupled to the navigation system and configured to allow the user to negotiate at least one of a lease or sale of the preferred real estate parcel with the representative; and wherein the navigation system is further configured to display a list of comparable properties that are similar to the recommended real estate parcels and an estimated value of the recommended real estate parcels based on third-party appraisal data.

18. The database and file management system for real estate transactions of claim 17, wherein the navigation system is further configured to display images of the recommended real estate parcels.

19. The database and file management system for real estate transactions of claim 17, wherein the negotiation processor coupled is further configured to generate lease and sales contracts transmitted to the mobile device of the user.

20. The database and file management system for real estate transactions of claim 17, wherein the navigation system is further configured to display a virtual tour of the recommended real estate parcels with augmented reality views.

* * * * *